United States Patent [19]

Mennie et al.

[11] Patent Number: 5,875,259

[45] Date of Patent: Feb. 23, 1999

[54] METHOD AND APPARATUS FOR DISCRIMINATING AND COUNTING DOCUMENTS

[75] Inventors: Douglas U. Mennie, Barrington; Bradford T. Graves, Arlington Heights; Richard A. Mazur, Naperville, all of Ill.

[73] Assignee: Cummins-Allison Corp., Mt. Prospect, Ill.

[21] Appl. No.: 399,854

[22] Filed: Mar. 7, 1995

Related U.S. Application Data

[63] Continuation-in-part of Ser. No. 340,031, Nov. 14, 1994, Pat. No. 5,815,592, Ser. No. 287,882, Aug. 9, 1994, Pat. No. 5,652,802, and Ser. No. 394,752, Feb. 27, 1995, Pat. No. 5,724,438, which is a continuation-in-part of Ser. No. 340,031, and Ser. No. 127,334, Sep. 27, 1993, Pat. No. 5,467,405, said Ser. No. 287,882, is a continuation-in-part of Ser. No. 207,592, Mar. 8, 1994, Pat. No. 5,467,406, Ser. No. 219,093, Mar. 29, 1994, abandoned, and Ser. No. 127,334, said Ser. No. 207,592, and Ser. No. 219,093, which is a continuation-in-part of Ser. No. 127,334, said Ser. No. 340,031, is a continuation-in-part of Ser. No. 243,807, May 16, 1994, Pat. No. 5,633,949, and Ser. No. 207,592, which is a continuation-in-part of Ser. No. 127,334, said Ser. No. 243,807, is a continuation-in-part of Ser. No. 219,093, and Ser. No. 127,334, which is a continuation of Ser. No. 885,648, May 19, 1992, Pat. No. 5,295,196, which is a continuation-in-part of Ser. No. 475,111, Feb. 5, 1990, abandoned.

[51] Int. Cl.[6] ..................................................... G06K 9/00
[52] U.S. Cl. .......................................... 382/135; 382/318
[58] Field of Search ...................................... 382/135, 137, 382/318, 319, 320, 321, 322, 323; 194/206, 207, 216; 209/534; 250/556; 356/71

[56] References Cited

U.S. PATENT DOCUMENTS

| | | | |
|---|---|---|---|
| 3,246,295 | 4/1966 | Claris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,679,314 | 7/1972 | Mustert | 356/71 |
| 3,778,628 | 12/1973 | Novak et al. | 250/556 |

(List continued on next page.)

FOREIGN PATENT DOCUMENTS

| | | |
|---|---|---|
| 0077464 | 4/1983 | European Pat. Off. . |
| 101115 | 2/1984 | European Pat. Off. . |
| 0 253 935 A2 | 10/1986 | European Pat. Off. . |
| 0338123 | 10/1989 | European Pat. Off. . |
| 0342647 | 11/1989 | European Pat. Off. . |
| 0 718 809 A2 | 6/1996 | European Pat. Off. . |

(List continued on next page.)

OTHER PUBLICATIONS

"CPS 1200—Currency Systems International, Inc." 1992.
Toshiba–Mosler Operator's Manual for CF–420 Cash Settlement System; pp. 1 to C–3; copyr. 1989.
Description of Toshibsa–Mosler CF–420 Device; estimated 1989.

(List continued on next page.)

*Primary Examiner*—Phuoc Tran
*Attorney, Agent, or Firm*—Arnold White & Durkee

[57] ABSTRACT

A currency identification system for identifying currency bills of different denominations of a plurality of currency systems. The device comprises a discriminating unit for discriminating the identity a bill, the discriminating unit retrieving characteristic information from said bill. Furthermore, a memory stores master characteristic information associated with each genuine bill which the system is capable of identifying; the memory storing master characteristic information associated with at least one genuine bill from at least two currency systems. A signal processing means compares the retrieved characteristic information with master characteristic information associated with at least one genuine bill; the signal processing means generating an indication of the identity of said bill based on said comparison when said bill is one that the system is capable of identifying.

113 Claims, 53 Drawing Sheets

U.S. PATENT DOCUMENTS

| | | | |
|---|---|---|---|
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,283,708 | 8/1981 | Lee | 340/146.3 Z |
| 4,288,781 | 9/1981 | Sellner et al. | 382/135 |
| 4,302,781 | 11/1981 | Ikeda et al. | 358/486 |
| 4,311,914 | 1/1982 | Huber | 250/556 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamura et al. | 382/135 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,487,306 | 12/1984 | Nao et al. | 382/135 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,542,829 | 9/1985 | Emery et al. | 209/534 |
| 4,547,896 | 10/1985 | Ohtombe et al. | 382/318 |
| 4,553,846 | 11/1985 | Hilton et al. | 356/429 |
| 4,556,140 | 12/1985 | Okada | 194/4 |
| 4,559,451 | 12/1985 | Curl | 250/560 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,611,345 | 9/1986 | Ohnishi et al. | 382/7 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,764,976 | 8/1988 | Kallin et al. | 382/65 |
| 4,823,393 | 4/1989 | Kawakami | 382/7 |
| 4,827,531 | 5/1989 | Milford | 382/7 |
| 4,881,268 | 11/1989 | Uchida et al. | 382/7 |
| 4,973,851 | 11/1990 | Lee | 250/556 |
| 4,992,860 | 2/1991 | Hamaguchi et al. | 358/75 |
| 4,996,604 | 2/1991 | Ogawa et al. | 358/486 |
| 5,047,871 | 9/1991 | Meyer et al. | 358/486 |
| 5,055,834 | 10/1991 | Chiba | 382/135 |
| 5,068,519 | 11/1991 | Bryce | 235/449 |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,199,543 | 4/1993 | Kamagami et al. | 194/207 |
| 5,201,395 | 4/1993 | Takizawa et al. | 194/206 |
| 5,207,788 | 5/1993 | Geib et al. | 271/122 |
| 5,261,518 | 11/1993 | Bryce | 194/206 |
| 5,295,196 | 3/1994 | Raterman et al. | 382/7 |
| 5,309,515 | 5/1994 | Troung et al. | 382/7 |
| 5,341,408 | 8/1994 | Melcher et al. | 377/8 |
| 5,430,664 | 7/1995 | Cargill et al. | 364/550 |
| 5,465,821 | 11/1995 | Akioka | 194/207 |
| 5,467,406 | 11/1995 | Graves et al. | 382/135 |
| 5,523,575 | 6/1996 | Machida et al. | 250/208.1 |
| 5,607,040 | 3/1997 | Mathurin, Sr. | 194/207 |
| 5,633,949 | 5/1997 | Graves et al. | 382/135 |

FOREIGN PATENT DOCUMENTS

| | | |
|---|---|---|
| 2204166 | 11/1988 | United Kingdom . |
| 2272762 | 11/1993 | United Kingdom . |
| WO 87/06041 | 10/1987 | WIPO . |
| WO 90/07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO 94/19773 | 9/1994 | WIPO . |

OTHER PUBLICATIONS

Currency Systems International, Medium Spped Currency Sorting Family, CPS 600 and CPS 900; 4 pages; dated: copyr. 1994.

Currency System Intl'l, Mr. W. Kranister in Coversation with Richard Haycock; pp. 1–5; dated: estimated 1994.

Description of Currency Systems International's CPS 600 and CPS 900 devices; date: estimated 1994.

Glory GSA–500 Sortmaster brochure; 2 pages; date: Jan. 14, 1994.

Glory UF–1D brochure; 2 pages; date: estimated before Aug. 9, 1994.

Currency Systems International/Currency Processing Systems, CPS 300; 4 pages; date: copyr. 1992.

Glory GFB–200/210/220/230, Desk–Top Bank Note Counter; 2 pages; date: estimated before Aug. 9, 1994.

Chp. 7 of Mosler CF–420 Cash Management System, Operator's Manual, © 1989.

Revised drawings of portions of Mosler CF–420 Cash Management System (FIGs. A–C) and description of the same (1989).

JetScan Currency Scanner/Counter, Model 4060, Operator's Manual by Cummins–Allison (Aug. 1991).

Sale of JetScan Currency Scanner/Counter, Model 4060 (Aug. 1991).

JetScan Currency Scanner/Counter, Model 4061, Operating Instructions by Cummins–Allison (Apr. 20, 1993).

Sale of JetScan Currency Scanner/Counter, Model 4061 (Apr. 20, 1993).

JetScan Currency Scanner/Counter, Model 4062, Operating Instructions by Cummins–Allison (Nov. 28, 1994).

Sale of JetScan Currency Scanner/Counter, Model 4062 (Nov. 28, 1994).

AFB Currency Recognition System (1982).

Mosler Inc. brochure "The Mosler/Toshiba CF–420", 1989.

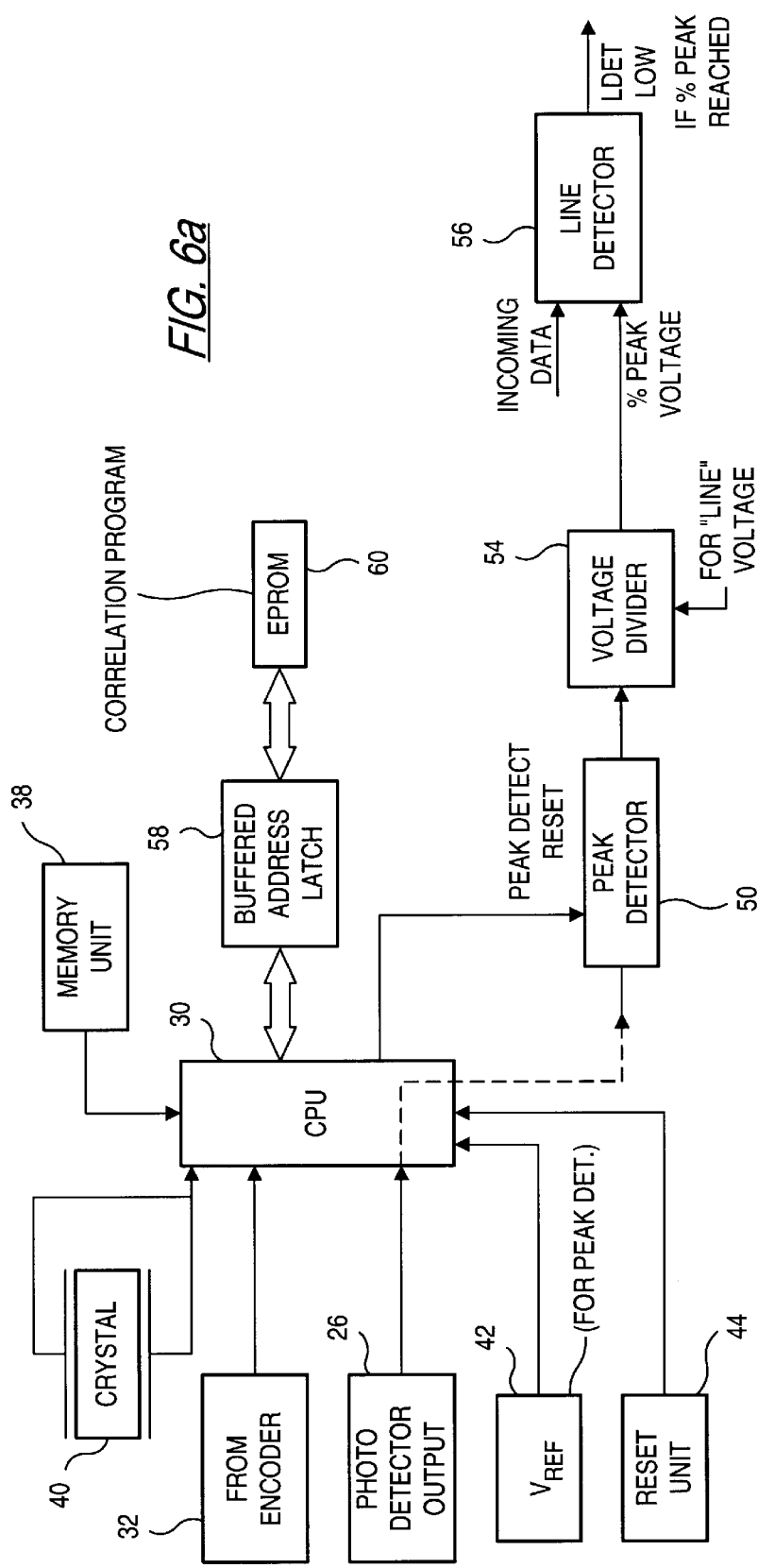
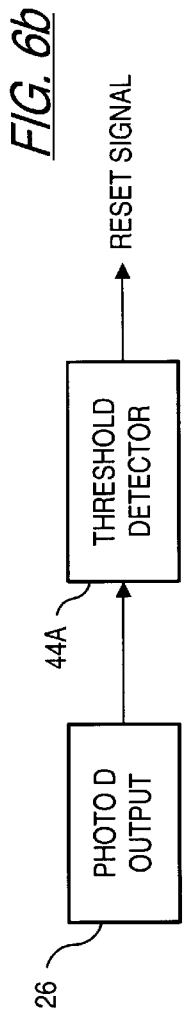
FIG. 6a
FIG. 6b

METHOD AND APPARATUS FOR DISCRIMINATING AND COUNTING DOCUMENTS

CROSS-REFERENCE TO RELATED APPLICATIONS

This application is a continuation-in-part of U.S. patent applications Ser. No. 08/340,031 filed Nov. 14, 1994, now U.S. Pat. No. 5,815,592, for a "Method And Apparatus For Discriminating and Counting Documents," Ser. No. 08/287,882 filed Aug. 9, 1994, now U.S. Pat. No. 5,652,802, for a "Method and Apparatus for Document Identification," and Ser. No. 08/394,752 filed Feb. 27, 1995 for, now U.S. Pat. No. 5,724,438, a "Method of Generating Modified Patterns and Method and Apparatus for Using the Same in a Currency Identification System."

U.S. patent application Ser. No. 08/394,752 filed Feb. 27, 1995 for a "Method of Generating Modified Patterns and Method and Apparatus for Using the Same in a Currency Identification System" is a continuation-in-part of U.S. patent applications Ser. No. 08/340,031 and Ser. No. 08/127,334 filed Sep. 27, 1993, now U.S. Pat. No. 5,467,405, for a "Method and Apparatus for Currency Discrimination and Counting."

U.S. patent application Ser. No. 08/287,882 is a continuation-in-part of U.S. patent applications Ser. No. 08/207,592 filed Mar 8, 1994, now U.S. Pat. No. 5,467,406, for "Method and Apparatus for Currency Discrimination," Ser. No. 08/219,093 filed on Mar. 29, 1994, abandoned, for a "Currency Discriminator and Authenticator," and Ser. No. 08/127,334 filed Sep. 27, 1993, for a "Method and Apparatus for Currency Discrimination and Counting." United States patent applications Ser. No. 08/207,592 and Ser. No. 08/219,093 are both continuation-in-part applications of Ser. No. 08/127,334.

U.S. patent applications Ser. No. 08/340,031 is a continuation-in-part of pending U.S. patent applications Ser. No. 08/243,807 filed May 16, 1994, now U.S. Pat. No. 5,633,949, for "Method And Apparatus For Currency Discrimination" and Ser. No. 08/207,592 filed Mar. 8, 1994 for "Method and Apparatus for Currency Discrimination." U.S. patent application Ser. No. 08/207,592 is a continuation-in-part of Ser. No. 08/127,334. U.S. patent application Ser. No. 08/243,807 is a continuation-in-part of 08/219,093 and Ser. No. 08/127,334. U.S. patent application Ser. No. 08/219,093 is a continuation-in-part of Ser. No. 08/127,334.

U.S. patent application Ser. No. 08/127,334 filed Sep. 27, 1993, for a "Method and Apparatus for Currency Discrimination and Counting," is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting."

FIELD OF THE INVENTION

The present invention relates, in general, to document identification. More specifically, the present invention relates to an apparatus and method for discriminating among a plurality of document types such as currency bills of different denominations and/or from different countries.

BACKGROUND OF THE INVENTION

Machines that are currently available for simultaneous scanning and counting of documents such as paper currency are relatively complex and costly, and relatively large in size. The complexity of such machines can also lead to excessive service and maintenance requirements. These drawbacks have inhibited more widespread use of such machines, particularly in banks and other financial institutions where space is limited in areas where the machines are most needed, such as teller areas. The above drawbacks are particularly difficult to overcome in machines which offer much-needed features such as the ability to scan bills regardless of their orientation relative to the machine or to each other, and the ability to authenticate genuineness and/or denomination of the bills.

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for size, limpness, and thickness).

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Recent currency discriminating systems rely on comparisons between a scanned pattern obtained from a subject bill and sets of stored master patterns for the various denominations among which the system is designed to discriminate. For example, it has been found that scanning U.S. bills of different denominations along a central portion thereof provides scanning patterns sufficiently divergent to enable accurate discrimination between different denominations. Such a discrimination device is disclosed in U.S. Pat. No. 5,295,196. However, currencies of other countries can differ from U.S. currency and from each other in a number of ways. For example, while all denominations of U.S. currencies are the same size, in many other countries currencies vary in size by denomination. Furthermore, there is a wide variety of bill sizes among different countries. In addition to size, the color of currency can vary by country and by denomination. Likewise, many other characteristics may vary between bills from different countries and of different denominations.

As a result of the wide variety of currencies used throughout the world, a discrimination system designed to handle bills of one country generally can not handle bills from another country. Likewise, the method of discriminating bills of different denominations of one country may not be appropriate for use in discriminating bills of different denominations of another country. For example, scanning for a given characteristic pattern along a certain portion of bills of one country, such as optical reflectance about the central portion of U.S. bills, may not provide optimal discrimination properties for bills of another country, such as German marks.

Furthermore, there is a distinct need for an identification system which is capable of accepting bills of a number of currency systems, that is, a system capable of accepting a number of bill-types. For example, a bank in Europe may need to process on a regular basis French, British, German, Dutch, etc. currency, each having a number of different denomination values.

Furthermore, in currency discriminating systems that rely on comparisons between a scanned pattern obtained from a subject bill and sets of stored master patterns, the ability of a system to accurately line up the scanned patterns to the master patterns to which they are being compared is important to the ability of a discrimination system to discriminate among bills of various denominations as well as between genuine bills and counterfeit bills without rejecting an unacceptable number of genuine bills. However, the ability of a system to line up scanned and master patterns is often hampered by the improper initiation of the scanning process which results in the generation of scanned patterns. If the generation of scanned patterns is initiated too early or too late, the resulting pattern will not correlate well with the master pattern associated with the identity of the currency; and as a result, a genuine bill may be rejected. There are a number of reasons why a discrimination system may initiate the generation of a scanned pattern too early or too late, for example, stray marks on a bill, the bleeding through of printed indicia from one bill in a stack onto an adjacent bill, the misdetection of the beginning of the area of the printed indicia which is desired to be scanned, and the reliance on the detection of the edge of a bill as the trigger for the scanning process coupled with the variance, from bill to bill, of the location of printed indicia relative to the edge of a bill. Therefore, there is a need to overcome the problems associated with correlating scanned and master patterns.

SUMMARY OF THE INVENTION

It is an object of the present invention to provide an improved method and apparatus for identifying documents.

It is an object of the present invention to provide an improved method and apparatus for discriminating among currency bills comprising a plurality of currency denominations.

It is another object of this invention to provide an improved method and apparatus of the above kind which is capable of efficiently discriminating among bills of several currency denominations at a high speed and with a high degree of accuracy.

It is another object of this invention to provide an improved method and apparatus of the above kind which is capable of efficiently discriminating currencies from a number of different countries.

It is another object of this invention to provide a currency evaluation device able to discriminate among different denominations of bills from two or more currency systems.

It is another object of this invention to provide a currency evaluation device able to discriminate among different denominations of both Canadian and German bills.

It is another object of this invention to provide an improved method and apparatus of the above kind which is capable of scanning a document such as a currency bill along two or more laterally displaced segments to thereby identify the document.

It is another object of this invention to provide an improved method and apparatus of the above kind which is capable of scanning a document along two or more laterally displaced segments by using two or more laterally displaced scanheads.

It is another object of this invention to provide an improved method and apparatus of the above kind which is capable of scanning a document along two or more laterally displaced segments by using two or more laterally displaced sensors of a linear array scanhead.

It is another object of this invention to provide an improved method and apparatus of the above kind which is capable of scanning a document along two or more laterally displaced segments by using one or more laterally moveable scanheads.

It is another object of this invention to provide an improved method and apparatus of the above kind wherein the above scanheads or sensors retrieve optical reflectance information from a document under test and use such reflectance information to determine the identity of the document.

It is another object of this invention to provide an improved method and apparatus of the above kind which identifies a document by comparing one or more scanned patterns generated by scanning a document under test with one or more scanheads or one or more sensors and comparing the scanned pattern or patterns with one or more master patterns associated with genuine documents.

It is another object of this invention to provide an improved method and apparatus of the above kind which identifies a document by determining the size of the document.

It is another object of this invention to provide an improved method and apparatus of the above kind which identifies a document by determining the color of the document.

It is another object of this invention to provide an improved method and apparatus of the above kind which identifies a document based on a combination of size information and scanned/master pattern comparison.

It is another object of this invention to provide an improved method and apparatus of the above kind which identifies a document based on a combination of color information and scanned/master pattern comparison.

It is another object of this invention to provide an improved method and apparatus of the above kind which identifies a document based on a combination of size information, color information, and scanned/master pattern comparison.

It is another object of this invention to provide an improved method and apparatus of the above kind in which only selected ones of a number of scanheads or sensors are activated to scan a document.

It is another object of this invention to provide an improved method and apparatus of the above kind in which scanned patterns are generated only from the output or data derived therefrom of selected ones of a number of scanheads or sensors which are activated to scan a document.

It is another object of this invention to provide an improved method and apparatus of the above kind in which the selection of one or more of a number of scanheads or sensors to scan a document is based on size information.

It is another object of this invention to provide an improved method and apparatus of the above kind in which the selection of one or more of a number of scanheads or sensors to scan a document is based on color information.

It is another object of this invention to provide an improved method and apparatus of the above kind in which the lateral positioning of one or more moveable scanheads is based on size and/or color information detected from the document.

It is another object of this invention to provide an improved method and apparatus of the above kind in which the selection of the output or data derived therefrom of one or more of a number of scanheads or sensors for the generation of scanned patterns is based on size information.

It is another object of this invention to provide an improved method and apparatus of the above kind in which the selection of the output or data derived therefrom of one or more of a number of scanheads or sensors for the generation of scanned patterns is based on color information.

It is another object of this invention to provide an improved method and apparatus of the above kind which is capable of scanning either side or both sides of a document.

It is another object of this invention to provide an improved method and apparatus of the above kind in which the amount of information that must be processed is reduced by tailoring the areas from which scanned patterns are derived, such reduction being based on pre-scan information detected from a document such as the size and/or color of a document to be scanned.

It is another object of this invention to provide an improved method and apparatus of the above kind in which the amount of information that must be processed is reduced by tailoring the data which must be assembled into one or more scanned patterns, such reduction being based on information detected from a document during the scanning process itself, the information detected during the scanning process itself including, for example, size and/or color information.

It is another object of this invention to provide an improved method and apparatus of the above kind in which size and/or color information detected from a document is used to generate a preliminary set of potentially matching documents and in which one or more scanned patterns generated from a document are compared with master patterns chosen from the preliminary set.

It is another object of this invention to provide an improved method and apparatus of the above kind in which a document to be scanned is transported past one or more scanheads in a centered or justified manner along a transport path.

It is another object of this invention to provide an improved method and apparatus of the above kind in which a document to be scanned is transported past one or more scanheads along a transport path and in which one or more sensors separate from the one or more scanheads are used to determine the lateral positioning of the document within the transport path.

It is another object of this invention to provide an improved method and apparatus of the above kind in which a document to be scanned is transported past one or more scanheads along a transport path and in which the lateral positioning of the document within the transport path is determined by analyzing the output of one or more scanheads.

It is another object of this invention to provide an improved method and apparatus of the above kind in which a document to be scanned is transported past one or more scanheads along a transport path and in which the skew of the document is determined by analyzing of output of one or more scanheads or analyzing the output of one or more separate sensors.

It is another object of this invention to provide an improved method and apparatus of the above kind which is capable of accepting documents fed either face up or face down.

It is another object of this invention to provide an improved method and apparatus of the above kind which is capable of accepting documents fed in either the forward or reverse direction, i.e., top edge first or top edge last.

A related object of the present invention is to provide such an improved currency discrimination and counting apparatus which is compact, economical, and has uncomplicated construction and operation.

It is an object of the present invention to provide an improved currency scanning and counting machine which is relatively simple and compact, while at the same time providing a variety of advanced features which make the machine convenient and useful to the operator.

Another object of this invention is to provide such an improved currency scanning and counting machine that is relatively inexpensive to manufacture and maintain, and which also facilitates service and maintenance. In this connection, a related object of the invention is to provide such a machine having a relatively small number of parts, and in which most of the parts are arranged in a manner to have a long operating life with little or no maintenance.

It is a further object of this invention to provide such a machine that is capable of operating at a faster throughput rate than any previous machine able to determine the denomination of the scanned bills.

It is another object of the present invention to provide an improved method and apparatus for identifying a currency as belonging to a set of one or more currency bills.

It is another object of the present invention to provide an improved method and apparatus for determining the identity of a currency bill.

It is another object of the present invention to provide an improved method of generating modified scanned patterns.

It is another object of the present invention to provide an improved method of generating modified master patterns.

It is another object of the present invention to provide an improved method and apparatus for determining the identity of a currency bill by comparing a modified version of a scanned pattern with one or more master patterns.

It is another object of the present invention to provide an improved method and apparatus for determining the identity of a currency bill by comparing modified versions of one or more master patterns with a scanned pattern.

It is another object of the present invention to provide an improved method and apparatus using an improved pattern generation method for improving the ability of a discrimination system to accurately reject improper bills while reducing the likelihood of rejecting genuine bills.

Other objects and advantages of the invention will become apparent upon reading the following detailed description in conjunction with the accompanying drawings.

In accordance with an embodiment of the present invention, the foregoing objectives are realized by providing a currency counting and discrimination device for receiving a stack of currency bills, rapidly counting and discriminating the bills in the stack, and then re-stacking the bills. This device includes an input receptacle for receiving a stack of currency bills to be discriminated, a discriminating unit for discriminating the currency bills by denomination, an output receptacle for receiving the currency bills after they have been discriminated, and a transport mechanism for transporting the currency bills, one at a time, from the input receptacle past the discriminating unit and to the output receptacle. The transport mechanism includes stripping wheels for stripping the lowermost bill from a stack of bills in the input receptacle, and a pair of driven transport rolls on opposite sides of the discriminating unit for transporting each bill past the discriminating unit. One of the transport rolls also receives bills directly from the stripping wheels and transports the received bills to the region between the pair of transport rolls.

In a preferred embodiment, a pair of photosensors are located at opposite sides of the bill transport path, each photosensor including a light source and a protective lens on one side of the bill, and a photodetector and a protective lens on the other side of the bill. The lenses for both the light sources and the photodetectors are located sufficiently close to each other that the lenses are wiped by the bills transported therebetween.

In accordance with an embodiment of the present invention, the objectives enumerated above are achieved by scanning a document along one or more segments, generating one or more scanned patterns therefrom, and comparing the one or more scanned patterns to one or more master patterns associated with scans along corresponding segments of genuine documents. A preferred embodiment of the present invention involves a technique based on the optical sensing of reflectance characteristics obtained by illuminating and scanning a document such as a currency bill along an appropriately selected segment or segments of a document. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved across the illuminated strip. Accordingly, a fixed number of reflectance samples is obtained across the note. The data samples obtained for a bill scan are subjected to digital processing, including a normalizing process to deaccentuate variations due to contrast fluctuations in the printed pattern or indicia existing on the surface of the bill being scanned. The normalized reflectance data represent a characteristic pattern that is fairly unique for a given bill identity and incorporates sufficient distinguishing features between characteristic patterns for different bill-types so as to accurately differentiate therebetween.

By using the above approach, a series of master characteristic patterns are generated and stored using standard bills for each denomination of currency that is to be detected. The "standard" bills used to generate the master characteristic patterns are preferably bills that are slightly used bills. According to a preferred embodiment, two or four characteristic patterns are generated and stored within system memory for each detectable bill-type. The stored patterns correspond, respectively, to optical scans performed on one or both sides of a bill along "forward" and "reverse" directions relative to the pattern printed on the bill. For bills which produce significant pattern changes when shifted slightly to the left or right, such as the $10 bill in U.S. currency, it is preferred to store two patterns for each of the "forward" and "reverse" directions, each pair of patterns for the same direction represent two scan areas that are slightly displaced from each other along the lateral dimension of the bill. Preferably, the document identification system of this invention is adapted to identify different denominations of a plurality of currency systems. Accordingly, a master set of different characteristic patterns is stored within the system memory for subsequent correlation purposes.

According to the correlation technique of this invention, the pattern generated by scanning a bill under test and processing the sampled data is compared with each of the prestored characteristic patterns within a preliminary set (to be described below) to generate, for each comparison, a correlation number representing the extent of similarity between corresponding ones of the plurality of data samples for the compared patterns. Bill identification is based on designating the scanned bill as belonging to the bill-type corresponding to the stored characteristic pattern for which the correlation number resulting from pattern comparison is determined to be the highest. The possibility of a scanned bill having its identity mischaracterized following the comparison of characteristic patterns is significantly reduced by defining a bi-level threshold of correlation that must be satisfied for a "positive" call to be made.

In essence, the present invention utilizes an optical sensing and correlation technique for positively identifying any of a plurality of different bill-types regardless of whether the bill is scanned along the "forward" or "reverse" directions. Likewise in a preferred embodiment of the present invention, the system is capable of identifying any of a plurality of different bill-types regardless of whether the bill is fed into the system with a "face up" or "face down" orientation. Face orientation can be accommodated by storing master patterns scanned from both sides of genuine documents, using a system having one or more scanheads on a single side of a document transport path, and comparing scanned patterns to master patterns retrieved from both sides of genuine documents. Alternatively, scanheads may be placed on both sides of a document transport path, scanned patterns retrieved from respective sides can be compared to master patterns from both sides or master patterns from corresponding sides where face orientation can be determined. Additionally, a cross check can be performed so that the identity determined by a match of patterns from one side of a document is consistent with the identity indicated by comparing patterns from the other side of the document. For both one-sided and two-sided scanhead systems, where the face orientation of a document can be determined before patterns are compared, scanned patterns from one side of a document can be compared only to master patterns retrieved from a corresponding side. Similar methods can be employed for accommodating documents fed in forward and reverse directions.

In a preferred embodiment, the invention is particularly adapted to be implemented with a system programmed to track each identified currency identity so as to conveniently present aggregate totals for bills that have been identified at the end of a scan run. A preferred embodiment incorporates an abbreviated curved transport path for accepting currency bills that are to be counted and transporting the bills about their narrow dimension across a scanhead located downstream of the curved path and onto a conventional stacking station where sensed and counted bills are collected. In a preferred embodiment, a scanhead of the present invention operates in conjunction with an optical encoder which is adapted to initiate the capture of a predefined number of reflectance data samples when a bill (and, thus, the indicia or pattern printed thereupon) moves across a coherent strip of light focused by the scanhead.

In a preferred embodiment, a scanhead of the present invention uses a pair of light-emitting diodes ("LEDs") to focus a coherent light strip of predefined dimensions and having a normalized distribution of light intensity across the illuminated area. The LEDs are angularly disposed and focus the desired strip of light onto the narrow dimension of a bill positioned flat across the scanning surface of the scanhead. A photodetector detects light reflected from the bill. The sampling of the photodetector output is controlled by the optical encoder to obtain the desired reflectance samples. Initiation of sampling is based upon detection of the edge of a bill.

The above described techniques and apparatus as tailored to scanning U.S. currency are more fully disclosed in U.S. Pat. No. 5,295,196, for a "Method and Apparatus for Currency Discrimination and Counting" incorporated herein in its entirety.

In adapting the currency discriminating method and apparatus disclosed in U.S. Pat. No. 5,295,196 to optimize the scanning of currencies from countries other than the United States, it is first noted that while it has been found that scanning along the central portion of the green side of U.S. bills provides good patterns to discriminate between the different U.S. denominations, foreign bills may require scanning along segments located in locations other than the center and the desirable areas to scan bills can vary from bill-type to bill-type. For example, it may be determined that it is desirable to scan German marks in the forward direction along a segment 1 inch (2.54 cm) to the left of center along the top face of a bill while it may be desirable to scan British pounds along a segment 1.5 inches (3.81 cm) to the right of center. To provide a system capable of scanning along a plurality of laterally displaced segments, the present invention utilizes either a plurality of laterally displaced stationary scanheads, one or more laterally moveable scanheads, or a linear array scanhead having a plurality of laterally displaced sensors. In a preferred embodiment, the scanheads or sensors are arranged in a symmetrical manner about the center of document to be scanned. Such a symmetrical arrangement aids in providing a system which is capable of accepting bills fed in both the forward and reverse directions.

Additionally, while all denominations of U.S. currency have the same size, currencies from other countries may vary in size from country to country as well as from denomination to denomination for currency from the same country. In a preferred embodiment of the present invention, variance in size is accommodated by incorporating means for determining the size of a document. These size determining means may include sensors separate from the scanheads or scanning sensors discussed above or alternatively, in some preferred embodiments of the present invention, may include the scanheads or scanning sensors discussed above which are used for the retrieval of scanned characteristic patterns. Based on the size information retrieved from a bill, selected scanheads may be activated, laterally moveable scanheads may be appropriately positioned and activated, and/or selected sensors in a linear array scanhead may be activated to permit scanning along appropriate segments of a bill based on its size. Alternatively, all scanheads or scanning sensors may be activated and the output of appropriately positioned scanheads or scanning sensors may be processed to generate scanned patterns based on the size of a bill. Furthermore, based on the size of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

Likewise, the transport mechanism which transports documents to be scanned past the above described scanheads may be designed to transport documents in a centered manner, left or right justified manner, in a non-controlled lateral positioned manner, in a non-skewed manner, or in a skewed manner. Sensors separate and distinct from the above described scanheads or the above described scanheads themselves may be used to determine the lateral positioning of transported bills and/or their degree of skew. Based on a determination of the laterally positioning of a bill and/or its skew, appropriately positioned scanheads or scanning sensors may be activated or laterally moveable scanheads may be appropriately positioned and activated or the output from appropriately positioned scanheads or scanning sensors may be processed to generate scanned patterns based on the lateral positioning and/or skew of the bill.

Additionally, while all denominations of U.S. currency have the same colors (a "green" side and a "black" side), currencies from other countries may vary in color from country to country as well as from denomination to denomination for currency from the same country. In a preferred embodiment of the present invention, variance in color is accommodated by incorporating means for determining the color of a document. These color determining means may include sensors separate from the scanheads or sensors discussed above or alternatively, in some preferred embodiments of the present invention, may include the appropriately modified scanheads or sensors discussed above which are used for the retrieval of scanned characteristic patterns. For example, colored filters may be placed in front of the above described scanheads or sensors. Based on the color information retrieved from a bill, selected scanheads may be activated, laterally moveable scanheads may be appropriately positioned and activated, and/or selected sensors in a linear array scanhead may be activated to permit scanning along appropriate segments of a bill based on its color. Alternatively, all scanheads or scanning sensors may be activated and the output of appropriately positioned scanheads or scanning sensors may be processed to generate scanned patterns based on the color of a bill. Furthermore, based on the color of a bill, a preliminary determination can be made as to which of a plurality of genuine bill-types a bill under test may potentially match. Based on such a preliminary determination, the comparison of generated scanned patterns can be limited to only master patterns associated with bill-types chosen from the preliminary set of potentially matching bills.

In a preferred embodiment of the present invention, both color and size information may be utilized as described above.

In a preferred embodiment of the present invention, scanheads are positioned on both sides of a document transport path so as to permit scanning of either or both sides of a document.

Furthermore, in accordance with another feature of the present invention, the objectives enumerated above in connection with correlating patterns are achieved by repetitively comparing a scanned pattern with multiple sets of master patterns until a sufficient match is found, or alternatively, by repetitively comparing a set of original master patterns with multiple scanned patterns until a sufficient match is found. The multiple sets of master patterns comprise an original set of master patterns plus one or more sets of modified versions of the original master patterns. The multiple scanned patterns comprise an original scanned pattern plus one or more modified versions of the original scanned patterns. Each modified pattern comprises one or more replicated data values from a corresponding original pattern to which each modified pattern is to be compared. Alternatively, each modified master pattern comprises one or more data values which are set equal to zero.

Briefly, in accordance with a preferred embodiment, an improved method of generating modified scanned or master patterns for use in a discrimination system capable of identifying one or more currency bills is provided. Each of the scanned and master patterns comprises a sequence of data values representing analog variations of characteristic information along a segment of a bill and each pattern has a leading end and a trailing end. Each of the data values has an associated sequence position. The modified scanned or master patterns are generated by designating either the scanned pattern or the master pattern for modification and inserting a predetermined number, R, of data values at either the trailing end of the sequence of data values of the designated pattern when the modification is performed in the forward direction or the leading end of the sequence of data values of the designated pattern when the modification is performed in the backward direction. This modification effectively removes R data values from the leading or trailing end of the designated pattern. Either the last R data values of the designated pattern are set equal to the last R data values of the non-designated pattern when the modification is performed in the forward direction or the first R data values of the designated pattern are set equal to the first R data values of the non-designated pattern when the modification is performed in the backward direction. Alternatively, the modified master patterns are generated by inserting R data samples at the leading or trailing ends of the master patterns and by setting the first R or last R data samples of the modified master pattern equal to zero.

According to a preferred method, a modified scanned pattern is generated by removing a predetermined number of leading or trailing data values of an original scanned pattern. Trailing or leading data values, respectively, are added to the modified scanned pattern with the added data values being copied from corresponding sequence positions of a corresponding master pattern. Alternatively, instead of explicitly removing leading or trailing data values, the leading or trailing data values may be effectively removed by adding data values to the opposite end of the scanned pattern and treating the modified scanned pattern as not including the "removed" leading or trailing data values.

According to another preferred method, a modified master pattern is generated in a similar manner except that added trailing or leading data values of the modified master pattern are set equal to data values copied from corresponding sequence positions of a scanned pattern.

According to another preferred method, a modified master pattern is generated in a similar manner except that added trailing or leading data values of the modified master pattern are set equal to zero.

The above described modified patterns or pattern generation methods may be employed in currency identification systems to compensate for misalignment between scanned and master patterns.

According to another preferred method, a scanned pattern comprising a number of data values is compared with one or more master patterns also comprising a number of data values. The scanned and master patterns represent analog variations in characteristic information retrieved from bills along corresponding segments. For example, the patterns may comprise 64 data values generated by sampling the output of a photodetector as a bill is moved relative to a scanhead, the output of the photodetector representing analog variation in the reflectance of light along a given segment of the bill. If none of the master patterns sufficiently match the scanned pattern, the scanned pattern may be modified and the modified scanned pattern compared to the master patterns. For example, data values #1 and #2 may be removed from the scanned pattern sequence, scanned patterns #3 and #4 may be made the first and second values in the modified sequence with subsequent data values modified accordingly. As a result of such a process, the original data values #63 and #64 now become modified data values #61 and #62. As a result of the above steps an incomplete modified pattern of data values #1–#62 is generated. According to a preferred embodiment, modified data values #63 and #64 are generated by replicating data values #63 and #64 of the master patterns to which the modified scanned pattern is to be compared. If the modified patterns do not sufficiently match any of the master patterns, the modification process may be reiterated except that new scanned modified values #61–#64 are generated by replicating master pattern values #61–#64. This process is repeated until a sufficient match is found or until a predetermined number of modification iterations have occurred.

According to another preferred embodiment, scanned patterns may be modified backwards instead of the forward modification described above.

According to another preferred embodiment, master patterns may be modified instead of scanned patterns. According to this method, data values from scanned patterns are replicated into appropriate locations in modified master pattern sequences.

According to another preferred embodiment, trailing or leading sequence positions of modified master patterns may be filled with zeros instead of replicated data values from a scanned pattern to which modified master patterns are to be compared.

According to another preferred embodiment, modified master patterns with trailing or leading data values equal to zero are stored in a memory of an identification system along with corresponding unmodified master patterns, the master patterns and modified master patterns being stored before a bill under test is scanned by the identification system. When a bill under test is scanned by the identification system it is compared to one or more of the master patterns. If the identity of the bill can not be determined based on this comparison, the scanned pattern is compared with one or more of the modified master patterns. This process can be repeated, with the scanned pattern being compared to multiply modified master patterns if necessary.

According to another preferred embodiment, a currency evaluation device is provided that is able to discriminate among bills of different denominations from two or more currency systems. In a preferred embodiment, such a device is provided that is able to discriminate among both Canadian and German bills of different denominations. In a preferred embodiment, such a device utilizes three scanheads when scanning Canadian bills and a single scanhead when scanning German bills. The device is able to accept faced Canadian and German bills fed in either the forward or reverse directions. According to a preferred embodiment, the operator of the device pre-declares whether Canadian or German bills are to be discriminated. According to a preferred embodiment the measured length of the narrow dimension of German bills is utilized in discriminating German bills. To accommodate for possible lateral shifting of bills relative to the scanhead, multiple German master patterns associated with laterally displaced scans are stored for some denominations. To accommodate for possible lateral shifting of bills relative to the scanheads, multiple Canadian patterns associated with laterally displaced scans are generated and averaged in generated stored Canadian master patterns. To compensate for problems associated with triggering scanning relative to the edge of a bill, multiple patterns are stored for both Canadian and German bills associated with both leading and lagging printed indicia.

BRIEF DESCRIPTION OF THE DRAWING

FIGS. 6a and 6b form a block diagram illustrating a preferred circuit arrangement for processing and correlating reflectance data according to the optical sensing and counting technique of this invention;

DETAILED DESCRIPTION OF THE PREFERRED EMBODIMENTS

Figure 1:
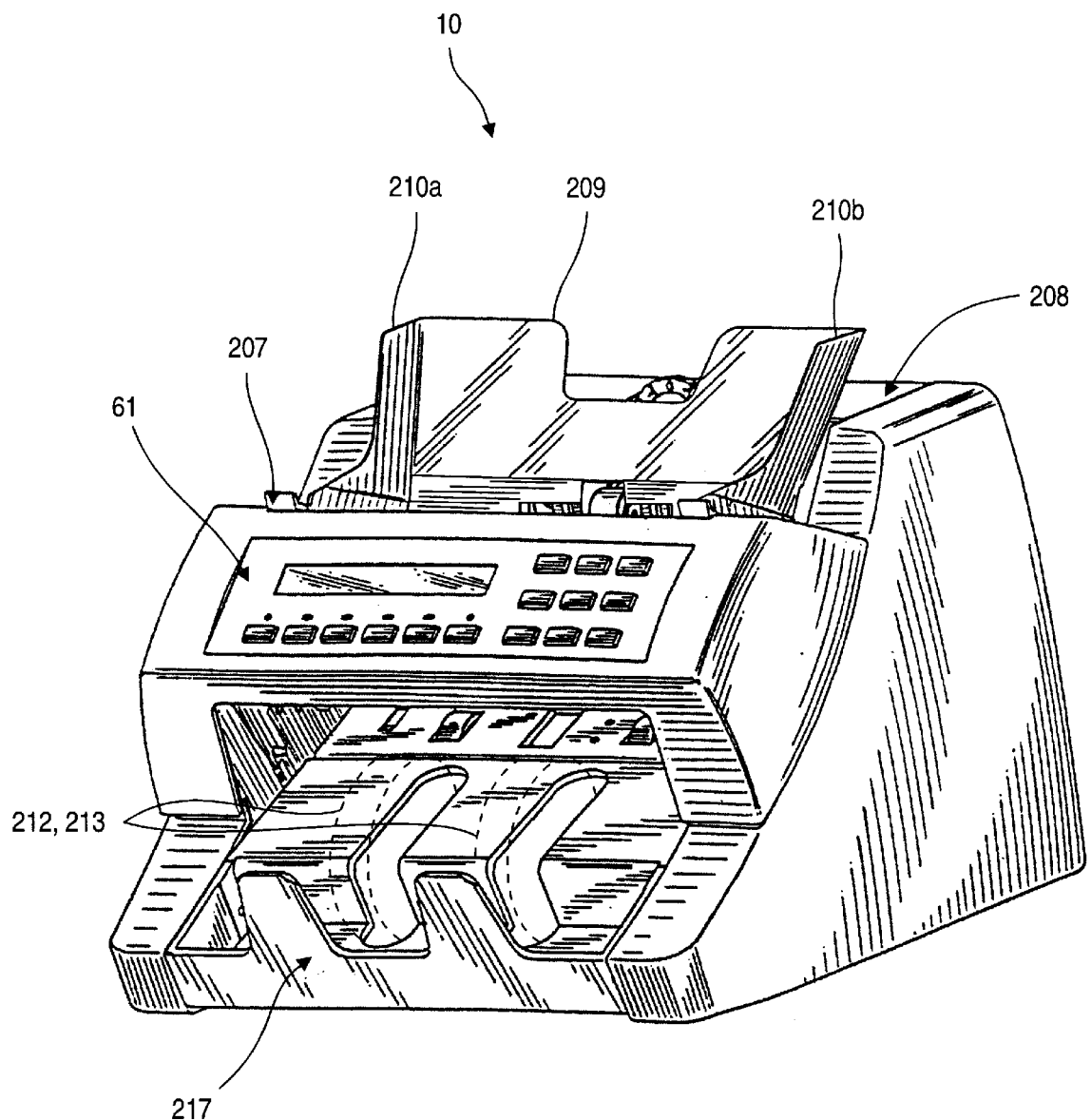
FIG. 1 is a perspective view of a currency scanning and counting machine embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

According to a preferred embodiment of the present invention, a currency discrimination system adapted to U.S. currency is described in connection with, for example, FIGS. 1–38. Subsequently, modifications to such a discrimination system will be described in obtaining a currency discrimination system in accordance with other preferred embodiments of the present invention, such a currency discriminator systems having multiple scanheads per side. Furthermore, while the preferred embodiments below entail the scanning of currency bills, the system of the present invention is applicable to other documents as well. For example, the system of the present invention may be employed in conjunction with stock certificates, bonds, and postage and food stamps.

Figure 2A:
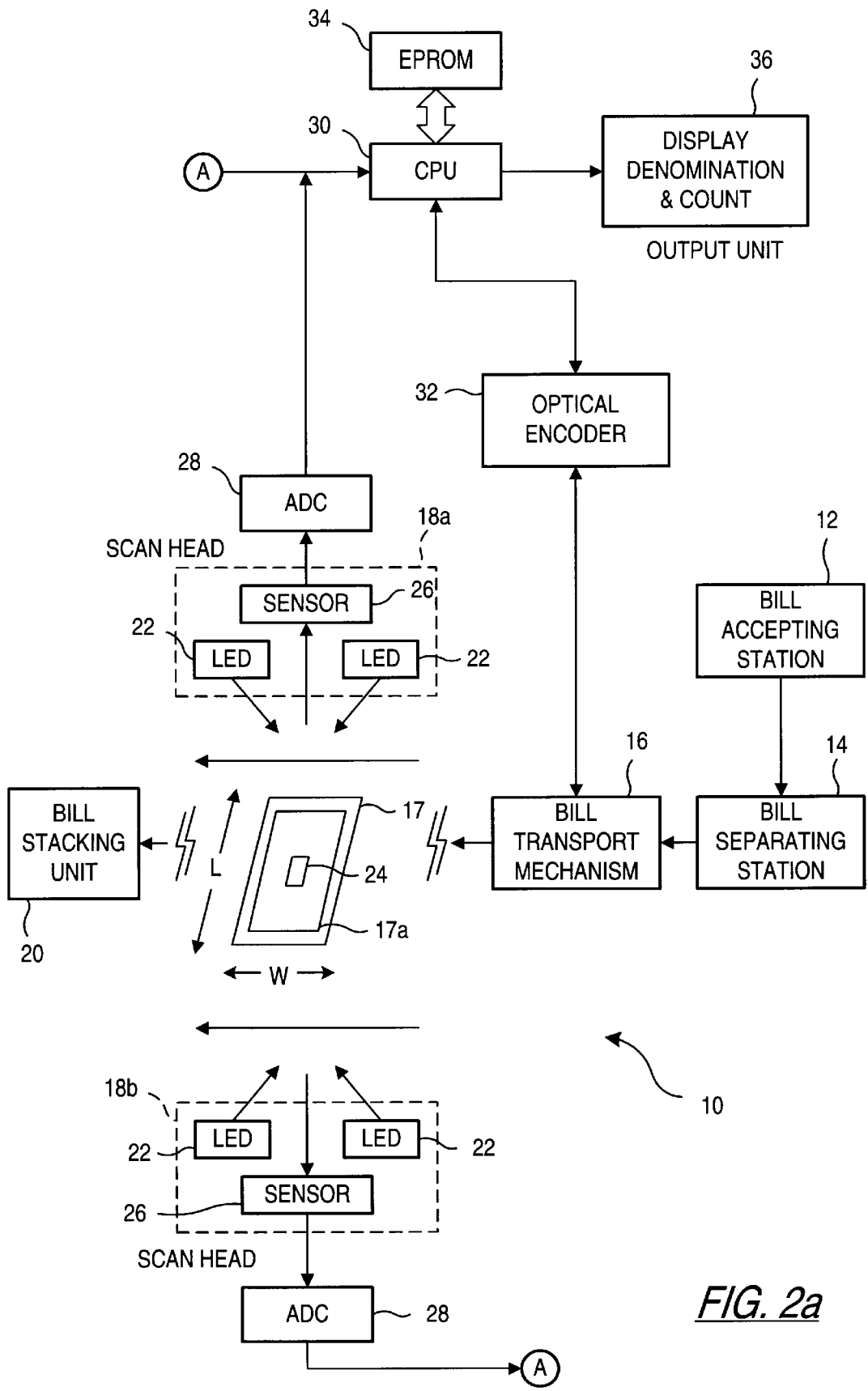
FIG. 2a is a functional block diagram of the currency scanning and counting machine of FIG. 1 illustrating a scanhead arranged on each side of a transport path.

Referring now to FIGS. 1 and 2a, there is shown a preferred embodiment of a currency scanning and counting machine 10 according to the present invention. The machine 10 includes an input receptacle or bill accepting station 12 where stacks of currency bills that need to be identified and counted are positioned. Bills in the input receptacle are acted upon by a bill separating station 14 which functions to pick out or separate one bill at a time for being sequentially relayed by a bill transport mechanism 16 (FIG. 2a), according to a precisely predetermined transport path, between a pair of scanheads 18a, 18b where the currency denomination of the bill is scanned and identified. In the preferred embodiment depicted, each scanhead 18a, 18b is an optical scanhead that scans for characteristic information from a scanned bill 17 which is used to identify the denomination of the bill. The scanned bill 17 is then transported to an output receptacle or bill stacking station 20 where bills so processed are stacked for subsequent removal.

Each optical scanhead 18a, 18b preferably comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a central processing unit (CPU) 30.

While scanheads 18a, 18b of FIG. 2 are optical scanheads, it should be understood that it may be designed to detect a variety of characteristic information from currency bills. Additionally, the scanhead may employ a variety of detection means such as magnetic, optical, electrical conductivity, and capacitive sensors. Use of such sensors is discussed in more detail U.S. patent application Ser. No. 08/219,093 filed on Mar. 29, 1994 for a "Currency Discriminator and Authenticator" and incorporated herein by reference.

Referring again to FIG. 2a, the bill transport path is defined in such a way that the transport mechanism 16 moves currency bills with the narrow dimension of the bills being parallel to the transport path and the scan direction. Alternatively, the system 10 may be designed to scan bills along their long dimension or along a skewed dimension. As a bill 17 traverses the scanheads 18a, 18b, the coherent light strip 24 effectively scans the bill across the narrow dimension of the bill. In the preferred embodiment depicted, the transport path is so arranged that a currency bill 17 is scanned across a central section of the bill along its narrow dimension, as shown in FIG. 2a. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations.

In order to ensure strict correspondence between reflectance samples obtained by narrow dimension scanning of successive bills, the reflectance sampling process is preferably controlled through the CPU 30 by means of an optical encoder 32 which is linked to the bill transport mechanism 16 and precisely tracks the physical movement of the bill 17 between the scanheads 18a, 18b. More specifically, the optical encoder 32 is linked to the rotary motion of the drive motor which generates the movement imparted to the bill along the transport path. In addition, the mechanics of the feed mechanism ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18a, 18b by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17a which typically encloses the printed indicia on currency bills. Once the borderline 17a has been detected, the optical encoder 32 is used to control the timing and number of reflectance samples that are obtained from the outputs of the photodetectors 26 as the bill 17 moves across the scanheads.

Figure 2B:
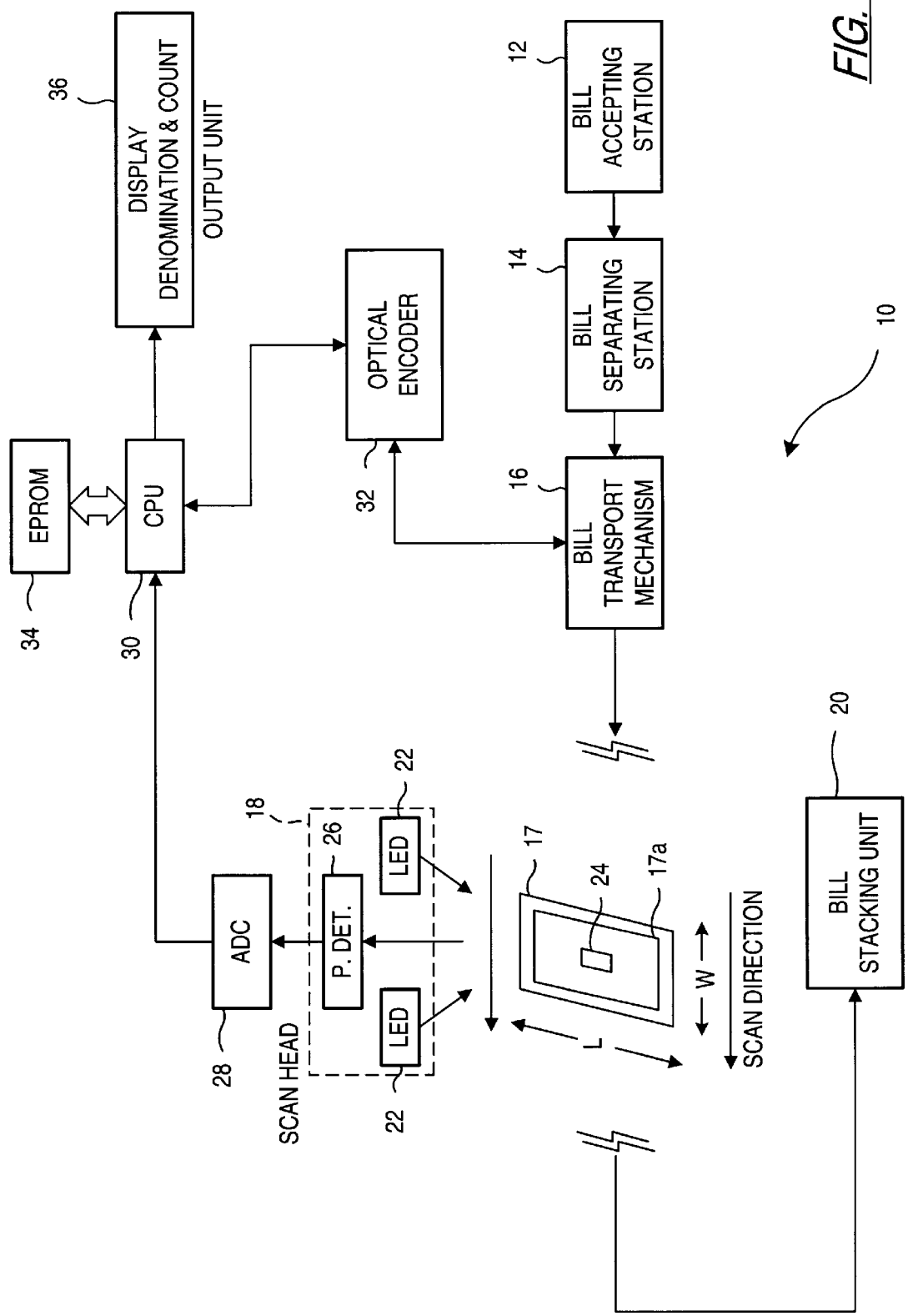
FIG. 2b is a functional block diagram of the currency scanning and counting machine illustrating a scanhead arranged on a single side of a transport path.

FIG. 2b illustrates a preferred embodiment of a currency scanning and counting machine 10 similar to that of FIG. 2a but having a scanhead on only a single side of the transport path.

According to one preferred embodiment, the detection of the borderline 17a constitutes an important step and realizes improved discrimination efficiency in systems designed to accommodate U.S. currency since the borderline 17a serves as an absolute reference point for initiation of sampling. If the edge of a bill were to be used as a reference point, relative displacement of sampling points can occur because of the random manner in which the distance from the edge to the borderline 17a varies from bill to bill due to the relatively large range of tolerances permitted during printing and cutting of currency bills. As a result, it becomes difficult to establish direct correspondence between sample points in successive bill scans and the discrimination efficiency is adversely affected. Accordingly, the modified pattern generation method of the present invention (to be discussed below) is especially important in discrimination systems designed to accommodate bills other than U.S. currency because many non-U.S. bills lack a borderline around the printed indicia on their bills. Likewise, the modified pattern generation method of the present invention is especially important in discrimination systems designed to accommodate bills other than U.S. currency because the printed indicia of many non-U.S. bills lack sharply defined edges which in turns inhibits using the edge of the printed indicia of a bill as a trigger for the initiation of the scanning process and instead promotes reliance on using the edge of the bill itself as the trigger for the initiation of the scanning process.

The use of the optical encoder 32 for controlling the sampling process relative to the physical movement of a bill 17 across the scanheads 18a, 18b is also advantageous in that the encoder 32 can be used to provide a predetermined delay following detection of the borderline 17a prior to initiation of samples. The encoder delay can be adjusted in such a way that the bill 17 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations. Accordingly, the optical encoder can be used to control the scanning process so that reflectance samples are taken for a set period of time and only after a certain period of time has elapsed after the borderline 17a is detected, thereby restricting the scanning to the desired central portion of the narrow dimension of the bill.

Figure 3:
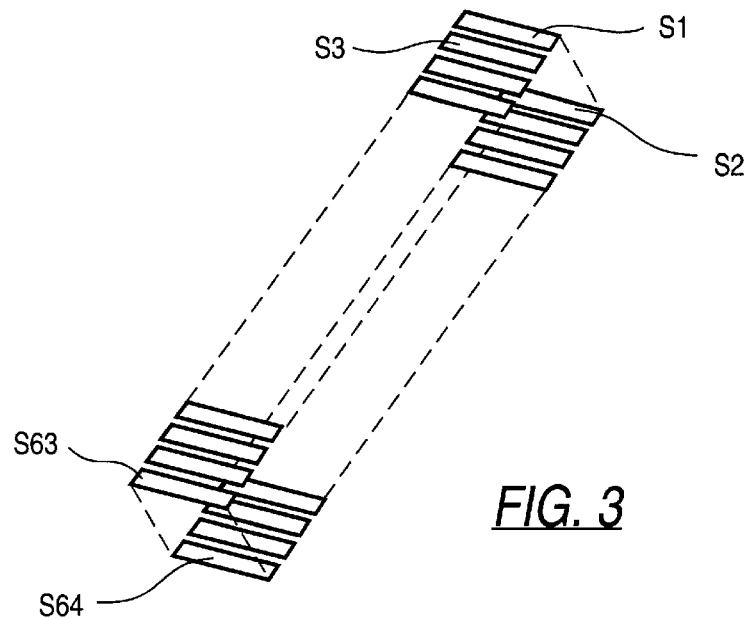
FIG. 3 is a diagrammatic perspective illustration of the successive areas scanned during the traversing movement of a single bill across an optical sensor according to a preferred embodiment of the present invention.
Figure 4:
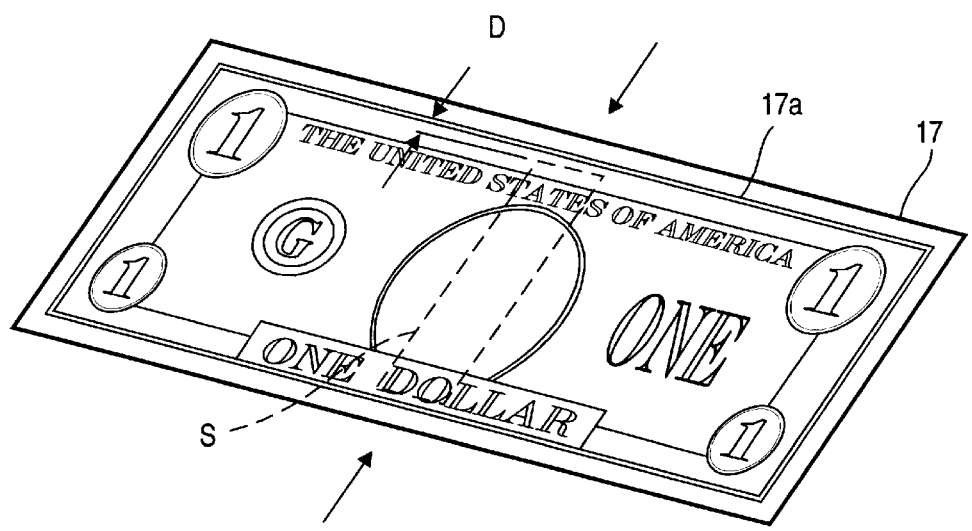
FIG. 4 is a perspective view of a bill and a preferred area to be optically scanned on the bill.
Figure 5:
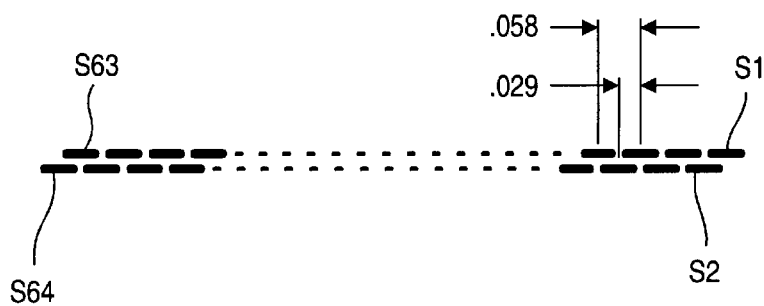
FIG. 5 is a diagrammatic side elevation view of the scan area to be optically scanned on a bill according to a preferred embodiment of the present invention.

FIGS. 3–5 illustrate the scanning process in more detail. Referring to FIG. 4, as a bill 17 is advanced in a direction parallel to the narrow edges of the bill, scanning via a slit in the scanhead 18a or 18b is effected along a segment S of the central portion of the bill 17. This segment S begins a fixed distance D inboard of the borderline 17a. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 3 and 5, it is preferred that the sampling intervals be selected so that the strips s that are illuminated for successive samples overlap one another. The odd-numbered and even-numbered sample strips have been separated in FIGS. 3 and 5 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

The optical sensing and correlation technique is based upon using the above process to generate a series of stored intensity signal patterns using genuine bills for each denomination of currency that is to be detected. According to a preferred embodiment, two or four sets of master intensity signal samples are generated and stored within the system memory, preferably in the form of an EPROM 34 (see FIG. 2), for each detectable currency denomination. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill. In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $10 bill and/or the $2 bill in U.S. currency, it is preferred to store two patterns for each of the "forward" and "reverse" directions, each pair of patterns for the same direction represent two scan areas that are slightly displaced from each other along the long dimension of the bill. Accordingly, a set of 16 [or 18] different master characteristic patterns are stored within the EPROM for subsequent correlation purposes (four master patterns for the $10 bill [or four master patterns for the $10 bill and the $2 bill] and two master patterns for each of the other denominations). The generation of the master patterns is discussed in more detail in co-pending United States patent application Ser. No. 08/243,807 filed May 16, 1994, for a "Method and Apparatus for Currency Discrimination." Once the master patterns have been stored, the pattern generated by scanning a bill under test is compared by the CPU 30 with each of the 16 [or 18] master patterns of stored intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. If a "positive" call can not be made for a scanned bill, an error signal is generated.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 (FIGS. 2a and FIG. 2b) which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Referring now to FIGS. 6a and 6b, there is shown a representation, in block diagram form, of a preferred circuit arrangement for processing and correlating reflectance data according to the system of this invention. The CPU 30 accepts and processes a variety of input signals including those from the optical encoder 32, the sensor 26 and the erasable programmable read only memory (EPROM) 60. The EPROM 60 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ 42 on the basis of which peak detection of sensed reflectance data is performed.

According to one embodiment, the CPU 30 also accepts a timer reset signal from a reset unit 44 which, as shown in FIG. 6b, accepts the output voltage from the photodetector 26 and compares it, by means of a threshold detector 44a, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 2) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

The machine-direction dimension, that is, the dimension parallel to the direction of bill movement, of the illuminated strip of light produced by the light sources within the scanhead is set to be relatively small for the initial stage of the scan when the thin borderline is being detected. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples, at a rapid rate. The use of a wider slit for the actual sampling also smooths out the output characteristics of the photodetector and realizes the relatively large magnitude of analog voltage which is essential for accurate representation and processing of the detected reflectance values.

The CPU 30 processes the output of the sensor 26 through a peak detector 50 which essentially functions to sample the sensor output voltage and hold the highest, i.e., peak, voltage value encountered after the detector has been enabled. For U.S. currency, the peak detector is also adapted to define a scaled voltage on the basis of which the printed borderline on the currency bills is detected. The output of the peak detector 50 is fed to a voltage divider 54 which lowers the peak voltage down to a scaled voltage $V_S$ representing a predefined percentage of this peak value. The voltage $V_S$ is based upon the percentage drop in output voltage of the peak detector as it reflects the transition from "high" reflectance value resulting from the scanning of the unprinted edge portions of a currency bill to the relatively lower "gray" reflectance value resulting when the thin borderline is encountered. Preferably, the scaled voltage $V_S$ is set to be about 70–80 percent of the peak voltage The scaled voltage $V_S$ is supplied to a line detector 56 which is also provided with the incoming instantaneous output of the sensor 26. The line detector 56 compares the two voltages at its input side and generates a signal $L_{DET}$ which normally stays "low" and goes "high" when the edge of the bill is scanned. The signal $L_{DET}$ goes "low" when the incoming sensor output reaches the pre-defined percentage of the peak output up to that point, as represented by the voltage $V_S$. Thus, when the signal $L_{DET}$ goes "low", it is an indication that the borderline of the bill pattern has been detected. At this point, the CPU 30 initiates the actual reflectance sampling under control of the encoder 32 and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is preferably an EPROM. During currency discrimination, the reflectance values resulting from the scanning of a test bill are sequentially compared, under control of the correlation program stored within the EPROM 60, with the corresponding master characteristic patterns stored within the EPROM 60. A pattern averaging procedure for scanning bills and generating characteristic patterns is described in co-pending U.S. patent application Ser. No. 08/243,807, filed on May 16, 1994 and entitled "Method and Apparatus for Currency Discrimination," which is incorporated herein by reference.

In addition to the optical scanheads, the bill-scanning system preferably includes a magnetic scanhead. A variety of currency characteristics can be measured using magnetic scanning. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

The denomination determined by optical scanning of a bill is preferably used to facilitate authentication of the bill by magnetic scanning, using the relationship set forth in Table 1.

TABLE 1

| Sensitivity Denomination | 1 | 2 | 3 | 4 | 5 |
|---|---|---|---|---|---|
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

Table 1 depicts relative total magnetic content thresholds for various denominations of genuine bills. Columns 1–5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

In order to avoid problems associated with re-feeding bills, counting bills by hand, and adding together separate totals, according to a preferred embodiment of the present invention a number of selection elements associated with individual denominations are provided. In FIG. 1, these selection elements are in the form of keys or buttons of a keypad. Other types of selection elements such as switches or displayed keys in a touch-screen environment may be employed. Before describing the operation of the selection elements in detail, their operation will be briefly described. When an operator determines that a suspect or no call bill is acceptable, the operator may simply depress the selection element associated with the denomination of the suspect or no call bill and the corresponding denomination counter and/or the total value counter are appropriately incremented and the discriminator resumes operating again. In non-automatic restart discriminators, where an operator has removed a genuine suspect or no call bill from the output receptacle for closer examination, the bill is first replaced into the output receptacle before a corresponding selection element is chosen. When an operator determines that a suspect or no call bill is not acceptable, the operator may remove the unacceptable bill from the output receptacle without replacement and depress a continuation key on the keypad. When the continuation key is selected the denomination counters and the total value counter are not affected and the discriminator will resume operating again. An advantage of the above described procedure is that appropriate counters are incremented and the discriminator is restarted with the touch of a single key, greatly simplifying the operation of the discriminator while reducing the opportunities for human error.

Figure 7:
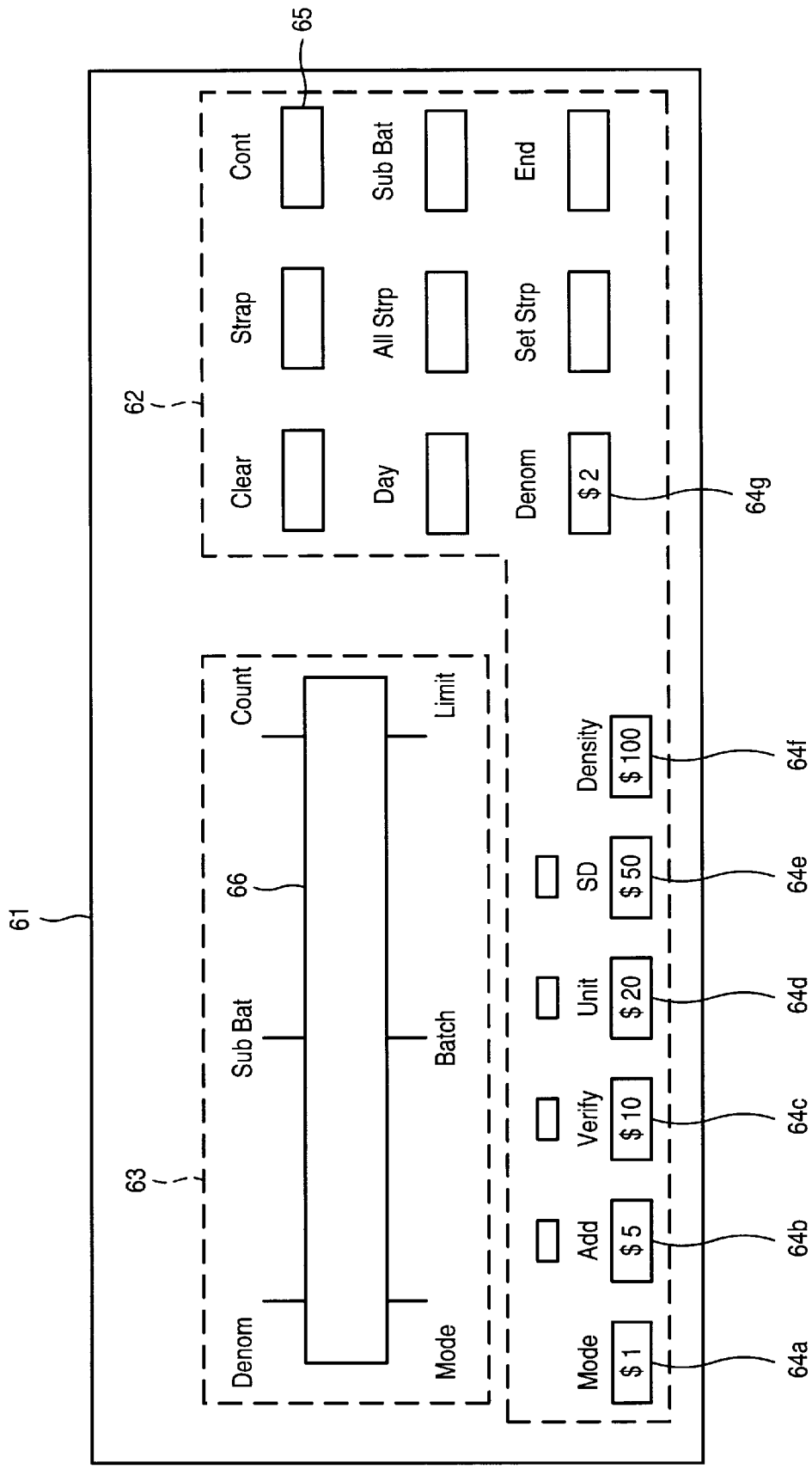
FIG. 7 is an enlarged plan view of the control and display panel in the machine of FIG. 1.

The operation of the selection elements will now be described in more detail in conjunction with FIG. 7 which is a front view of a control panel 61 of a preferred embodiment of the present invention. The control panel 61 comprises a keypad 62 and a display section 63. The keypad 62 comprises a plurality of keys including seven denomination selection elements 64a–64g, each associated with one of seven U.S. currency denominations, i.e., $1, $2, $5, $10, $20, $50, and $100. The $1 denomination selection key 64a also serves as a mode selection key. The keypad 62 also comprises a "Continuation" selection element 65. Various information such as instructions, mode selection information, authentication and discrimination information, individual denomination counter values, and total batch counter value are communicated to the operator via an LCD 66 in the display section 63. The operation of a discriminator having the denomination selection elements 64a–64g and the continuation element 65 will now be discussed in connection with several operating modes, including a mixed mode, a stranger mode, a sort mode, a face mode, and a forward/reverse orientation mode.

(A) Mixed Mode

Mixed mode is designed to accept a stack of bills of mixed denomination, total the aggregate value of all the bills in the stack and display the aggregate value in the display 63. Information regarding the number of bills of each individual denomination in a stack may also be stored in denomination counters. When an otherwise acceptable bill remains unidentified after passing through the authenticating and discriminating unit, operation of the discriminator may be resumed and the corresponding denomination counter and/or the aggregate value counter may be appropriately incremented by selecting the denomination selection key 64a–64g associated with the denomination of the unidentified bill. For example, if the discriminator stops operation with an otherwise acceptable $5 bill being the last bill deposited in the output receptacle, the operator may simply select key 64b. When key 64b is depressed, the operation of the discriminator is resumed and the $5 denomination counter is incremented and/or the aggregate value counter is incremented by $5. Otherwise, if the operator determines the no call or suspect bill is unacceptable, the bill may be removed from the output receptacle. The continuation key 65 is depressed after the unacceptable bill is removed, and the discriminator resumes operation without affecting the total value counter and/or the individual denomination counters.

(B) Stranger Mode

Stranger mode is designed to accommodate a stack of bills all having the same denomination, such as a stack of $10 bills. In such a mode, when a stack of bills is processed by the discriminator the denomination of the first bill in the stack is determined and subsequent bills are flagged if they are not of the same denomination. Alternatively, the discriminator may be designed to permit the operator to designate the denomination against which bills will be evaluated with those of a different denomination being flagged. Assuming the first bill in a stack determines the relevant denomination and assuming the first bill is a $10 bill, then provided all the bills in the stack are $10 bills, the display 63 will indicate the aggregate value of the bills in the stack and/or the number of $10 bills in the stack. However, if a bill having a denomination other than $10 is included in the stack, the discriminator will stop operating with the non-$10 bill or "stranger bill" being the last bill deposited in the output receptacle. The stranger bill may then be removed from the output receptacle and the discriminator is started again by depression of the "Continuation" key 65. An unidentified but otherwise acceptable $10 bill may be handled in a manner similar to that described above in connection with the mixed mode, e.g., by depressing the $10 denomination selection element 64c, or alternatively, the unidentified but otherwise acceptable $10 bill may be removed from the output receptacle and placed into the input hopper to be re-scanned. Upon the completion of processing the entire stack, the display 63 will indicate the aggregate value of the $10 bills in the stack and/or the number of $10 bills in the stack. All bills having a denomination other than $10 will have been set aside and will not be included in the totals. Alternatively, these stranger bills can be included in the totals via operator selection choices. For example, if a $5 stranger bill is detected and flagged in a stack of $10 bills, the operator may be prompted via the display as to whether the $5 bill should be incorporated into the running totals. If the operator responds positively, the $5 bill is incorporated into appropriate running totals, otherwise it is not. Alternatively, a set-up selection may be chosen whereby all stranger bills are automatically incorporated into appropriate running totals.

(C) Sort Mode

Sort mode is designed to accommodate a stack of bills wherein the bills are separated by denomination. For example, all the $1 bills may be placed at the beginning of the stack, followed by all the $5 bills, followed by all the $10 bills, etc. The operation of the sort mode is similar to that of the stranger mode except that after stopping upon the detection of a different denomination bill, the discriminator is designed to resume operation upon removal of all bills from the output receptacle. Returning to the above example, assuming the first bill in a stack determines the relevant denomination and assuming the first bill is a $1 bill, then the discriminator processes the bills in the stack until the first non-$1 bill is detected, which in this example is the first $5 bill. At that point, the discriminator will stop operating with the first $5 being the last bill deposited in the output receptacle. The display 63 may be designed to indicate the aggregate value of the preceding $1 bills processed and/or the number of preceding $1 bills. The scanned $1 bills and the first $5 bill are removed from the output receptacle and placed in separate $1 and $5 bill stacks. The discriminator will start again automatically and subsequent bills will be assessed relative to being $5 bills. The discriminator continues processing bills until the first $10 bill is encountered. The above procedure is repeated and the discriminator resumes operation until encountering the first bill which is not a $10 bill, and so on. Upon the completion of processing the entire stack, the display 63 will indicate the aggregate value of all the bills in the stack and/or the number of bills of each denomination in the stack. This mode permits the operator to separate a stack of bills having multiple denominations into separate stacks according to denomination.

(D) Face Mode

Face mode is designed to accommodate a stack of bills all faced in the same direction, e.g., all placed in the input hopper face up (that is the portrait or black side up for U.S. bills) and to detect any bills facing the opposite direction. In such a mode, when a stack of bills is processed by the discriminator, the face orientation of the first bill in the stack is determined and subsequent bills are flagged if they do not have the same face orientation. Alternatively, the discriminator may be designed to permit designation of the face orientation to which bills will be evaluated with those having a different face orientation being flagged. Assuming the first bill in a stack determines the relevant face orientation and assuming the first bill is face up, then provided all the bills in the stack are face up, the display 63 will indicate the aggregate value of the bills in the stack and/or the number of bills of each denomination in the stack. However, if a bill faced in the opposite direction (i.e., face down in this example) is included in the stack, the discriminator will stop operating with the reverse-faced bill being the last bill deposited in the output receptacle. The reverse-faced bill then may be removed from the output receptacle. The reverse-faced bill may be either placed into the input receptacle with the proper face orientation and the continuation key 65 depressed, or placed back into the output receptacle with the proper face orientation. Depending on the set up of the discriminator when a bill is placed back into the output receptacle with the proper face orientation, the denomination selection key associated with the reverse-faced bill may be selected, whereby the associated denomination counter and/or aggregate value counter are appropriately incremented and the discriminator resumes operation. Alternatively, in embodiments wherein the discriminator is capable of determining denomination regardless of face orientation, the continuation key 65 or a third key may be depressed whereby the discriminator resumes operation and the appropriate denomination counter and/or total value counter is incremented in accordance with the denomination identified by the discriminating unit. The ability to detect and correct for reverse-faced bills is important as the Federal Reserve requires currency it receives to be faced in the same direction.

(E) Forward/Reverse Orientation Mode

Forward/Reverse Orientation mode ("Orientation" mode) is designed to accommodate a stack of bills all oriented in a predetermined forward or reverse orientation direction. The forward direction may be defined as the fed direction whereby the top edge of a bill is fed first and conversely for the reverse direction. In such a mode, when a stack of bills is processed by the discriminator, the forward/reverse orientation of the first bill in the stack is determined and subsequent bills are flagged if they do not have the same forward/reverse orientation. Alternatively, the discriminator may be designed to permit the operator to designate the forward/reverse orientation against which bills will be evaluated with those having a different forward/reverse orientation being flagged. Assuming the first bill in a stack determines the relevant forward/reverse orientation and assuming the first bill is fed in the forward direction, then provided all the bills in the stack are also fed in the forward direction, the display 63 will indicate the aggregate value of the bills in the stack and/or the number of bills of each denomination in the stack. However, if a bill having the opposite forward/reverse direction is included in the stack, the discriminator will stop operating with the opposite forward/reverse oriented bill being the last bill deposited in the output receptacle. The opposite forward/reverse oriented bill then may be removed from the output receptacle. The opposite forward/reverse oriented bill then may be either placed into the input receptacle with the proper forward/reverse orientation and the continuation key 65 depressed, or placed back into the output receptacle with the proper forward/reverse orientation. Depending on the set up of the discriminator when a bill is placed back into the output receptacle with the proper forward/reverse orientation, the denomination selection key associated with the opposite forward/reverse oriented bill may be selected, whereby the associated denomination counter and/or aggregate value counter are appropriately incremented and the discriminator resumes operation. Alternatively, in embodiments wherein the discriminator is capable of determining denomination regardless of forward/reverse orientation, the continuation key 65 or a the third key may be depressed whereby the discriminator resumes operation and the appropriate denomination counter and/or total value counter is incremented in accordance with the denomination identified by the discriminating unit. The ability to detect and correct for reverse-oriented bills is important as the Federal Reserve may soon require currency it receives to be oriented in the same forward/reverse direction.

Suspect Mode

In addition to the above modes, a suspect mode may be activated in connection with these modes whereby one or more authentication tests may be performed on the bills in a stack. When a bill fails an authentication test, the discriminator will stop with the failing or suspect bill being the last bill transported to the output receptacle. The suspect bill then may be removed from the output receptacle and set aside.

Likewise, one or more of the above described modes may be activated at the same time. For example, the face mode and the forward/reverse orientation mode may be activated at the same time. In such a case, bills that are either reverse-faced or opposite forward/reverse oriented will be flagged.

Figure 8:
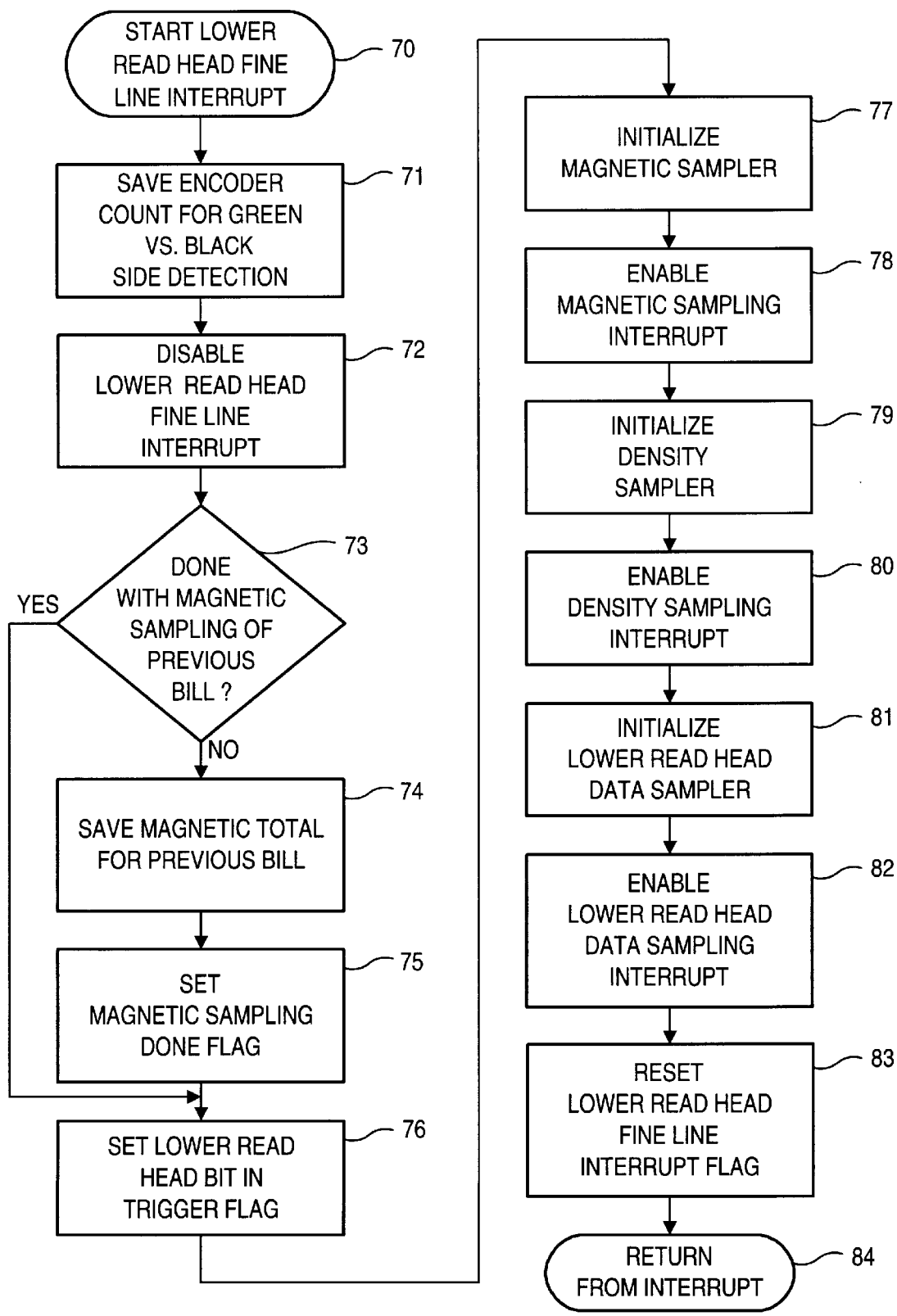
FIG. 8 is a flow chart illustrating the sequential procedure involved in detecting the presence of a bill adjacent the lower scanhead and the borderline on the side of the bill adjacent to the lower scanhead.
Figure 9:
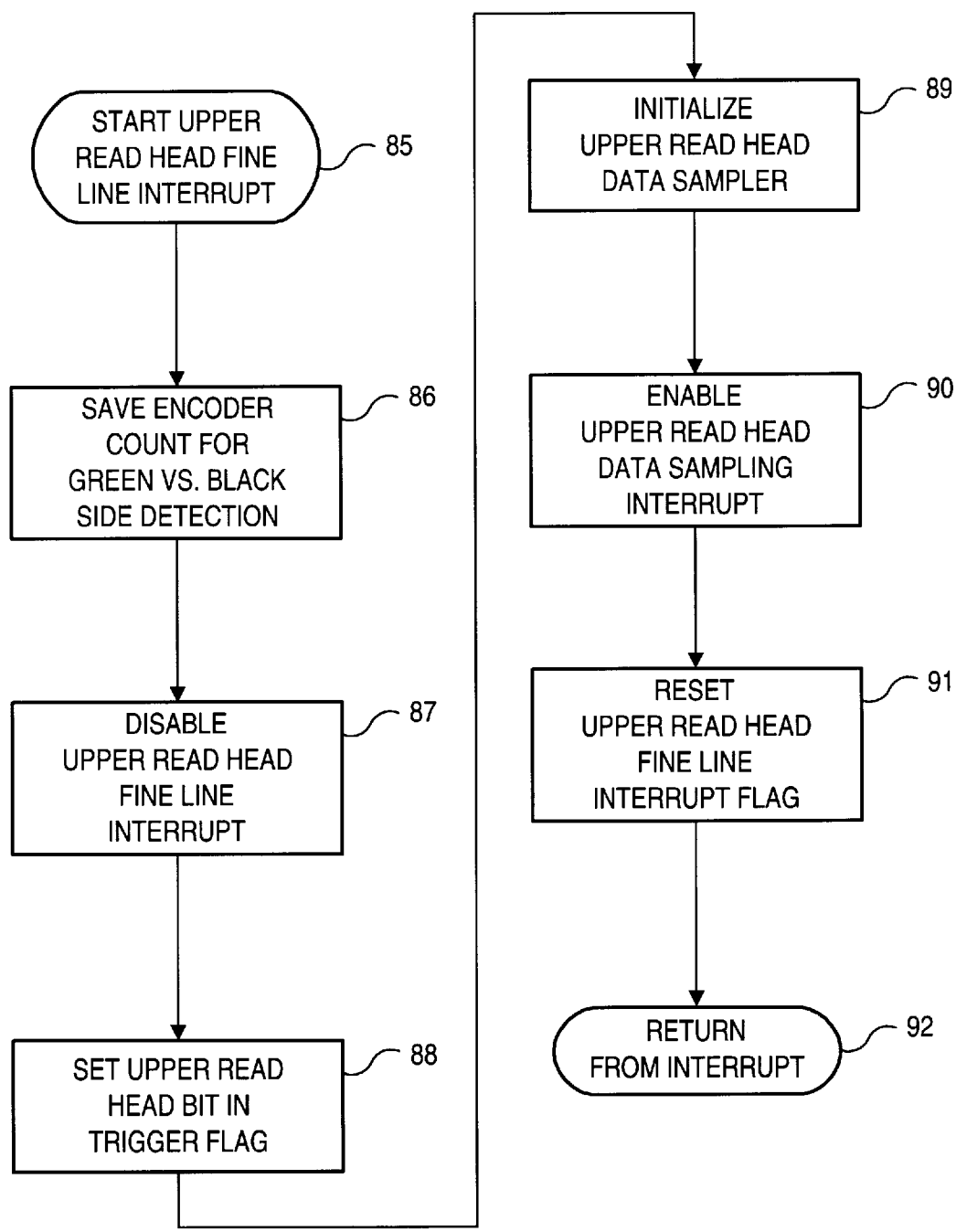
FIG. 9 is a flow chart illustrating the sequential procedure involved in detecting the presence of a bill adjacent the upper scanhead and the borderline on the side of the bill adjacent to the upper scanhead.

Referring now to FIGS. 8–11, there are shown flow charts illustrating the sequence of operations involved in implementing the above-described optical sensing and correlation technique. FIGS. 8 and 9, in particular, illustrate the sequences involved in detecting the presence of a bill adjacent the scanheads and the borderlines on each side of the bill. Turning to FIG. 8, at step 70, the lower scanhead fine line interrupt is initiated upon the detection of the fine line by the lower scanhead. An encoder counter is maintained that is incremented for each encoder pulse. The encoder counter scrolls from 0–65,535 and then starts at 0 again. At step 71 the value of the encoder counter is stored in memory upon the detection of the fine line by the lower scanhead. At step 72 the lower scanhead fine line interrupt is disabled so that it will not be triggered again during the interrupt period. At step 73, it is determined whether the magnetic sampling has been completed for the previous bill. If it has not, the magnetic total for the previous bill is stored in memory at step 74 and the magnetic sampling done flag is set at step 75 so that magnetic sampling of the present bill may thereafter be performed. Steps 74 and 75 are skipped if it is determined at step 73 that the magnetic sampling has been completed for the previous bill. At step 76, a lower scanhead bit in the trigger flag is set. This bit is used to indicate that the lower scanhead has detected the fine line. The magnetic sampler is initialized at step 77 and the magnetic sampling interrupt is enabled at step 78. A density sampler is initialized at step 79 and a density sampling interrupt is enabled at step 80. The lower read data sampler is initialized at step 81 and a lower scanhead data sampling interrupt is enabled at step 82. At step 83, the lower scanhead fine line interrupt flag is reset and at step 84 the program returns from the interrupt.

Turning to FIG. 9, at step 85, the upper scanhead fine line interrupt is initiated upon the detection of the fine line by the upper scanhead. At step 86 the value of the encoder counter is stored in memory upon the detection of the fine line by the upper scanhead. This information in connection with the encoder counter value associated with the detection of the fine line by the lower scanhead may then be used to determine the face orientation of a bill, that is whether a bill is fed green side up or green side down in the case of U.S. bills as is described in more detail below in connection with FIG. 12. At step 87 the upper scanhead fine line interrupt is disabled so that it will not be triggered again during the interrupt period. At step 88, the upper scanhead bit in the trigger flag is set. This bit is used to indicate that the upper scanhead has detected the fine line. By checking the lower and upper scanhead bits in the trigger flag it can be determined whether each side has detected a respective fine line. Next, the upper scanhead data sampler is initialized at step 89 and the upper scanhead data sampling interrupt is enabled at step 90. At step 91, the upper scanhead fine line interrupt flag is reset and at step 92 the program returns from the interrupt.

Figure 10:
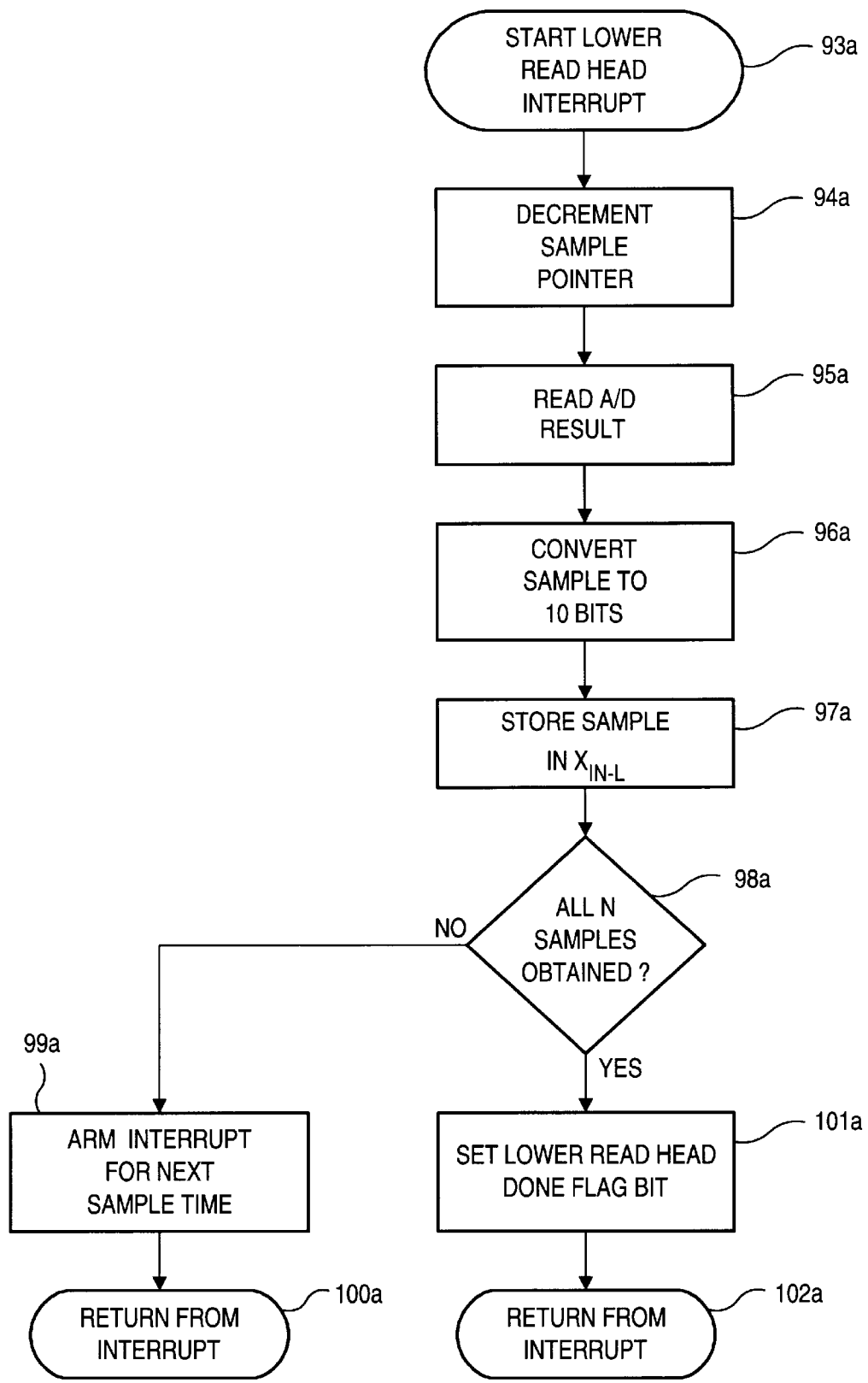
FIG. 10 is a flow chart illustrating the sequential procedure involved in the analog-to-digital conversion routine associated with the lower scanhead.
Figure 11:
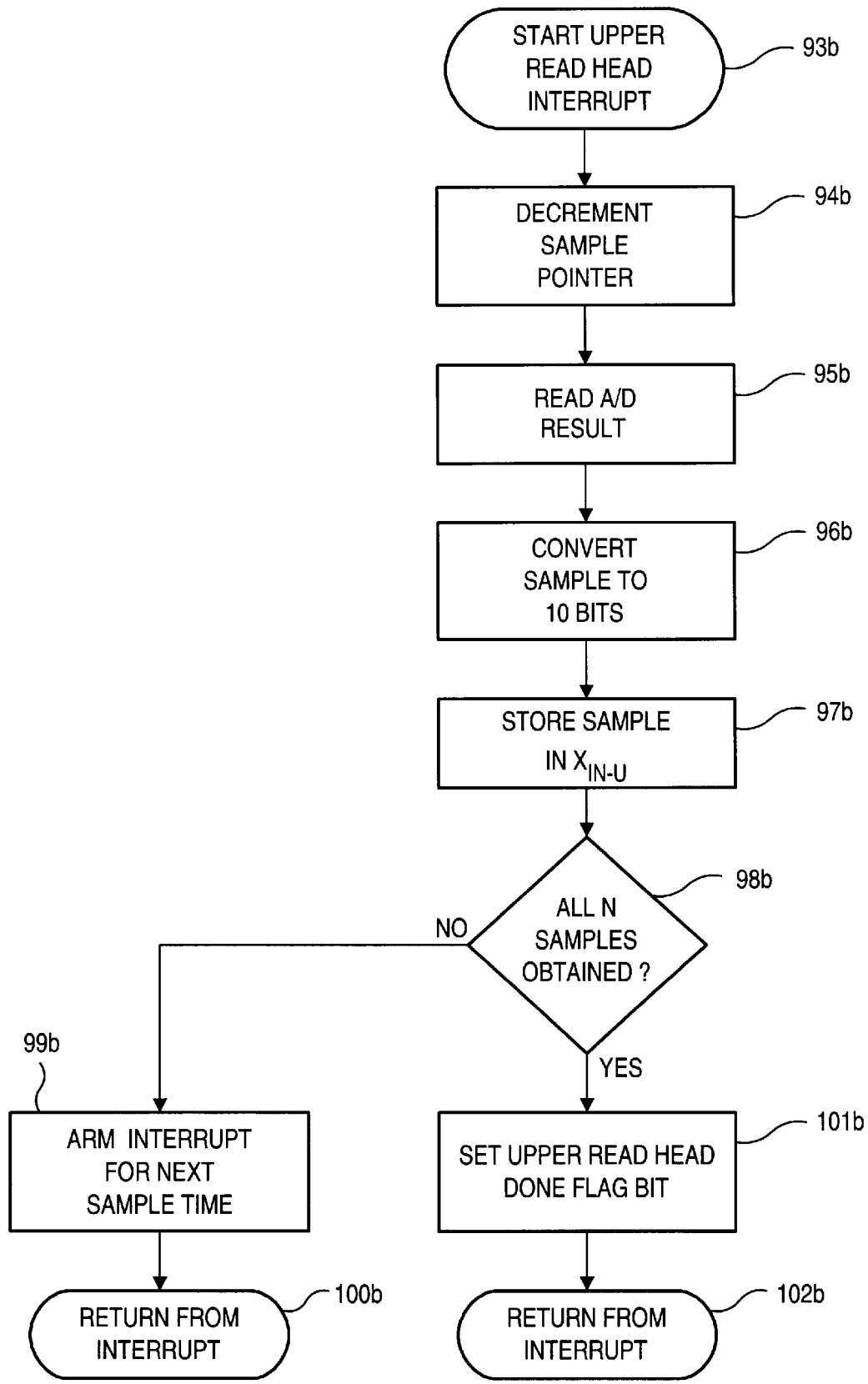
FIG. 11 is a flow chart illustrating the sequential procedure involved in the analog-to-digital conversion routine associated with the upper scanhead.

Referring now to FIGS. 10 and 11 there are shown, respectively, the digitizing routines associated with the lower and upper scanheads. FIG. 10 is a flow chart illustrating the sequential procedure involved in the analog-to-digital conversion routine associated with the lower scanhead. The routine is started at step 93a. Next, the sample pointer is decremented at step 94a so as to maintain an indication of the number of samples remaining to be obtained. The sample pointer provides an indication of the sample being obtained and digitized at a given time. At step 95a, the digital data corresponding to the output of the photodetector associated with the lower scanhead for the current sample is read. The data is converted to its final form at step 96a and stored within a pre-defined memory segment as $X_{IN-L}$ at step 97a.

Next, at step 98a, a check is made to see if the desired fixed number of samples "N" has been taken. If the answer is found to be negative, step 99a is accessed where the interrupt authorizing the digitization of the succeeding sample is enabled and the program returns from interrupt at step 100a for completing the rest of the digitizing process. However, if the answer at step 98a is found to be positive, i.e., the desired number of samples have already been obtained, a flag, namely the lower scanhead done flag bit, indicating the same is set at step 101a and the program returns from interrupt at step 102a.

FIG. 11 is a flow chart illustrating the sequential procedure involved in the analog-to-digital conversion routine associated with the upper scanhead. The routine is started at step 93b. Next, the sample pointer is decremented at step 94b so as to maintain an indication of the number of samples remaining to be obtained. The sample pointer provides an indication of the sample being obtained and digitized at a given time. At step 95b, the digital data corresponding to the output of the photodetector associated with the upper scanhead for the current sample is read. The data is converted to its final form at step 96b and stored within a pre-defined memory segment as $X_{IN-U}$ at step 97b.

Next, at step 98b, a check is made to see if the desired fixed number of samples "N" has been taken. If the answer is found to be negative, step 99b is accessed where the interrupt authorizing the digitization of the succeeding sample is enabled and the program returns from interrupt at step 100b for completing the rest of the digitizing process. However, if the answer at step 98b is found to be positive, i.e., the desired number of samples have already been obtained, a flag, namely the upper scanhead done flag bit, indicating the same is set at step 101b and the program returns from interrupt at step 102b.

Figure 12:
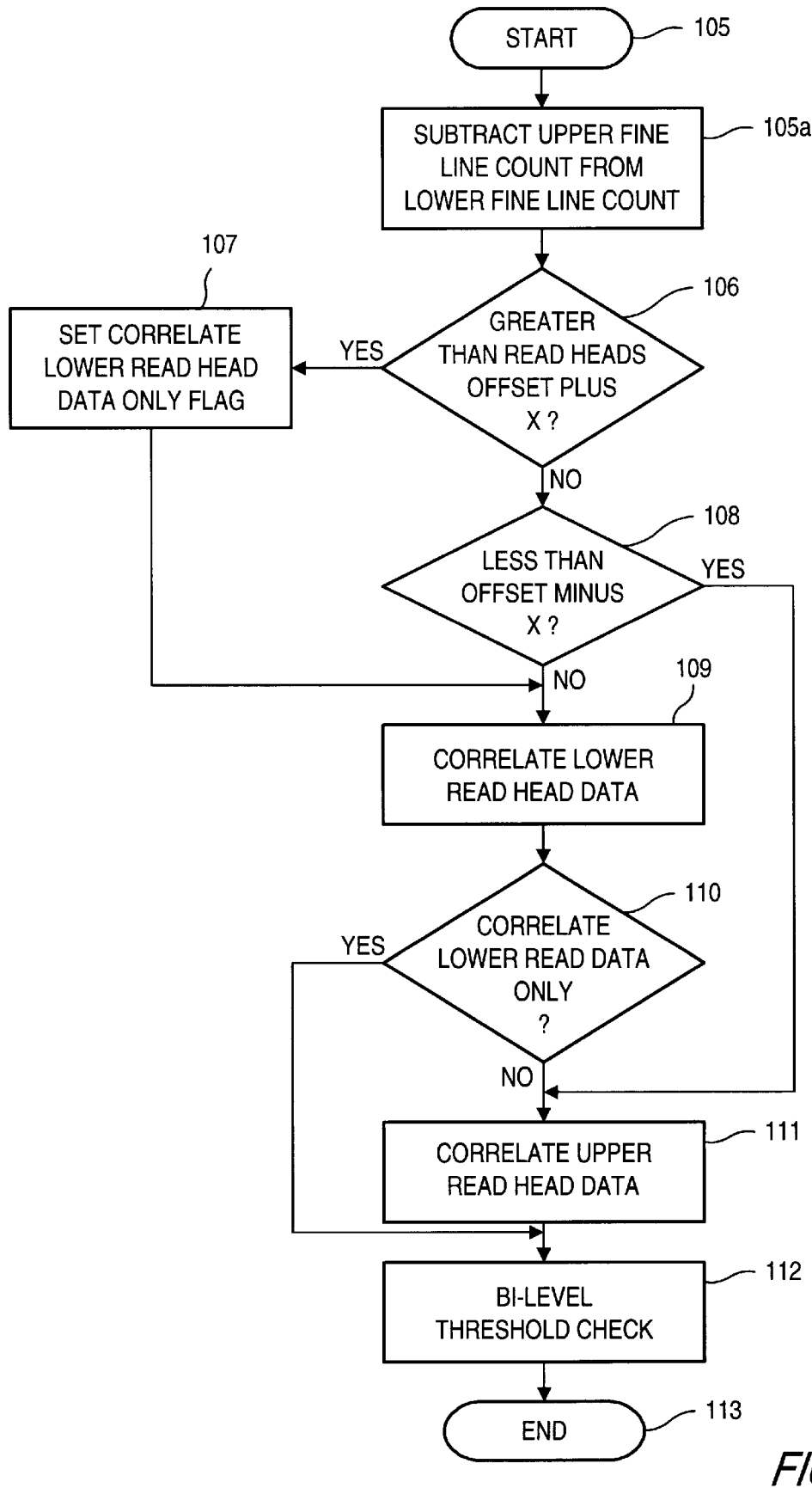
FIG. 12 is a flow chart illustrating the sequential procedure involved in determining which scanhead is scanning the green side of a U.S. currency bill.

The CPU 30 is programmed with the sequence of operations in FIG. 12 to correlate only the test pattern corresponding to the green surface of a scanned bill. The upper scanhead 18a is located slightly upstream adjacent the bill transport path relative to the lower scanhead 18b. The distance between the scanheads 18a, 18b in a direction parallel to the transport path corresponds to a predetermined number of encoder counts. It should be understood that the encoder 32 produces a repetitive tracking signal synchronized with incremental movements of the bill transport mechanism, and this repetitive tracking signal has a repetitive sequence of counts (e.g., 65,535 counts) associated therewith. As a bill is scanned by the upper and lower scanheads 18a, 18b, the CPU 30 monitors the output of the upper scanhead 18a to detect the borderline of a first bill surface facing the upper scanhead 18a. Once this borderline of the first surface is detected, the CPU 30 retrieves and stores a first encoder count in memory. Similarly, the CPU 30 monitors the output of the lower scanhead 18b to detect the borderline of a second bill surface facing the lower scanhead 18b. Once the borderline of the second surface is detected, the CPU 30 retrieves and stores a second encoder count in memory.

Referring to FIG. 12, the CPU 30 is programmed to calculate the difference between the first and second encoder counts (step 105a). If this difference is greater than the predetermined number of encoder counts corresponding to the distance between the scanheads 18a, 18b plus some safety factor number "X", e.g., 20 (step 106), the bill is oriented with its black surface facing the upper scanhead 18a and its green surface facing the lower scanhead 18b. Once the borderline $B_1$ of the black surface passes beneath the upper scanhead 18a and the first encoder count is stored, the borderline $B_2$ still must travel for a distance greater than the distance between the upper and lower scanheads 18a, 18b in order to pass over the lower scanhead 18b. As a result, the difference between the second encoder count associated with the borderline $B_2$ and the first encoder count associated with the borderline $B_1$ will be greater than the predetermined number of encoder counts corresponding to the distance between the scanheads 18a, 18b. With the bill oriented with its green surface facing the lower scanhead, the CPU 30 sets a flag to indicate that the test pattern produced by the lower scanhead 18b should be correlated (step 107). Next, this test pattern is correlated with the master characteristic patterns stored in memory (step 109).

If at step 106 the difference between the first and second encoder counts is less than the predetermined number of encoder counts corresponding to the distance between the scanheads 18a, 18b, the CPU 30 is programmed to determine whether the difference between the first and second encoder counts is less than the predetermined number minus some safety number "X", e.g., 20 (step 108). If the answer is negative, the orientation of the bill relative to the scanheads 18a, 18b is uncertain so the CPU 30 is programmed to correlate the test patterns produced by both the upper and lower scanheads 18a, 18b with the master characteristic patterns stored in memory (steps 109, 110, and 111).

If the answer is affirmative, the bill is oriented with its green surface facing the upper scanhead 18a and its black surface facing the lower scanhead 18b. In this situation, once the borderline $B_2$ of the green surface passes beneath the upper scanhead 18a and the first encoder count is stored, the borderline $B_1$ must travel for a distance less than the distance between the upper and lower scanheads 18a, 18b in order to pass over the lower scanhead 18b. As a result, the difference between the second encoder count associated with the borderline $B_1$ and the first encoder count associated with the borderline $B_2$ should be less than the predetermined number of encoder counts corresponding to the distance between the scanheads 18a, 18b. To be on the safe side, it is required that the difference between first and second encoder counts be less than the predetermined number minus the safety number "X". Therefore, the CPU 30 is programmed to correlate the test pattern produced by the upper scanhead 18a (step 111).

After correlating the test pattern associated with either the upper scanhead 18a, the lower scanhead 18b, or both scanheads 18a, 18b, the CPU 30 is programmed to perform the bi-level threshold check (step 112).

A simple correlation procedure is utilized for processing digitized reflectance values into a form which is conveniently and accurately compared to corresponding values pre-stored in an identical format. More specifically, as a first step, the mean value $\overline{X}$ for the set of digitized reflectance samples (comparing "n" samples) obtained for a bill scan run is first obtained as below:

$$\overline{X} = \sum_{i=0}^{n} \frac{X_i}{n} \quad (1)$$

Subsequently, a normalizing factor Sigma ("σ") is determined as being equivalent to the sum of the square of the difference between each sample and the mean, as normalized by the total number n of samples. More specifically, the normalizing factor is calculated as below:

$$\sigma = \sum_{i=0}^{n} \frac{|X_i - \overline{X}|^2}{n} \quad (2)$$

In the final step, each reflectance sample is normalized by obtaining the difference between the sample and the above-calculated mean value and dividing it by the square root of the normalizing factor σ as defined by the following equation:

$$X_n = \frac{X_i - \overline{X}}{(\sigma)^{1/2}} \quad (3)$$

The result of using the above correlation equations is that, subsequent to the normalizing process, a relationship of correlation exists between a test pattern and a master pattern such that the aggregate sum of the products of corresponding samples in a test pattern and any master pattern, when divided by the total number of samples, equals unity if the patterns are identical. Otherwise, a value less than unity is obtained. Accordingly, the correlation number or factor resulting from the comparison of normalized samples within a test pattern to those of a stored master pattern provides a clear indication of the degree of similarity or correlation between the two patterns.

According to a preferred embodiment of this invention, the fixed number of reflectance samples which are digitized and normalized for a bill scan is selected to be 64. It has experimentally been found that the use of higher binary orders of samples (such as 128, 256, etc.) does not provide a correspondingly increased discrimination efficiency relative to the increased processing time involved in implementing the above-described correlation procedure. It has also been found that the use of a binary order of samples lower than 64, such as 32, produces a substantial drop in discrimination efficiency.

The correlation factor can be represented conveniently in binary terms for ease of correlation. In a preferred embodiment, for instance, the factor of unity which results when a hundred percent correlation exists is represented in terms of the binary number $2^{10}$, which is equal to a decimal value of 1024. Using the above procedure, the normalized samples within a test pattern are compared to the master characteristic patterns stored within the system memory in order to determine the particular stored pattern to which the test pattern corresponds most closely by identifying the comparison which yields a correlation number closest to 1024.

A bi-level threshold of correlation is required to be satisfied before a particular call is made, for at least certain denominations of bills. More specifically, the correlation procedure is adapted to identify the two highest correlation numbers resulting from the comparison of the test pattern to one of the stored patterns. At that point, a minimum threshold of correlation is required to be satisfied by these two correlation numbers. It has experimentally been found that a correlation number of about 850 serves as a good cut-off threshold above which positive calls may be made with a high degree of confidence and below which the designation of a test pattern as corresponding to any of the stored patterns is uncertain. As a second threshold level, a minimum separation is prescribed between the two highest correlation numbers before making a call. This ensures that a positive call is made only when a test pattern does not correspond, within a given range of correlation, to more than one stored master pattern. Preferably, the minimum separation between correlation numbers is set to be 150 when the highest correlation number is between 800 and 850. When the highest correlation number is below 800, no call is made.

The procedure involved in comparing test patterns to master patterns is discussed below in connection with FIG. 18.

Figure 13:
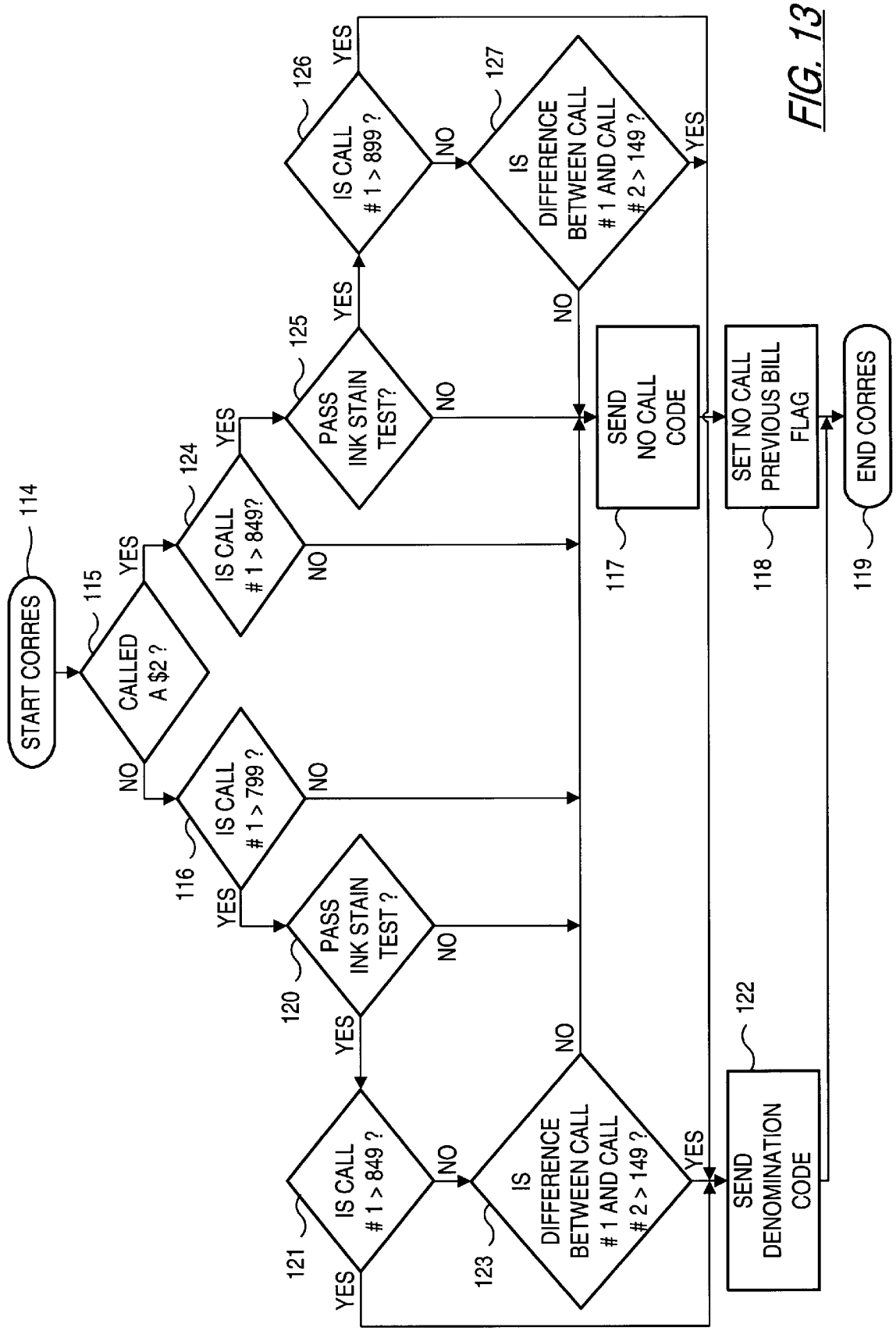
FIG. 13 is a flow chart illustrating the sequence of operations involved in determining the bill denomination from the correlation results.
Figure 14:
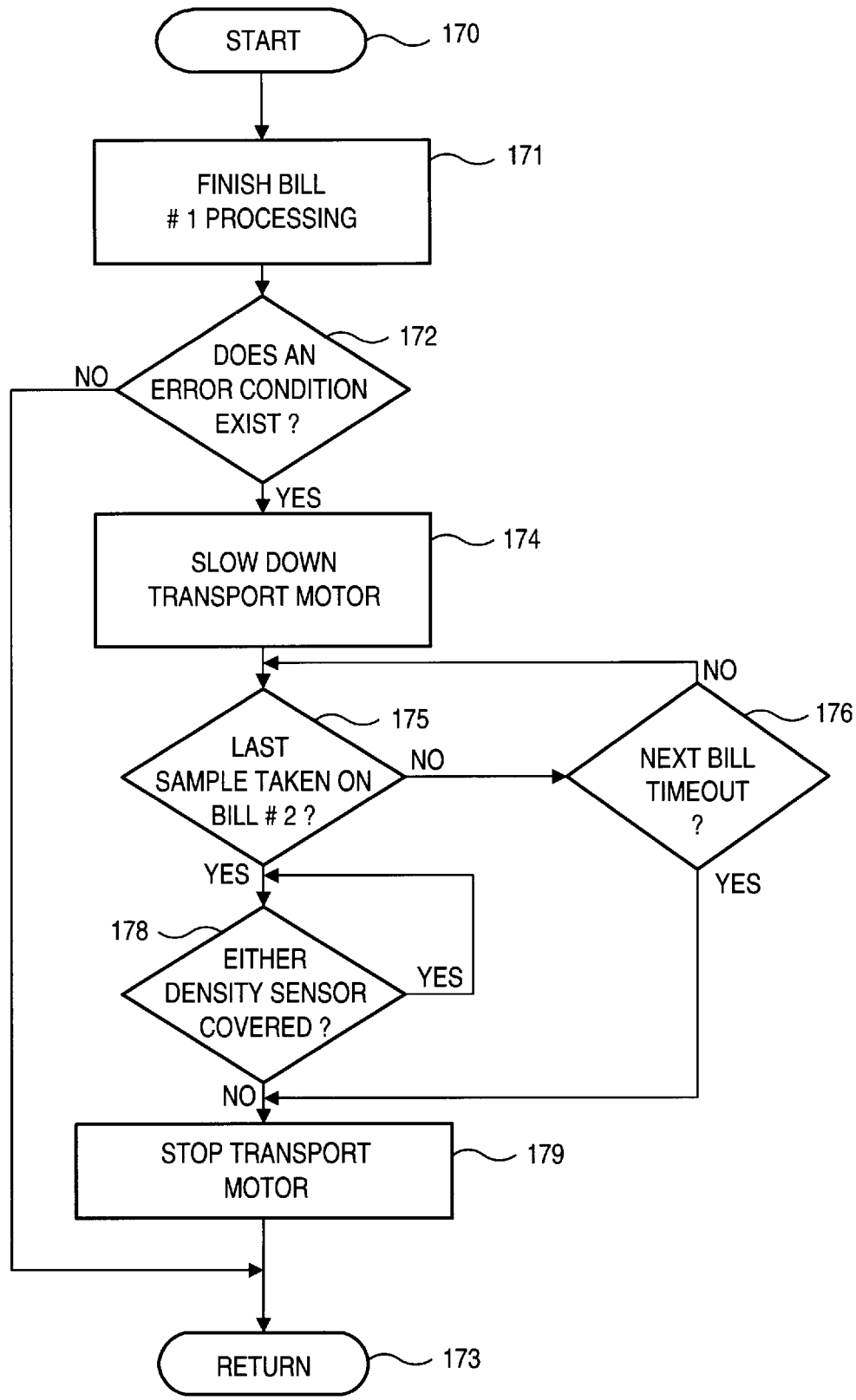
FIG. 14 is a flow chart illustrating the sequential procedure involved in decelerating and stopping the bill transport system in the event of an error.

Next a routine designated as "CORRES" is initiated. The procedure involved in executing the routine CORRES is illustrated at FIG. 13 which shows the routine as starting at step 114. Step 115 determines whether the bill has been identified as a $2 bill, and, if the answer is negative, step 116 determines whether the best correlation number ("call #1") is greater than 799. If the answer is negative, the correlation number is too low to identify the denomination of the bill with certainty, and thus step 117 generates a "no call" code. A "no call previous bill" flag is then set at step 118, and the routine returns to the main program at step 119.

An affirmative answer at step 116 advances the system to step 120, which determines whether the sample data passes an ink stain test (described below). If the answer is negative, a "no call" code is generated at step 117. If the answer is affirmative, the system advances to step 121 which determines whether the best correlation number is greater than 849. An affirmative answer at step 121 indicates that the correlation number is sufficiently high that the denomination of the scanned bill can be identified with certainty without any further checking. Consequently, a "denomination" code identifying the denomination represented by the stored pattern resulting in the highest correlation number is generated at step 122, and the system returns to the main program at step 119.

A negative answer at step 121 indicates that the correlation number is between 800 and 850. It has been found that correlation numbers within this range are sufficient to identify all bills except the $2 bill. Accordingly, a negative response at step 121 advances the system to step 123 which determines whether the difference between the two highest correlation numbers ("call #1" and "call #2") is greater than 149. If the answer is affirmative, the denomination identified by the highest correlation number is acceptable, and thus the "denomination" code is generated at step 122. If the difference between the two highest correlation numbers is less than 150, step 123 produces a negative response which advances the system to step 117 to generate a "no call" code.

Returning to step 115, an affirmative response at this step indicates that the initial call is a $2 bill. This affirmative response initiates a series of steps 124–127 which are identical to steps 116, 120, 121 and 123 described above, except that the numbers 799 and 849 used in steps 116 and 121 are changed to 849 and 899, respectively, in steps 124 and 126. The result is either the generation of a "no call" code at step 117 or the generation of a $2 "denomination" code at step 122.

One problem encountered in currency recognition and counting systems is the difficulty involved in interrupting (for a variety of reasons) and resuming the scanning and counting procedure as a stack of bills is being scanned. If a particular currency recognition unit (CRU) has to be halted in operation due to a "major" system error, such as a bill being jammed along the transport path, there is generally no concern about the outstanding transitional status of the overall recognition and counting process. However, where the CRU has to be halted due to a "minor" error, such as the identification of a scanned bill as being a counterfeit (based on a variety of monitored parameters) or a "no call" (a bill which is not identifiable as belonging to a specific currency denomination based on the plurality of stored master patterns and/or other criteria), it is desirable that the transitional status of the overall recognition and counting process be retained so that the CRU may be restarted without any effective disruptions of the recognition/counting process.

More specifically, once a scanned bill has been identified as a "no call" bill ($B_1$) based on some set of predefined criteria, it is desirable that this bill $B_1$ be transported directly to the system stacker and the CRU brought to a halt with bill $B_1$ being the last bill deposited in the output receptacle, while at the same time ensuring that the following bills are maintained in positions along the bill transport path whereby CRU operation can be conveniently resumed without any disruption of the recognition/counting process.

Since the bill processing speeds at which currency recognition systems must operate are substantially high (speeds of the order of 800 to 1500 bills per minute), it is practically impossible to totally halt the system following a "no call" without the following bill $B_2$ already overlapping the optical scanhead and being partially scanned. As a result, it is virtually impossible for the CRU system to retain the transitional status of the recognition/counting process (particularly with respect to bill $B_2$) in order that the process may be resumed once the bad bill $B_1$ has been transported to the stacker, conveniently removed therefrom, and the system restarted. The basic problem is that if the CRU is halted with bill $B_2$ only partially scanned, it is difficult to reference the data reflectance samples extracted therefrom in such a way that the scanning may be later continued (when the CRU is restarted) from exactly the same point where the sample extraction process was interrupted when the CRU was stopped.

Even if an attempt were made at immediately halting the CRU system following a "no call," any subsequent scanning of bills would be totally unreliable because of mechanical backlash effects and the resultant disruption of the optical encoder routine used for bill scanning. Consequently, when the CRU is restarted, the call for the following bill is also likely to be bad and the overall recognition/counting process is totally disrupted as a result of an endless loop of "no calls."

The above problems are solved by the use of a currency detecting and counting technique whereby a scanned bill identified as a "no call" is transported directly to the top of the system stacker and the CRU is halted without adversely affecting the data collection and processing steps for a succeeding bill. Accordingly, when the CRU is restarted, the overall bill recognition and counting procedure can be resumed without any disruption as if the CRU had never been halted at all.

According to a preferred technique, if the bill is identified as a "no call" based on any of a variety of conventionally defined bill criteria, the CRU is subjected to a controlled deceleration process whereby the speed at which bills are moved across the scanhead is reduced from the normal operating speed. During this deceleration process the "no call" bill ($B_1$) is transported to the top of the stacker and, at the same time, the following bill $B_2$ is subjected to the standard scanning procedure in order to identify the denomination.

The rate of deceleration is such that optical scanning of bill $B_2$ is completed by the time the CRU operating speed is reduced to a predefined operating speed. While the exact operating speed at the end of the scanning of bill $B_2$ is not critical, the objective is to permit complete scanning of bill $B_2$ without subjecting it to backlash effects that would result if the ramping were too fast, while at the same time ensuring that bill B, has in fact been transported to the stacker.

It has been experimentally determined that at nominal operating speeds of the order of 1000 bills per minute, the deceleration is preferably such that the CRU operating speed is reduced to about one-fifth of its normal operating speed at the end of the deceleration phase, i.e., by the time optical scanning of bill $B_2$ has been completed. It has been determined that at these speed levels, positive calls can be made as to the denomination of bill $B_2$ based on reflectance samples gathered during the deceleration phase with a relatively high degree of certainty (i.e., with a correlation number exceeding about 850).

Once the optical scanning of bill $B_2$ has been completed, the speed is reduced to an even slower speed until the bill $B_2$ has passed bill-edge sensors S1 and S2 described below, and the bill $B_2$ is then brought to a complete stop. At the same time, the results of the processing of scanned data corresponding to bill $B_2$ are stored in system memory. The ultimate result of this stopping procedure is that the CRU is brought to a complete halt following the point where the scanning of bill $B_2$ has been reliably completed, and the scan procedure is not subjected to the disruptive effects (backlash, etc.) which would result if a complete halt were attempted immediately after bill $B_1$ is identified as a "no call."

The reduced operating speed of the machine at the end of the deceleration phase is such that the CRU can be brought to a total halt before the next following bill $B_3$ has been transported over the optical scanhead. Thus, when the CRU is in fact halted, bill $B_1$ is positioned at the top of the system stacker, bill $B_2$ is maintained in transit between the optical scanhead and the stacker after it has been subjected to scanning, and the following bill $B_3$ is stopped short of the optical scanhead.

When the CRU is restarted, presumably after corrective action has been taken in response to the "minor" error which led to the CRU being stopped (such as the removal of the "no call" bill from the output receptacle), the overall scanning operation can be resumed in an uninterrupted fashion by using the stored call results for bill $B_2$ as the basis for updating the system count appropriately, moving bill $B_2$ from its earlier transitional position along the transport path into the stacker, and moving bill $B_3$ along the transport path into the optical scanhead area where it can be subjected to normal scanning and processing. A routine for executing the deceleration/stopping procedure described above is illustrated by the flow chart in FIG. 14. This routine is initiated at step 170 with the CRU in its normal operating mode. At step 171, a test bill B1 is scanned and the data reflectance samples resulting therefrom are processed. Next, at step 172, a determination is made as to whether or not test bill $B_1$ is a "no call" using predefined criteria in combination with the overall bill recognition procedure, such as the routine of FIG. 13. If the answer at step 172 is negative, i.e., the test bill $B_1$ can be identified, step 173 is accessed where normal bill processing is continued in accordance with the procedures described above. If, however, the test bill $B_1$ is found to be a "no call" at step 172, step 174 is accessed where CRU deceleration is initiated, e.g., the transport drive motor speed is reduced to about one-fifth its normal speed.

Subsequently, the "no call" bill $B_1$ is guided to the stacker while, at the same time, the following test bill $B_2$ is brought under the optical scanhead and subjected to the scanning and processing steps. The call resulting from the scanning and processing of bill $B_2$ is stored in system memory at this point. Step 175 determines whether the scanning of bill $B_2$ is complete. When the answer is negative, step 176 determines whether a preselected "bill timeout" period has expired so that the system does not wait for the scanning of a bill that is not present. An affirmative answer at step 176 results in the transport drive motor being stopped at step 179 while a negative answer at step 176 causes steps 175 and 176 to be reiterated until one of them produces an affirmative response.

After the scanning of bill $B_2$ is complete and before stopping the transport drive motor, step 178 determines whether either of the sensors S1 or S2 (described below) is covered by a bill. A negative answer at step 178 indicates that the bill has cleared both sensors S1 and S2, and thus the transport drive motor is stopped at step 179. This signifies the end of the deceleration/stopping process. At this point in time, bill $B_2$ remains in transit while the following bill $B_3$ is stopped on the transport path just short of the optical scanhead.

Following step 179, corrective action responsive to the identification of a "no call" bill is conveniently undertaken; the top-most bill in the stacker is easily removed therefrom and the CRU is then in condition for resuming the scanning process. Accordingly, the CRU can be restarted and the stored results corresponding to bill $B_2$ are used to appropriately update the system count. Next, the identified bill $B_2$ is guided along the transport path to the stacker, and the CRU continues with its normal processing routine. While the above deceleration process has been described in a context of a "no call" error, other minor errors (e.g., suspect bills, stranger bills in stranger mode, etc.) are handled in the same manner.

Figure 15A:
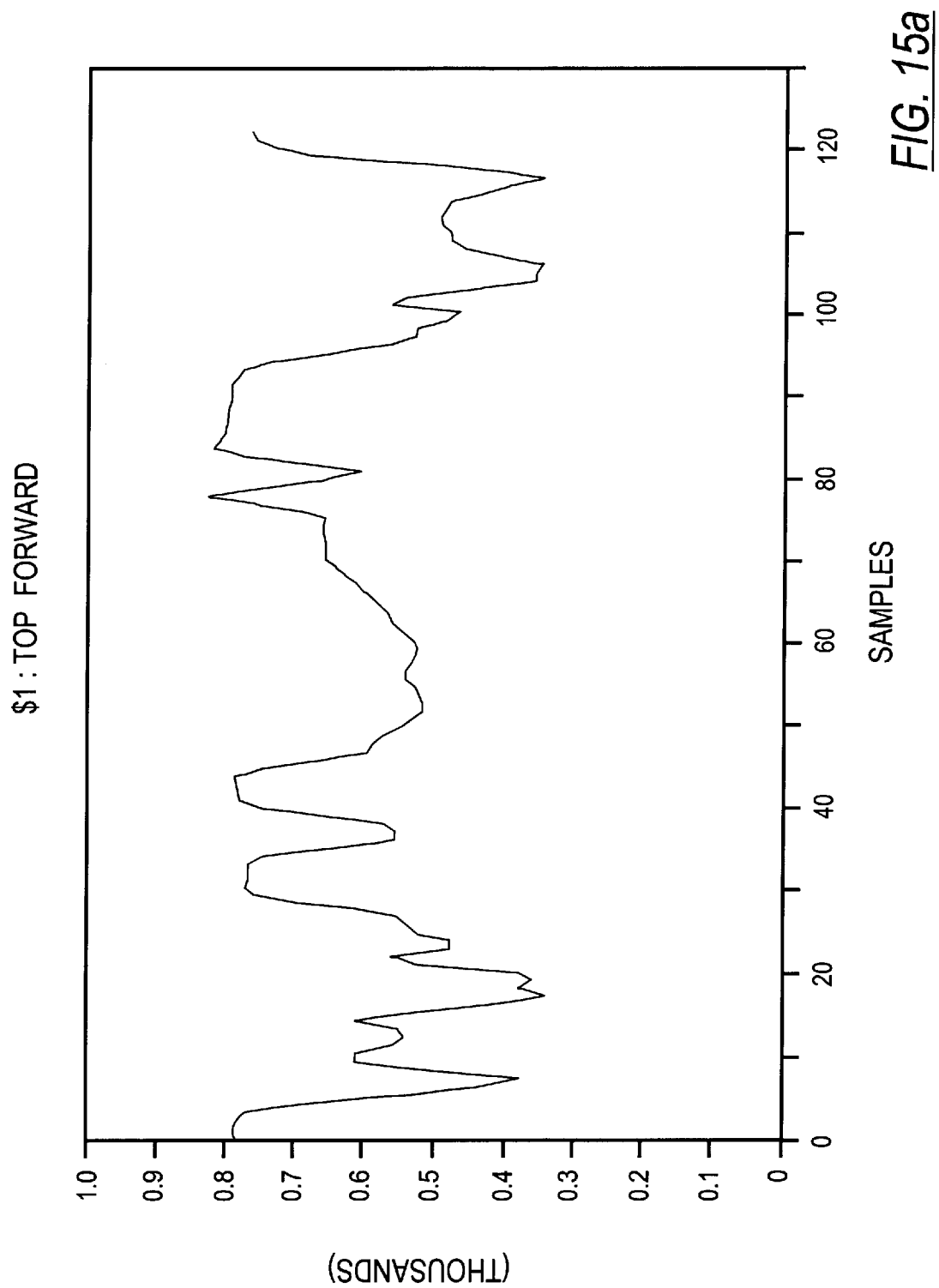
FIG. 15a is a graphical illustration of representative characteristic patterns generated by narrow dimension optical scanning of a $1 currency bill in the forward direction.
Figure 15B:
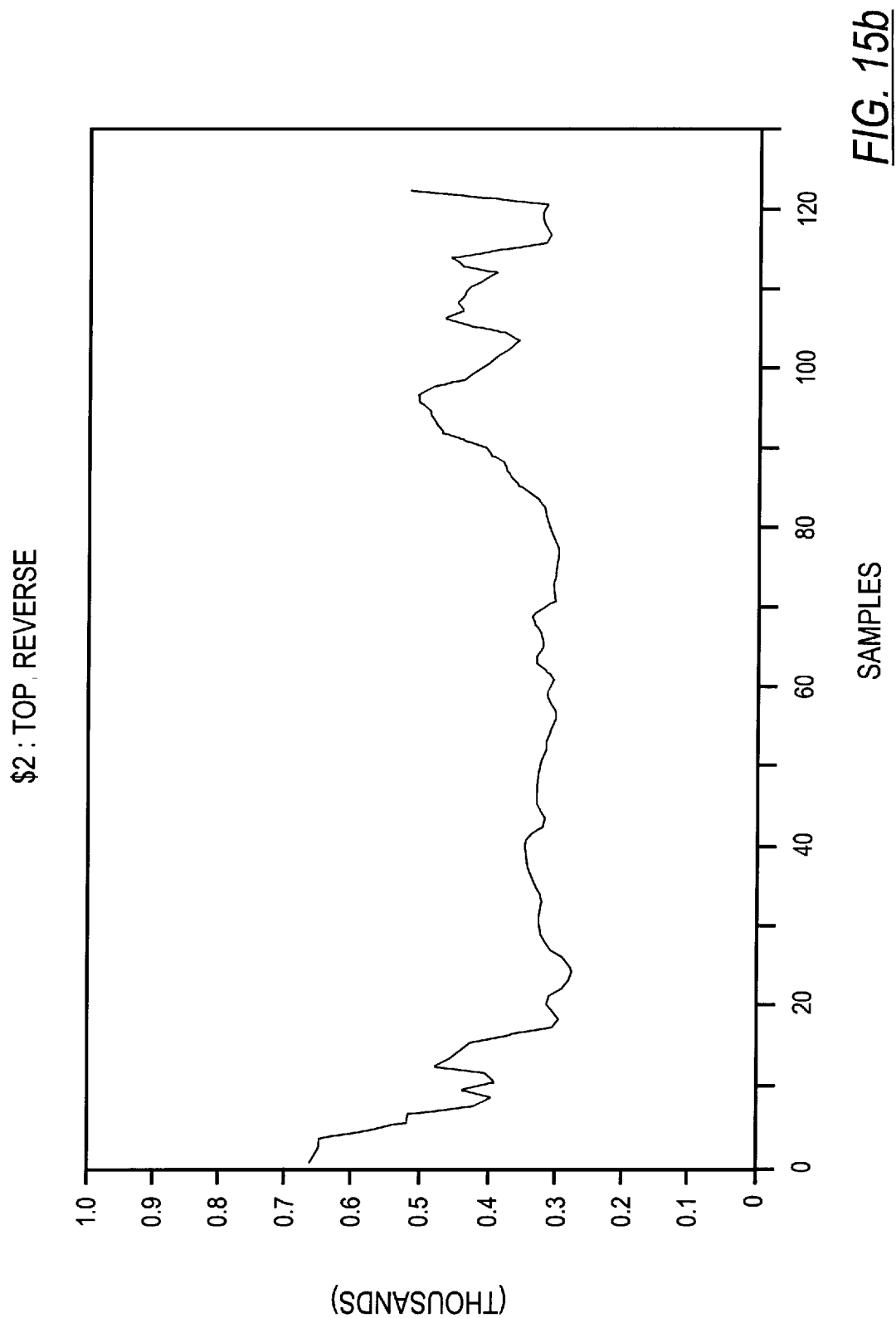
FIG. 15b is a graphical illustration of representative characteristic patterns generated by narrow dimension optical scanning of a $2 currency bill in the reverse direction.
Figure 16:
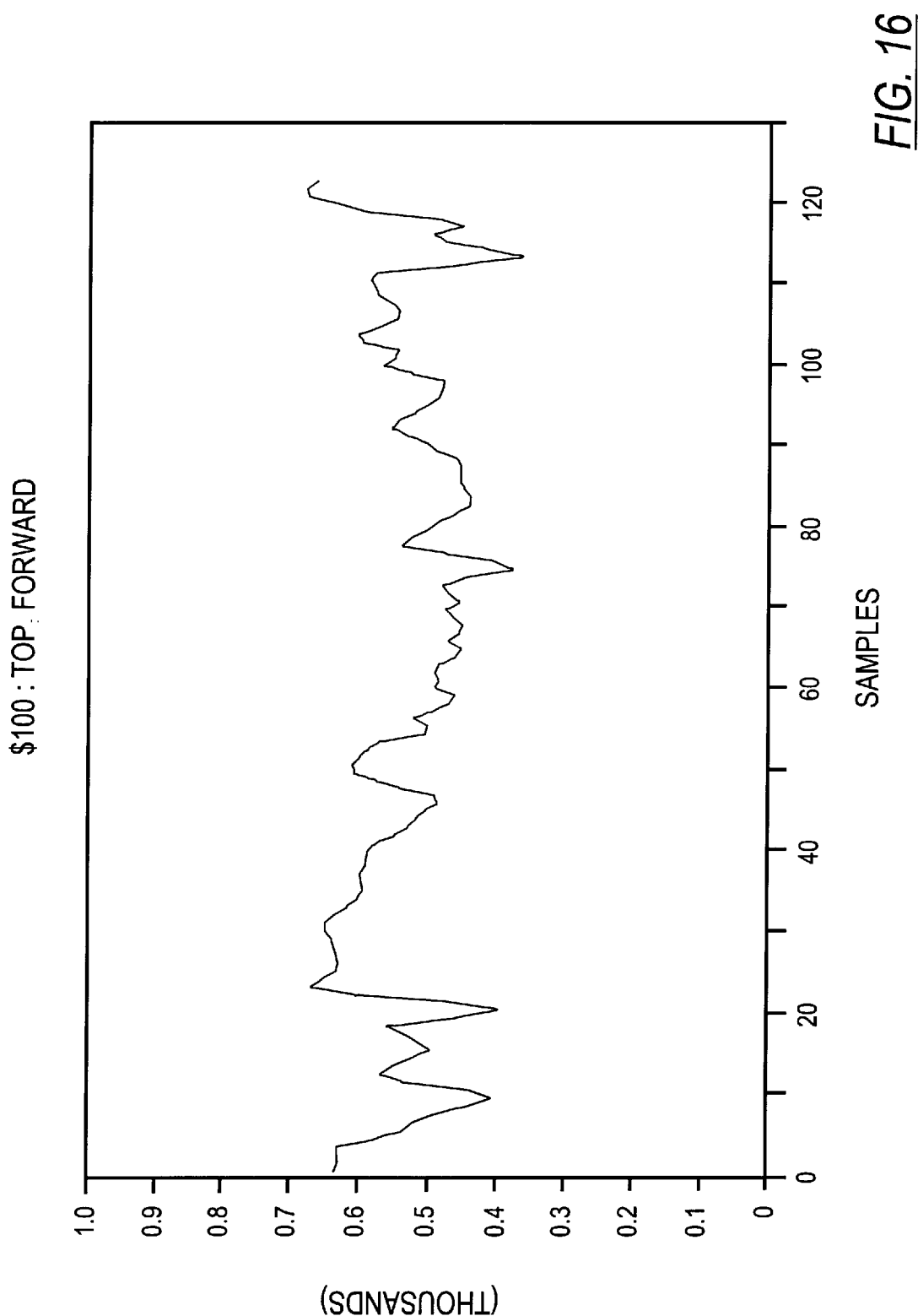
FIG. 16 is a graphical illustration of representative characteristic patterns generated by narrow dimension optical scanning of a $100 currency bill in the forward direction.

FIGS. 15a, 15b, and 16 show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 15a, 15b, and 16 were generated by using 128 reflectance samples per bill scan, as opposed to the preferred use of only 64 samples. The marked difference existing between corresponding samples for these three test patterns is indicative of the high degree of confidence with which currency denominations may be called using the foregoing optical sensing and correlation procedure.

The optical sensing and correlation technique described above permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

A major advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with multiple stored master characteristic patterns so that the system is made capable of identifying currency which is scanned in the "forward" or "reverse" directions along the green surface of the bill.

Another advantage accruing from the reduction in processing time realized by the preferred sensing and correlation scheme is that the response time involved in either stopping the transport of a bill that has been identified as "spurious", i.e., not corresponding to any of the stored master characteristic patterns, or diverting such a bill to a separate stacker bin, is correspondingly shortened. Accordingly, the system can conveniently be programmed to set a flag when a scanned pattern does not correspond to any of the master patterns. The identification of such a condition can be used to stop the bill transport drive motor for the mechanism. Since the optical encoder is tied to the rotational movement of the drive motor, synchronism can be maintained between pre- and post-stop conditions.

In currency discrimination systems in which discrimination is based on the comparison of a pattern obtained from scanning a subject bill to stored master patterns corresponding to various denominations, the patterns which are compared to each other significantly influence the performance characteristics of a discrimination system. For example, in the system described in U.S. Pat. No. 5,295,196, the correlation procedure and the accuracy with which a denomination is identified directly relates to the degree of correspondence between reflectance samples on the test pattern and corresponding samples on the stored master patterns. In accordance with method described above, the identity of a bill under test is determined by comparing a scanned pattern generated by scanning the bill under test with one or more master patterns associated with genuine bills. If the scanned pattern sufficiently correlates to one of the master pattern, the identity of the bill may be called. The process of identifying a bill under test may be subjected to a bi-level threshold test as described above.

However, the degree of correlation between a scanned and a master pattern may be negatively impacted if the two patterns are not properly aligned with each other. Such misalignment between patterns may in turn negatively impact upon the performance of a currency identification system. Misalignment between patterns may result from a number of factors. For example, if a system is designed so that the scanning process is initiated in response to the detection of the thin borderline surrounding U.S. currency or the detection of some other printed indicia such as the edge of printed indicia on a bill, stray marks may cause initiation of the scanning process at an improper time. This is especially true for stray marks in the area between the edge of a bill and the edge of the printed indicia on the bill. Such stray marks may cause the scanning process to be initiated too soon, resulting in a scanned pattern which leads a corresponding master pattern. Alternatively, where the detection of the edge of a bill is used to trigger the scanning process, misalignment between patterns may result from variances between the location of printed indicia on a bill relative to the edges of a bill. Such variances may result from tolerances permitted during the printing and/or cutting processes in the manufacture of currency. For example, it has been found that location of the leading edge of printed indicia on Canadian currency relative to the edge of Canadian currency may vary up to approximately 0.2 inches (approximately 0.5 cm).

According to a preferred embodiment of the present invention, the problems associated with misaligned patterns are overcome by employing an improved method of generating multiple scanned and/or master patterns and comparing the multiple scanned and master patterns with each other. Briefly, a preferred embodiment of the improved pattern generation method involves removing data samples from one end of a pattern to be modified and adding data values on the opposite end equal to the data values contained in the corresponding sequence positions of the pattern to which the modified pattern is to be compared. This process may be repeated, up to a predetermined number of times, until a sufficiently high correlation is obtained between the two patterns so as to permit the identity of a bill under test to be called.

A preferred embodiment of the present invention can be further understood by considering Table 2. Table 2 contains data samples generated by scanning the narrow dimension of Canadian $2 bills along a segment positioned about the center of the bill on the side opposite the portrait side. More specifically, the second column of Table 2 represents a scanned pattern generated by scanning a test Canadian $2 bill. The scanned pattern comprises 64 data samples arranged in a sequence. Each data sample has a sequence position, 1–64, associated therewith. The fifth column represents a master pattern associated with a Canadian $2 bill. The master pattern likewise comprises a sequence of 64 data samples. The third and fourth columns represent the scanned pattern after it has been modified in the forward direction one and two times, respectively. In the embodiment depicted in Table 2, one data sample is removed from the beginning of the preceding pattern during each modification.

TABLE 2

| Sequence Position | Scanned Pattern | Scanned Pattern Modified Once | Scanned Pattern Modified Twice | Master Pattern |
|---|---|---|---|---|
| 1 | 93 | 50 | −21 | 161 |
| 2 | 50 | −21 | 50 | 100 |
| 3 | −21 | 50 | 93 | 171 |
| 4 | 50 | 93 | 65 | 191 |
| 5 | 93 | 65 | 22 | 252 |
| 6 | 65 | 22 | 79 | 403 |
| 7 | 22 | 79 | 136 | 312 |
| 8 | 79 | 136 | 193 | 434 |
| 9 | 136 | 193 | 278 | 90 |
| 10 | 193 | 278 | 164 | 0 |
| 11 | 278 | 164 | 136 | 20 |
| 12 | 164 | 136 | 278 | 444 |
| . | . | . | . | . |
| . | . | . | . | . |
| 52 | −490 | −518 | −447 | −1090 |
| 53 | −518 | −447 | −646 | −767 |
| 54 | −447 | −646 | −348 | −575 |
| 55 | −646 | −348 | −92 | −514 |
| 56 | −348 | −92 | −63 | −545 |
| 57 | −92 | −63 | −205 | −40 |
| 58 | −63 | −205 | 605 | 1665 |
| 59 | −205 | 605 | 1756 | 1705 |
| 60 | 605 | 1756 | 1401 | 1685 |
| 61 | 1756 | 1401 | 1671 | 2160 |
| 62 | 1401 | 1671 | 2154 | 2271 |
| 63 | 1671 | 2154 | *2240 | 2240 |
| 64 | 2154 | *2210 | *2210 | 2210 |

The modified pattern represented in the third column is generated by adding an additional data value to the end of the original scanned pattern sequence which effectively removes the first data sample of the original pattern, e.g., 93, from the modified pattern. The added data value in the last sequence position, 64, is set equal to the data value contained in the 64th sequence position of the master pattern, e.g., 2210. This copying of the 64th data sample is indicated by an asterisk in the third column. The second modified pattern represented in the fourth column is generated by adding two additional data values to the end of the original scanned pattern which effectively removes the first two data samples of the original scanned, e.g., 93 and 50, from the second modified pattern. The last two sequence positions, 63 and 64, are filled with the data value contained in the 63rd and 64th sequence positions of the master pattern, e.g., 2240 and 2210, respectively. The copying of the 63rd and 64th data samples is indicated by asterisks in the fourth column.

In the example of Table 2, the printed area of the bill under test from which the scanned pattern was generated was farther away from the leading edge of the bill than was the printed area of the bill from which the master pattern was generated. As a result, the scanned pattern trailed the master pattern. The preferred embodiment of the pattern generation method described in conjunction with Table 2 compensates for the variance of the distance between the edge of the bill and the edge of the printed indicia by modifying the scanned pattern in the forward direction. As a result of the modification method employed, the correlation between the original and modified versions of the scanned pattern and the master pattern increased from 705 for the original, unmodified scanned pattern to 855 for the first modified pattern and to 988 for the second modified pattern. Accordingly, the bill under test which would otherwise have been rejected may now be properly called as a genuine $2 Canadian bill through the employment of the pattern generation method discussed above.

Figure 17A:
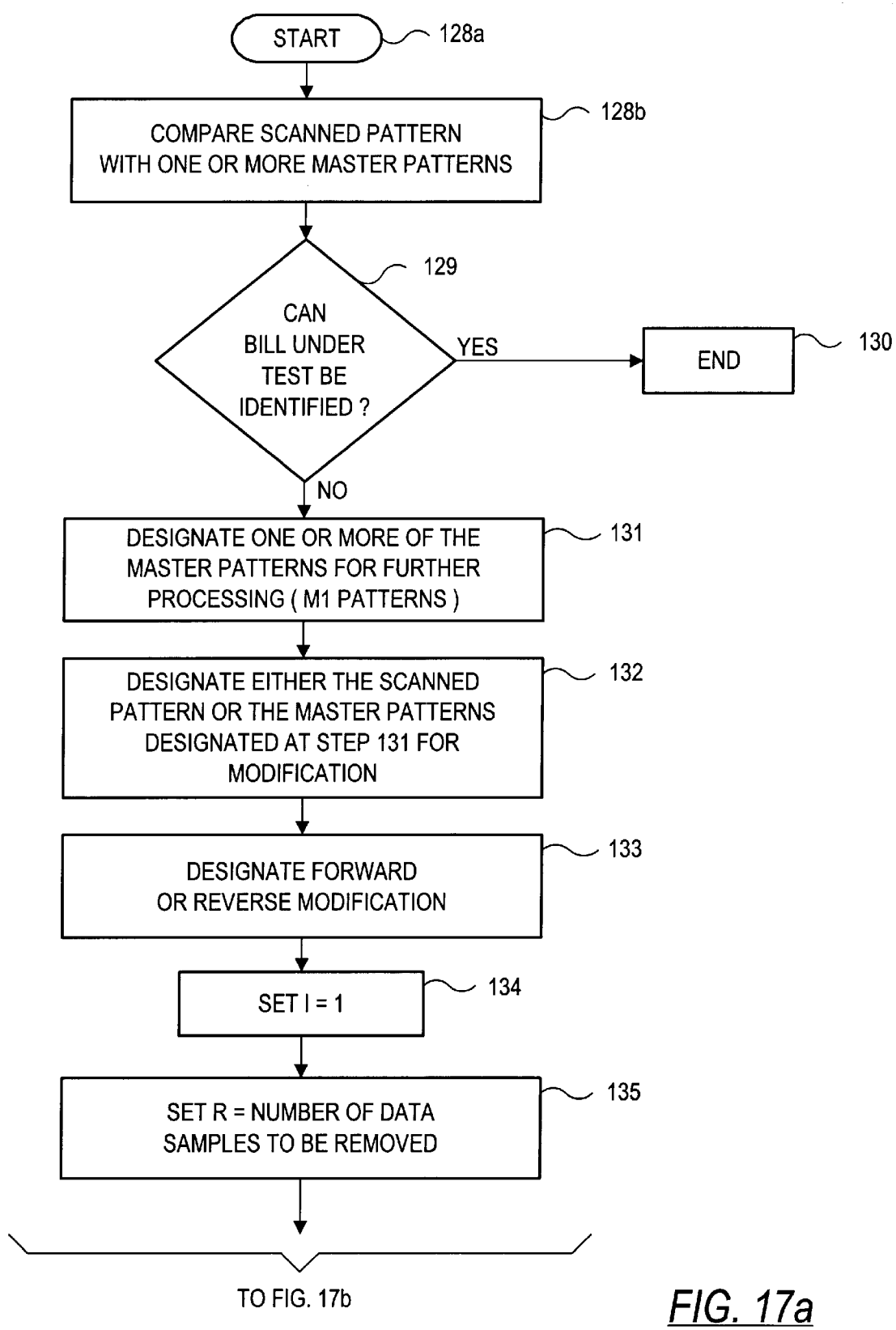
FIGS. 17a–17c are a flowchart illustrating a preferred embodiment of a modified pattern generation method according to the present invention.
Figure 17B:
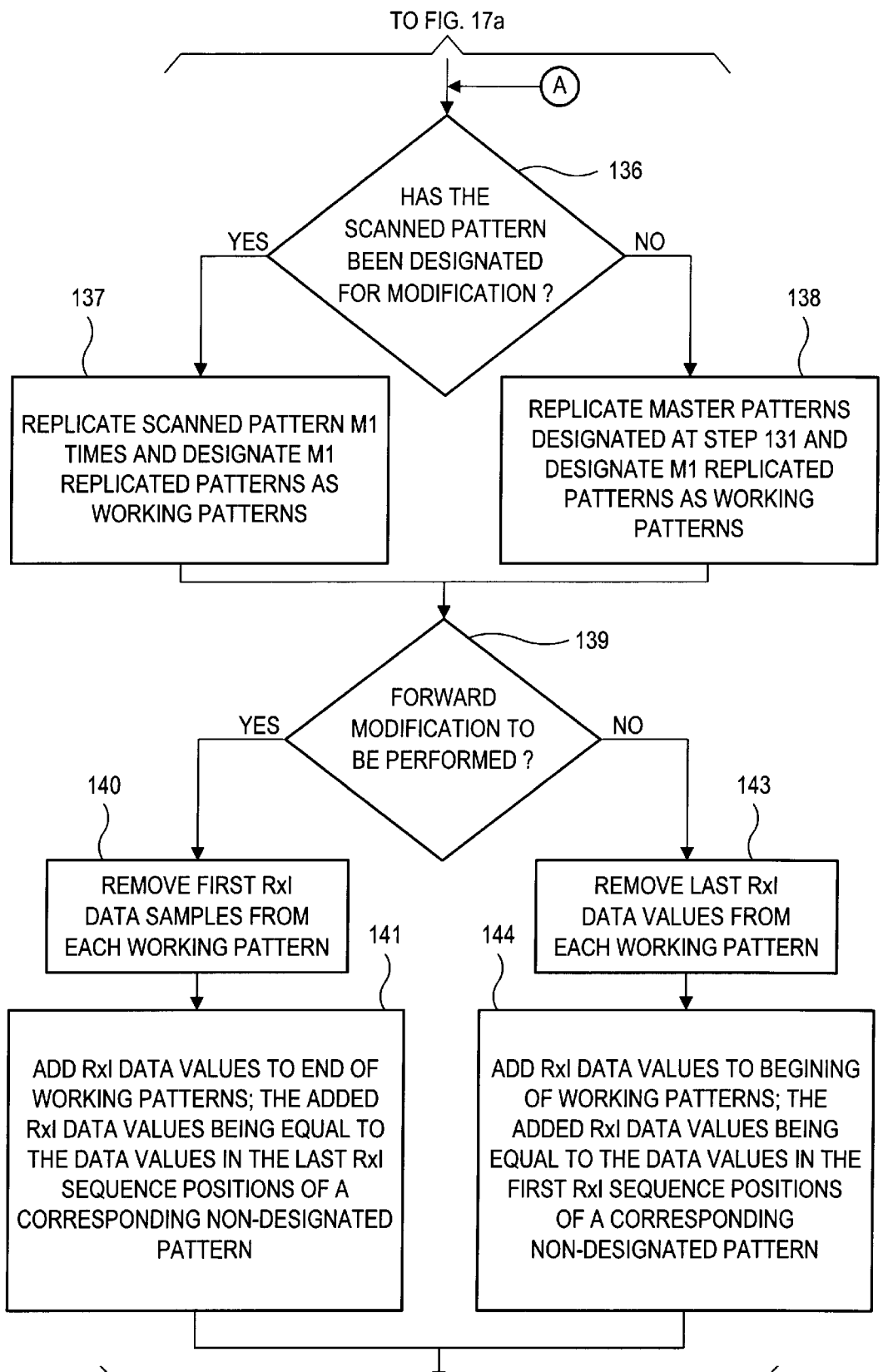
Figure 17C:
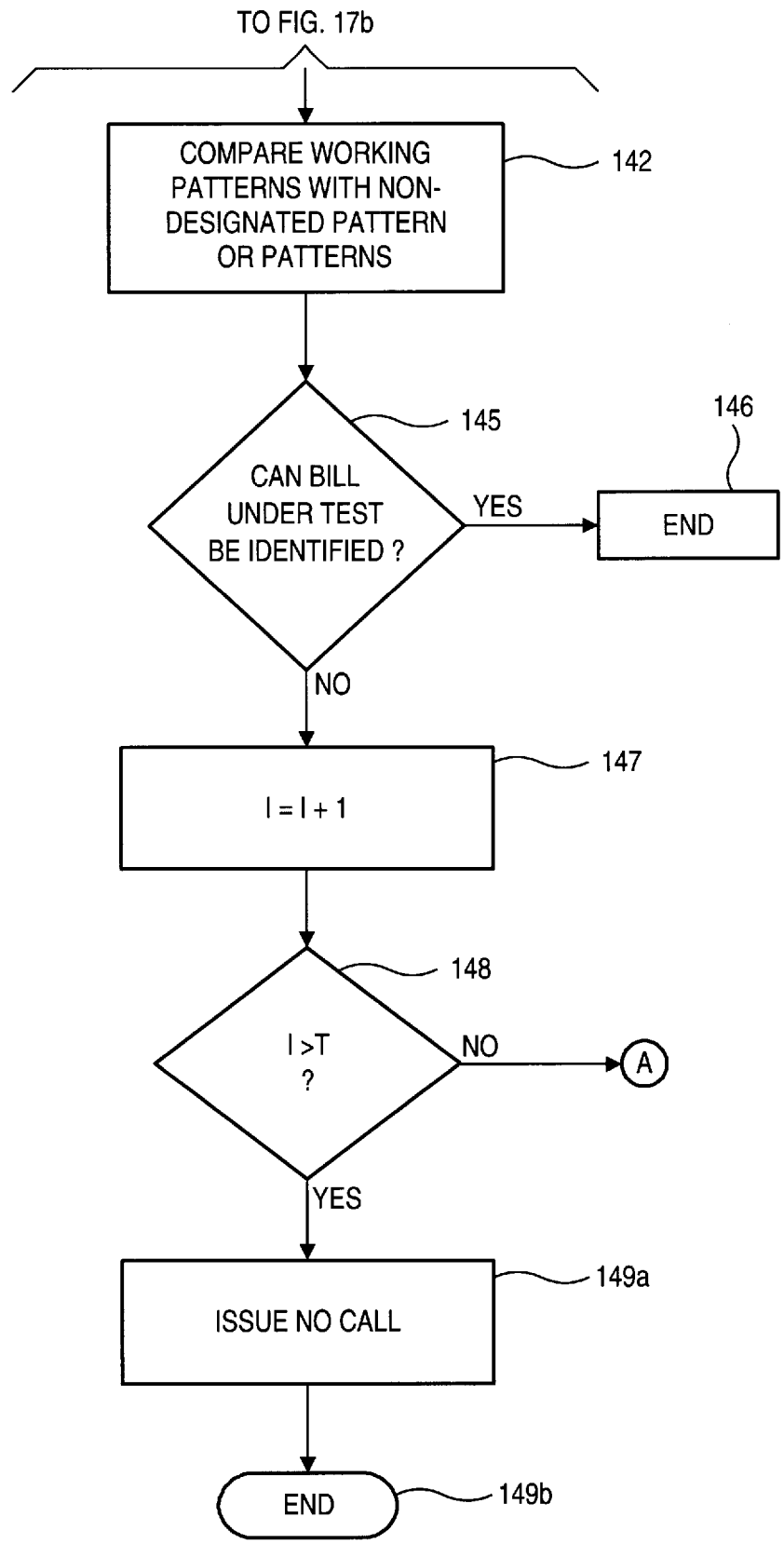

Another preferred embodiment of the present invention can be understood with reference to the flowchart of FIGS. 17a–17c. The process of FIGS. 17a–17c involves a method of identifying a bill under test by comparing a scanned pattern retrieved from a bill under test with one or more master patterns associated with one or more genuine bills. After the process begins at step 128a, the scanned pattern is compared with one or more master patterns associated with genuine bills (step 128b). At step 129 it is determined whether the bill under test can be identified based on the comparison at step 128b. This may be accomplished by evaluating the correlation between the scanned pattern and each of the master patterns. If the bill can be identified, the process is ended at step 130. Otherwise, one or more of the master patterns are designated for further processing at step 131. For example, all of the master patterns may be designated for further processing. Alternatively, less than all of the master patterns may be designated based on a preliminary assessment about the identity of the bill under test. For example, only the master patterns which had the four highest correlation values with respect to the scanned pattern at step 128b might be chosen for further processing. In any case, the number of master patterns designated for further processing is M1.

At step 132, either the scanned pattern is designated for modification or the M1 master patterns designated at step 131 are designated for modification. In a preferred embodiment of the present invention, the scanned pattern is designated for modification and the master patterns remain unmodified. At step 133, it is designated whether forward modification or reverse modification is to be performed. This determination may be made, for example, by analyzing the beginning or ending data samples of the scanned pattern to determine whether the scanned pattern trails or leads the master patterns.

At step 134, the iteration counter, I, is set equal to one. The iteration counter is used to keep track of how many times the working patterns have been modified. Then at step 135, the number of incremental data samples, R, to be removed during each iteration is set. For example, in a preferred embodiment of the present invention, only one additional data sample is removed from each working pattern during each iteration in which case R is set equal to one.

At step 136, it is determined whether the scanned pattern has been designated for modification. If it has, then the scanned pattern is replicated M1 times and the M1 replicated patterns, one for each of the M1 master patterns, are designated as working patterns at step 137. If the scanned pattern has not been designated for modification, then the M1 master patterns have been so designated, and the M1 master patterns are replicated and designated as working patterns at step 138. Regardless of which pattern or patterns were designated for modification, at step 139, it is determined whether forward or reverse modification is to be performed on the working patterns.

If forward modification is to be performed, the first R×I data samples from each working pattern are removed at step 140. The first R×I data samples may either be explicitly removed from the working patterns or be removed as a result of adding additional data samples (step 141) to the end of the pattern and designating the beginning of the modified pattern to be the R×I+1 sequence position of the original pattern. As a result of the modification, the data sample which was in the 64th sequence position in the original working pattern will be in the 64-(R×I) sequence position. The added data values in the last R×I sequence positions of a working pattern are copied from the data samples in the last R×I sequence positions of a corresponding non-designated pattern at step 141. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

Alternatively, if reverse modification is to be performed, the last R×I data samples from each working pattern are removed at step 143. The last R'I data samples may either be explicitly removed from the working patterns or be removed as a result of adding additional data samples (step 144) to the beginning of the pattern and designating the beginning of the modified pattern to start with the added data samples. As a result of the modification, the data sample which was in the 1st sequence position in the original working pattern will be in the (R×I)+1 sequence position. The added data samples in first R×I sequence positions of a working pattern are copied from the data samples in the first R×I sequence positions of a corresponding non-designated pattern at step 144. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 142.

For example, if the scanned pattern is designated for forward modification and four master patterns are designated for further processing, four working patterns are generated from the scanned pattern at step 137, one for each of the four master patterns. If R is set to two at step 135, during the first iteration the last two data samples from each of the M1 master patterns are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of the scanned pattern but with each having data values in its last two sequence positions copied from the last two sequence positions of a respective one of the M1 master patterns. After a second iteration, the last four sequence positions of each of the M1 master patterns are copied and added to the end of the M1 working patterns so as to become the last four sequence positions of a respective one of the M1 working patterns.

As another example, if four master patterns are designated for further processing and the four designated master patterns are designated for forward modification, four working patterns are generated at step 138, one from each of the four designated master patterns. If R is set to two at step 135, during the first iteration the last two data samples of the scanned pattern are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of a corresponding master pattern but with each having data values in its last two sequence position copied from the last two sequence positions of the scanned pattern. After a second iteration, the last four sequence positions of the scanned pattern are copied and added to the end of the M1 working patterns so as to become the last four sequence positions of the M1 working patterns.

After the comparison at step 142, it is determined whether the bill under test can be identified at step 145. If the bill can be identified the process is ended at step 146. Otherwise, the iteration counter, I, is incremented by one (step 147) and the incremented iteration counter is compared to a maximum iteration number, T (step 148). If the iteration counter, I, is greater than the maximum iteration number, T, then a no call is issued (step 149$a$), meaning that a match sufficient to identify the bill under test was not obtained, and the process is ended (step 149$b$). Otherwise, if the iteration is not greater than the maximum iteration number, the modification process is repeated beginning with step 136.

The flowchart of FIGS. 17$a$–17$c$ is intended to illustrate one preferred embodiment of the present invention. However, it is recognized that there are numerous ways in which the steps of the flowchart of FIGS. 17$a$–17$c$ may be rearranged or altered and yet still result in the comparison of the same patterns as would be compared if the steps of FIGS. 17$a$–17$c$ were followed exactly. For example, instead of generating multiple working patterns, a single working pattern may be generated and the leading or trailing sequence positions successively altered before comparisons to corresponding non-designated patterns. Likewise, instead of generating multiple modified patterns directly from unmodified patterns, multiple modified patterns may be generated from the preceding modified patterns. For example, instead of generating a twice forward modified scanned pattern by removing the first two data samples from the original scanned pattern and copying the last 2R sequence positions of a corresponding master pattern and adding these data values to the end of the original scanned pattern, the first data sample of the single forward modified scanned pattern may be removed and one data sample added to the end of the single modified scanned pattern and then the data samples in the last two sequence positions may be set equal to the data samples in the last 2R sequence positions of a corresponding master pattern.

In an alternate preferred embodiment of the present invention, instead of copying data values from a scanned pattern into corresponding sequence positions of modified master patterns, leading or trailing sequence positions of modified master patterns are filled with zeros.

In an alternate preferred embodiment of the present invention, modified master patterns are stored, for example in EPROM 60 of FIG. 6$a$, before a bill under test is scanned. In such an embodiment, a scanned pattern retrieved from a bill under test is compared to the modified master patterns stored in memory. Modified master patterns are generated by modifying a corresponding master pattern in either the forward or backward direction, or both, and filling in any trailing or leading sequence positions with zeros. An advantage of such a preferred embodiment is that no modification needs to be performed during the normal operation of an identification device incorporating such an embodiment.

Figure 18:
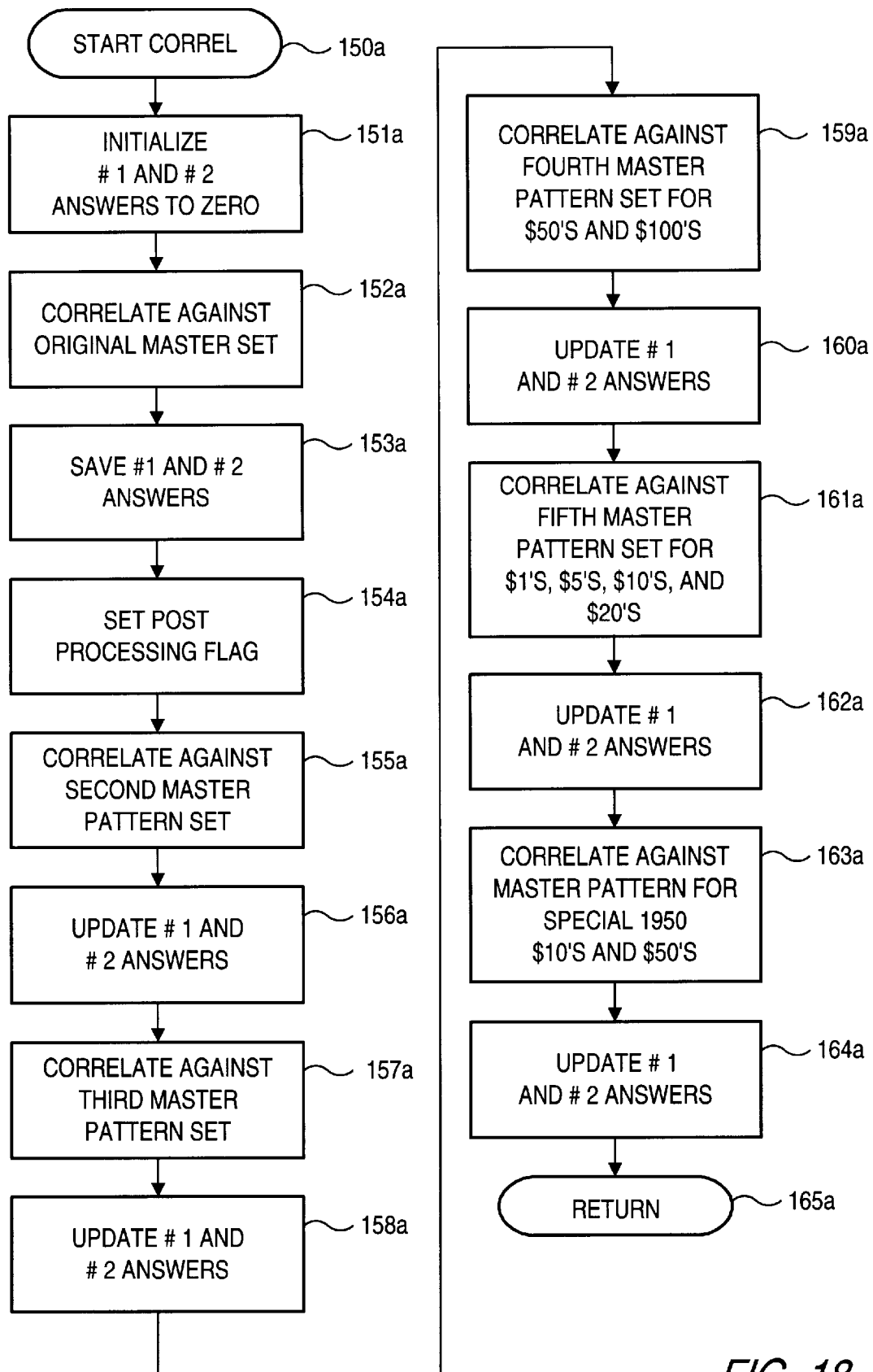
FIG. 18 is a flow chart illustrating the sequential procedure involved in the execution of multiple correlations of the scan data from a single bill.
Figure 19:
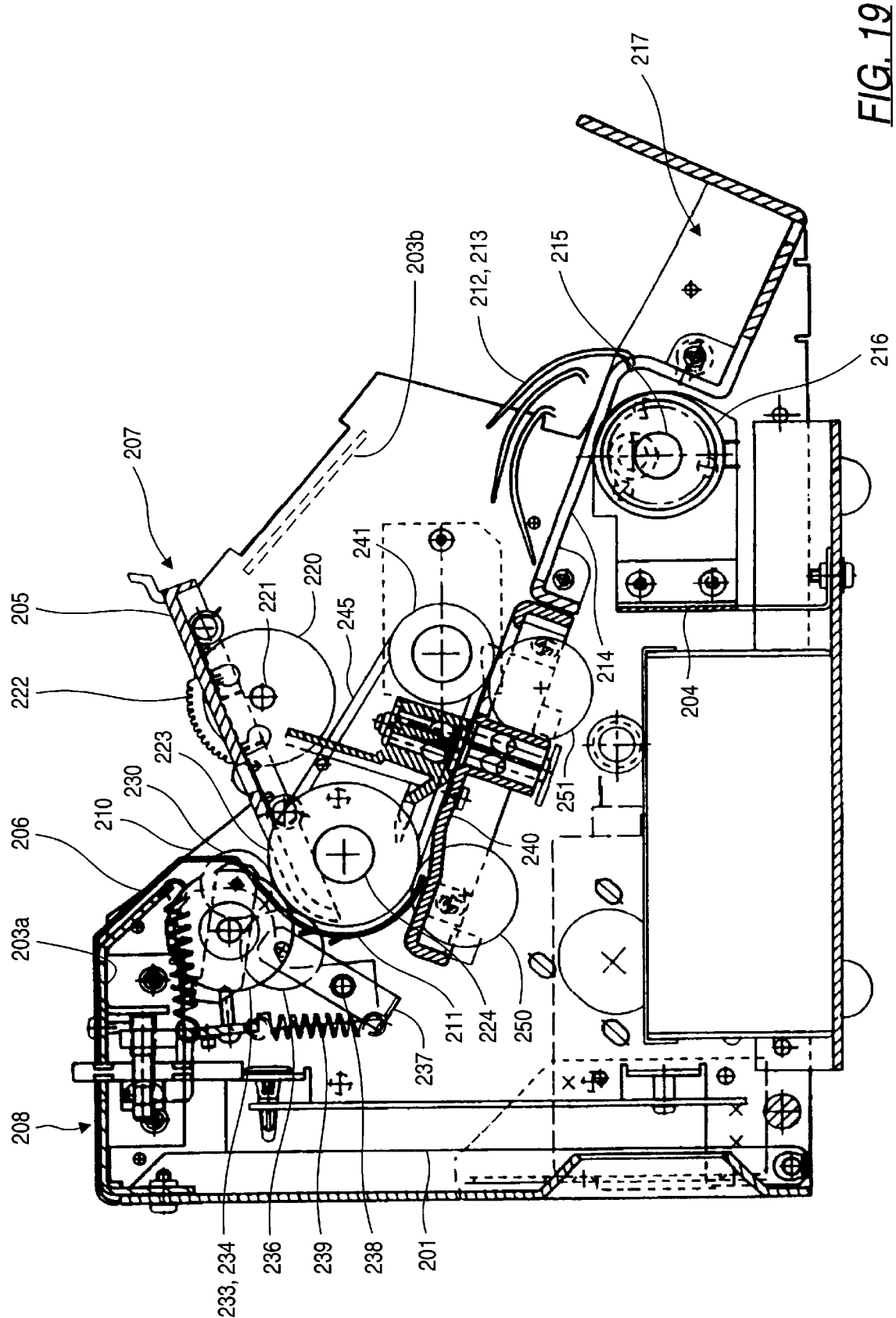
FIG. 19 is an enlarged vertical section taken approximately through the center of the machine, but showing the various transport rolls in side elevation.

An example of a procedure involved in comparing test patterns to master patterns is illustrated at FIG. 18 which shows the routine as starting at step 150. At step 151, the best and second best correlation results (referred to in FIG. 18 as the "#1 and #2 answers") are initialized to zero and, at step 152, the test pattern is compared with each of the sixteen original master patterns stored in the memory. At step 153, the calls corresponding to the two highest correlation numbers obtained up to that point are determined and saved. At step 154, a post-processing flag is set. At step 155 the test pattern is compared with each of a second set of 16 master patterns stored in the memory. This second set of master patterns is the same as the 16 original master patterns except that the last sample is dropped and a zero is inserted in front of the first sample. If any of the resulting correlation numbers is higher than the two highest numbers previously saved, the #1 and #2 answers are updated at step 156.

Steps 155 and 156 are repeated at steps 157 and 158, using a third set of master patterns formed by dropping the last two samples from each of the 16 original master patterns and inserting two zeros in front of the first sample. At steps 159 and 160 the same steps are repeated again, but using only $50 and $100 master patterns formed by dropping the last three samples from the original master patterns and adding three zeros in front of the first sample. Steps 161 and 162 repeat the procedure once again, using only $1, $5, $10 and $20 master patterns formed by dropping the 33rd sample whereby original samples 34–64 become samples 33–63 and inserting a 0 as the new last sample. Finally, steps 163 and 164 repeat the same procedure, using master patterns for $10 and $50 bills printed in 1950, which differ significantly from bills of the same denominations printed in later years. This routine then returns to the main program at step 165. The above multiple sets of master patterns may be pre-stored in EPROM 60.

Referring now to FIGS. 19–22, the mechanical portions of the preferred currency discrimination and counting machine include a rigid frame formed by a pair of side plates 201 and 202, a pair of top plates 203$a$ and 203$b$, and a lower front plate 204. The input receptacle for receiving a stack of bills to be processed is formed by downwardly sloping and converging walls 205 and 206 formed by a pair of removable covers 207 and 208 which snap onto the frame. The rear wall 206 supports a removable hopper 209 which includes a pair of vertically disposed side walls 210$a$ and 210$b$ which complete the receptacle for the stack of currency bills to be processed.

From the input receptacle, the currency bills are moved in seriatim from the bottom of the stack along a curved guideway 211 which receives bills moving downwardly and rearwardly and changes the direction of travel to a forward direction. The curvature of the guideway 211 corresponds substantially to the curved periphery of the drive roll 223 so as to form a narrow passageway for the bills along the rear side of the drive roll. The exit end of the guideway 211 directs the bills onto a linear path where the bills are scanned and stacked. The bills are transported and stacked with the narrow dimension of the bills maintained parallel to the transport path and the direction of movement at all times.

Stacking of the bills is effected at the forward end of the linear path, where the bills are fed into a pair of driven stacking wheels 212 and 213. These wheels project upwardly through a pair of openings in a stacker plate 214 to receive the bills as they are advanced across the downwardly sloping upper surface of the plate. The stacker wheels 212 and 213 are supported for rotational movement about a shaft 215 journalled on the rigid frame and driven by a motor 216. The flexible blades of the stacker wheels deliver the bills into an output receptacle 217 at the forward end of the stacker plate 214. During operation, a currency bill which is delivered to the stacker plate 214 is picked up by the flexible blades and becomes lodged between a pair of adjacent blades which, in combination, define a curved enclosure which decelerates a bill entering therein and serves as a means for supporting and transferring the bill into the output receptacle 217 as the stacker wheels 212, 213 rotate. The mechanical configuration of the stacker wheels, as well as the manner in which they cooperate with the stacker plate, is conventional and, accordingly, is not described in detail herein.

Returning now to the input region of the machine as shown in FIGS. 19–22, bills that are stacked on the bottom wall 205 of the input receptacle are stripped, one at a time, from the bottom of the stack. The bills are stripped by a pair of stripping wheels 220 mounted on a drive shaft 221 which, in turn, is supported across the side walls 201, 202. The stripping wheels 220 project through a pair of slots formed in the cover 207. Part of the periphery of each wheel 220 is provided with a raised high-friction, serrated surface 222 which engages the bottom bill of the input stack as the wheels 220 rotate, to initiate feeding movement of the bottom bill from the stack. The serrated surfaces 222 project radially beyond the rest of the wheel peripheries so that the wheels "jog" the bill stack during each revolution so as to agitate and loosen the bottom currency bill within the stack, thereby facilitating the stripping of the bottom bill from the stack.

The stripping wheels 220 feed each stripped bill B (FIG. 21a) onto a drive roll 223 mounted on a driven shaft 224 supported across the side walls 201 and 202. As can be seen most clearly in FIGS. 21a and 21b, the drive roll 223 includes a central smooth friction surface 225 formed of a material such as rubber or hard plastic. This smooth friction surface 225 is sandwiched between a pair of grooved surfaces 226 and 227 having serrated portions 228 and 229 formed from a high-friction material.

The serrated surfaces 228, 229 engage each bill after it is fed onto the drive roll 223 by the stripping wheels 220, to frictionally advance the bill into the narrow arcuate passageway formed by the curved guideway 211 adjacent the rear side of the drive roll 223. The rotational movement of the drive roll 223 and the stripping wheels 220 is synchronized so that the serrated surfaces on the drive roll and the stripping wheels maintain a constant relationship to each other. Moreover, the drive roll 223 is dimensioned so that the circumference of the outermost portions of the grooved surfaces is greater than the width W of a bill, so that the bills advanced by the drive roll 223 are spaced apart from each other, for the reasons discussed above. That is, each bill fed to the drive roll 223 is advanced by that roll only when the serrated surfaces 228, 229 come into engagement with the bill, so that the circumference of the drive roll 223 determines the spacing between the leading edges of successive bills.

To avoid the simultaneous removal of multiple bills from the stack in the input receptacle, particularly when small stacks of bills are loaded into the machine, the stripping wheels 220 are always stopped with the raised, serrated portions 222 positioned below the bottom wall 205 of the input receptacle. This is accomplished by continuously monitoring the angular position of the serrated portions of the stripping wheels 220 via the encoder 32, and then controlling the stopping time of the drive motor so that the motor always stops the stripping wheels in a position where the serrated portions 222 are located beneath the bottom wall 205 of the input receptacle. Thus, each time a new stack of bills is loaded into the machine, those bills will rest on the smooth portions of the stripping wheels. This has been found to significantly reduce the simultaneous feeding of double or triple bills, particularly when small stacks of bills are involved.

In order to ensure firm engagement between the drive roll 223 and the currency bill being fed, an idler roll 230 urges each incoming bill against the smooth central surface 225 of the drive roll 223. The idler roll 230 is journalled on a pair of arms 231 which are pivotally mounted on a support shaft 232. Also mounted on the shaft 232, on opposite sides of the idler roll 230, are a pair of grooved guide wheels 233 and 234. The grooves in these two wheels 233, 234 are registered with the central ribs in the two grooved surfaces 226, 227 of the drive roll 223. The wheels 233, 234 are locked to the shaft 232, which in turn is locked against movement in the direction of the bill movement (clockwise as view in FIG. 19) by a one-way spring clutch 235. Each time a bill is fed into the nip between the guide wheels 233, 234 and the drive roll 223, the clutch 235 is energized to turn the shaft 232 just a few degrees in a direction opposite the direction of bill movement. These repeated incremental movements distribute the wear uniformly around the circumferences of the guide wheels 233, 234. Although the idler roll 230 and the guide wheels 233, 234 are mounted behind the guideway 211, the guideway is apertured to allow the roll 230 and the wheels 233, 234 to engage the bills on the front side of the guideway.

Beneath the idler roll 230, a spring-loaded pressure roll 236 (FIGS. 19 and 21b) presses the bills into firm engagement with the smooth friction surface 225 of the drive roll as the bills curve downwardly along the guideway 211. This pressure roll 236 is journalled on a pair of arms 237 pivoted on a stationary shaft 238. A spring 239 attached to the lower ends of the arms 237 urges the roll 236 against the drive roll 233, through an aperture in the curved guideway 211.

At the lower end of the curved guideway 211, the bill being transported by the drive roll 223 engages a flat guide plate 240 which carries a lower scan head 18. Currency bills are positively driven along the flat plate 240 by means of a transport roll arrangement which includes the drive roll 223 at one end of the plate and a smaller driven roll 241 at the other end of the plate. Both the driver roll 223 and the smaller roll 241 include pairs of smooth raised cylindrical surfaces 242 and 243 which hold the bill flat against the plate 240. A pair of O rings 244 and 245 fit into grooves formed in both the roll 241 and the roll 223 to engage the bill continuously between the two rolls 223 and 241 to transport the bill while helping to hold the bill flat against the guide plate 240.

The flat guide plate 240 is provided with openings through which the raised surfaces 242 and 243 of both the drive roll 223 and the smaller driven roll 241 are subjected to counter-rotating contact with corresponding pairs of passive transport rolls 250 and 251 having high-friction rubber surfaces. The passive rolls 250, 251 are mounted on the underside of the flat plate 240 in such a manner as to be freewheeling about their axes 254 and 255 and biased into counter-rotating contact with the corresponding upper rolls 223 and 241. The passive rolls 250 and 251 are biased into contact with the driven rolls 223 and 241 by means of a pair of H-shaped leaf springs 252 and 253 (see FIGS. 23 and 24). Each of the four rolls 250, 251 is cradled between a pair of parallel arms of one of the H-shaped leaf springs 252 and 253. The central portion of each leaf spring is fastened to the plate 240, which is fastened rigidly to the machine frame, so that the relatively stiff arms of the H-shaped springs exert a constant biasing pressure against the rolls and push them against the upper rolls 223 and 241.

The points of contact between the driven and passive transport rolls are preferably coplanar with the flat upper surface of the plate 240 so that currency bills can be positively driven along the top surface of the plate in a flat manner. The distance between the axes of the two driven transport rolls, and the corresponding counter-rotating passive rolls, is selected to be just short of the length of the narrow dimension of the currency bills. Accordingly, the bills are firmly gripped under uniform pressure between the upper and lower transport rolls within the scanhead area, thereby minimizing the possibility of bill skew and enhancing the reliability of the overall scanning and recognition process.

The positive guiding arrangement described above is advantageous in that uniform guiding pressure is maintained on the bills as they are transported through the optical scanhead area, and twisting or skewing of the bills is substantially reduced. This positive action is supplemented by the use of the H-springs 252, 253 for uniformly biasing the passive rollers into contact with the active rollers so that bill twisting or skew resulting from differential pressure applied to the bills along the transport path is avoided. The O-rings 244, 245 function as simple, yet extremely effective means for ensuring that the central portions of the bills are held flat.

Figure 23:
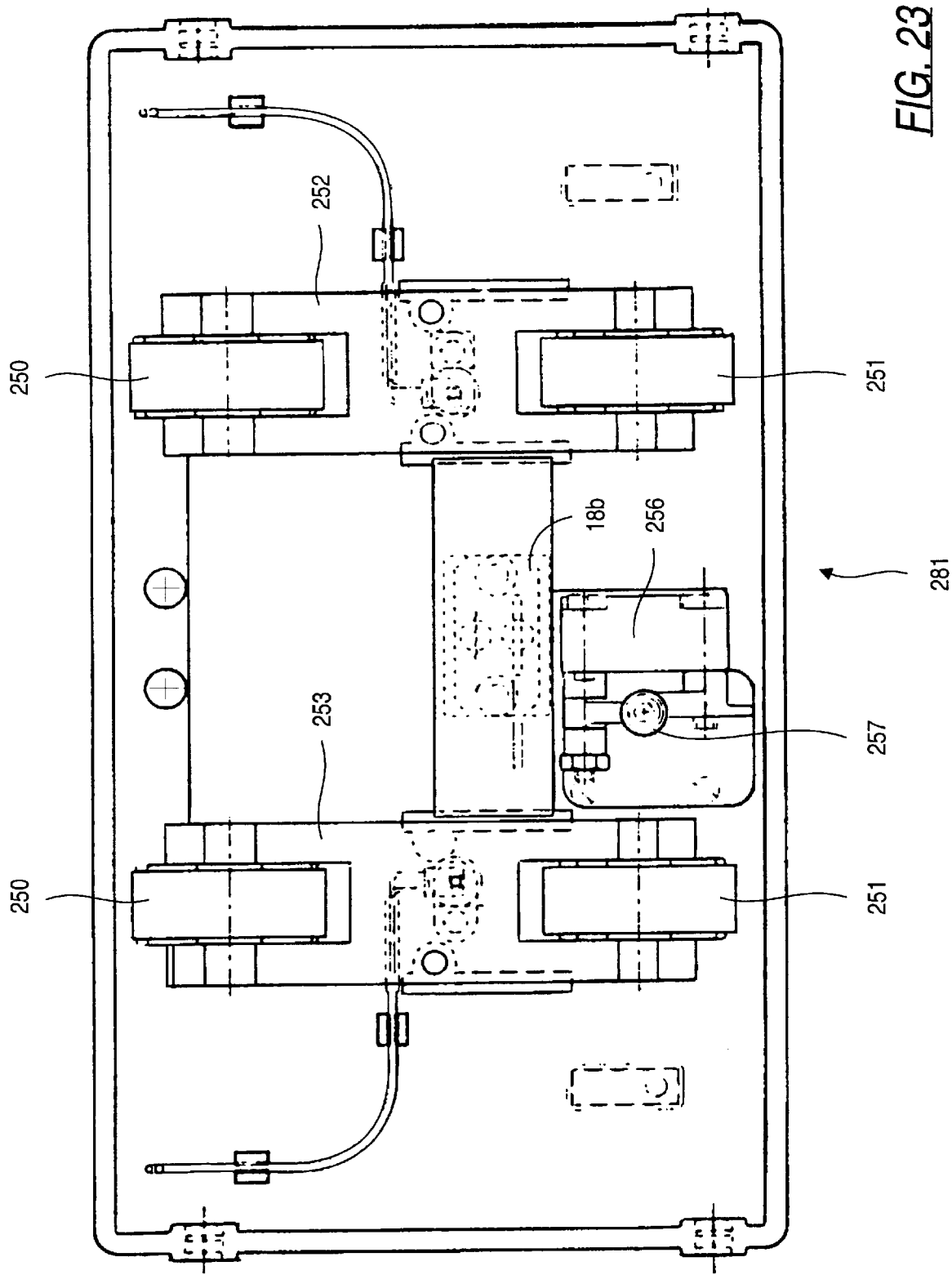
FIG. 23 is an enlarged bottom plan view of the lower support member in the machine of FIG. 1 and the passive transport rolls mounted on that member.
Figure 24:
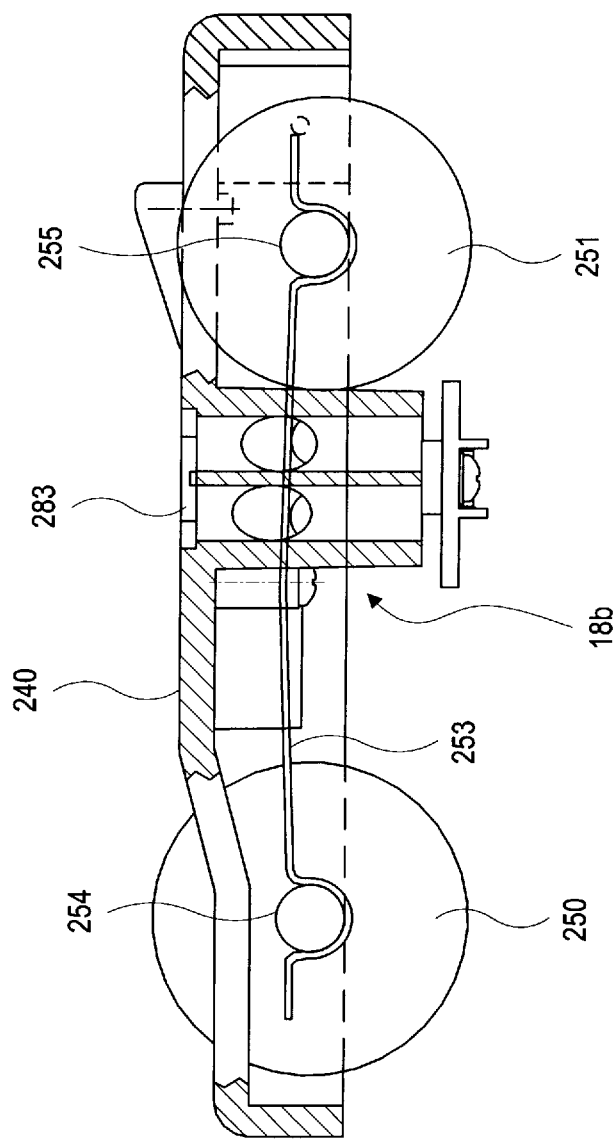
FIG. 24 is a sectional view taken across the center of the bottom support member of FIG. 23 across the narrow dimension thereof.
Figure 26:
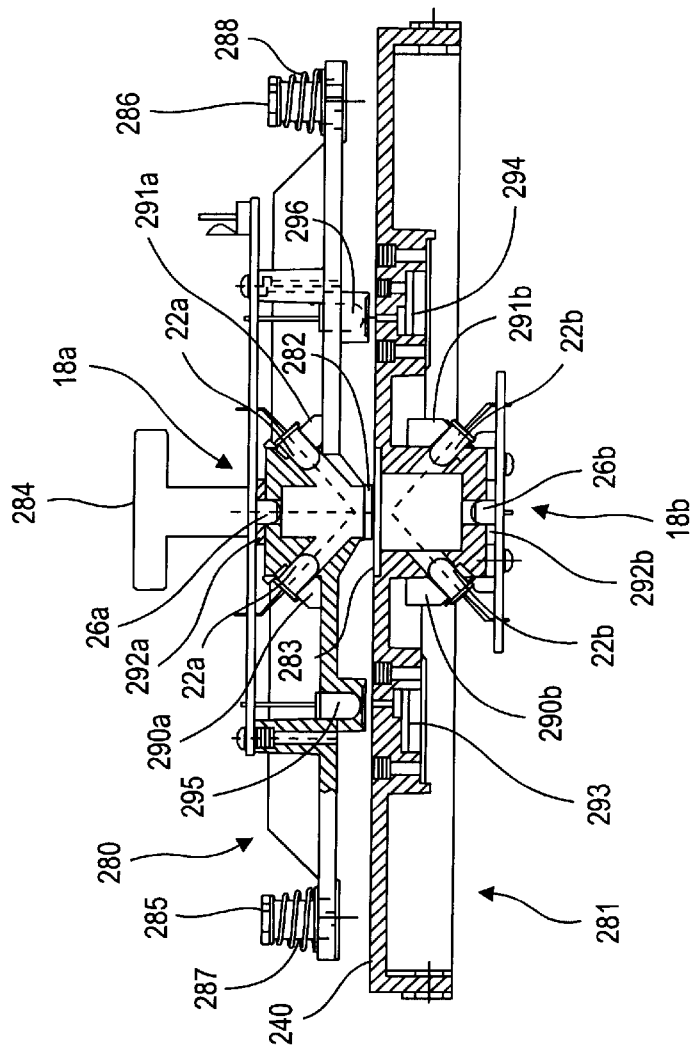
FIG. 26 is a section taken through the centers of both the upper and lower support members, along the long dimension of the lower support member shown in FIG. 23.
Figure 25:
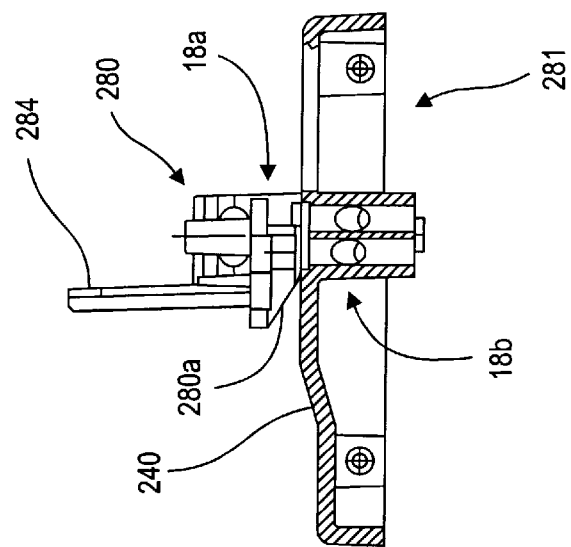
FIG. 25 is an end elevation of the upper support member which includes the upper scanhead in the machine of FIG. 1, and the sectional view of the lower support member mounted beneath the upper support member.
Figure 27:
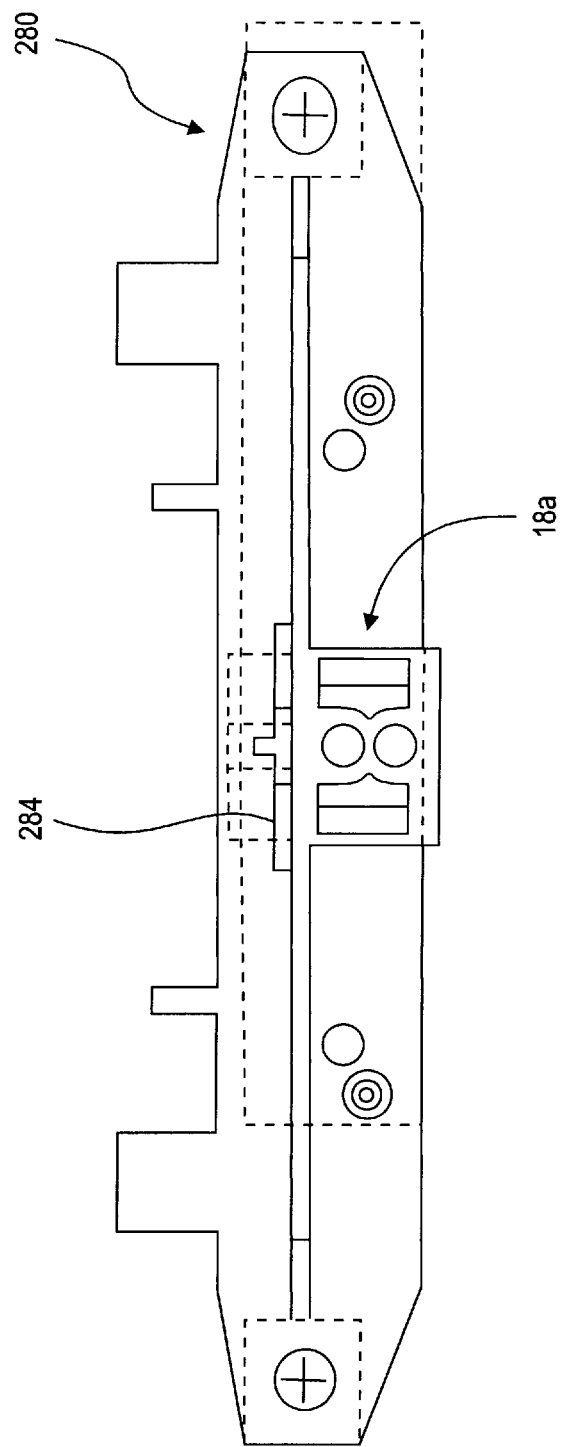
FIG. 27 is a top plan view of the upper support member which includes the upper scanhead.
Figure 28:
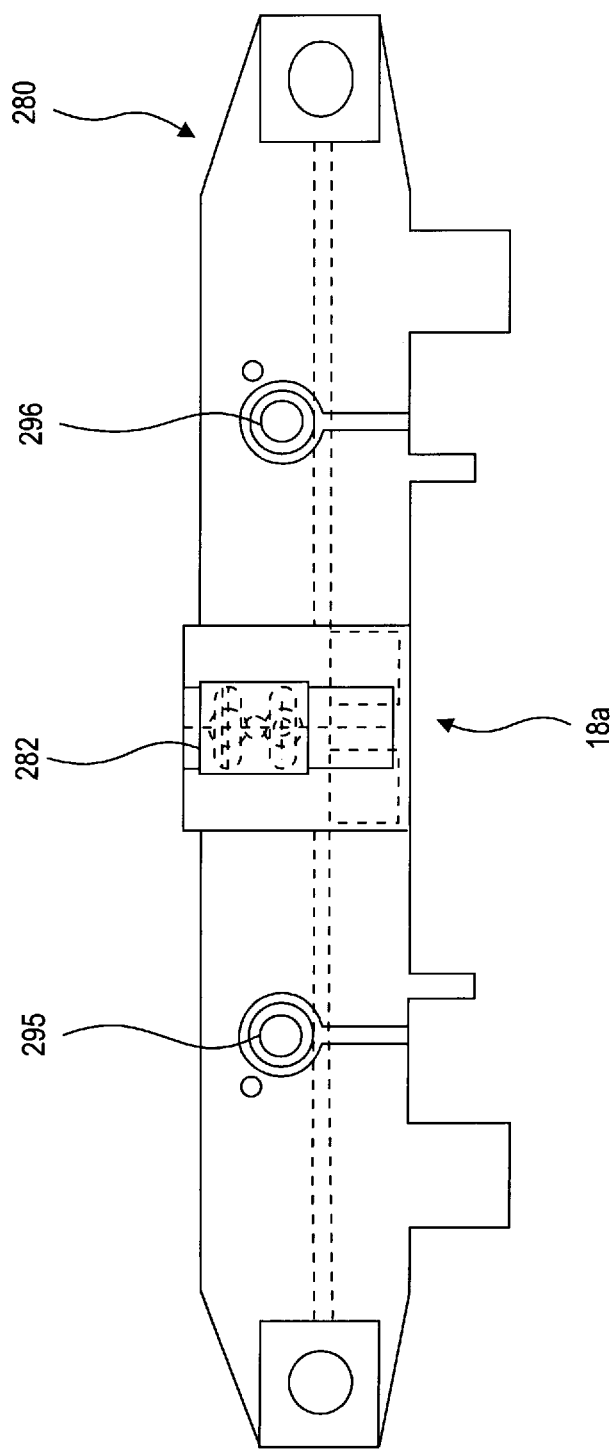
FIG. 28 is a bottom plan view of the upper support member which includes the upper scanhead.

The location of a magnetic head 256 and a magnetic head adjustment screw 257 are illustrated in FIG. 23. The adjustment screw 257 adjusts the proximity of the magnetic head 256 relative to a passing bill and thereby adjusts the strength of the magnetic field in the vicinity of the bill.

Figure 22:
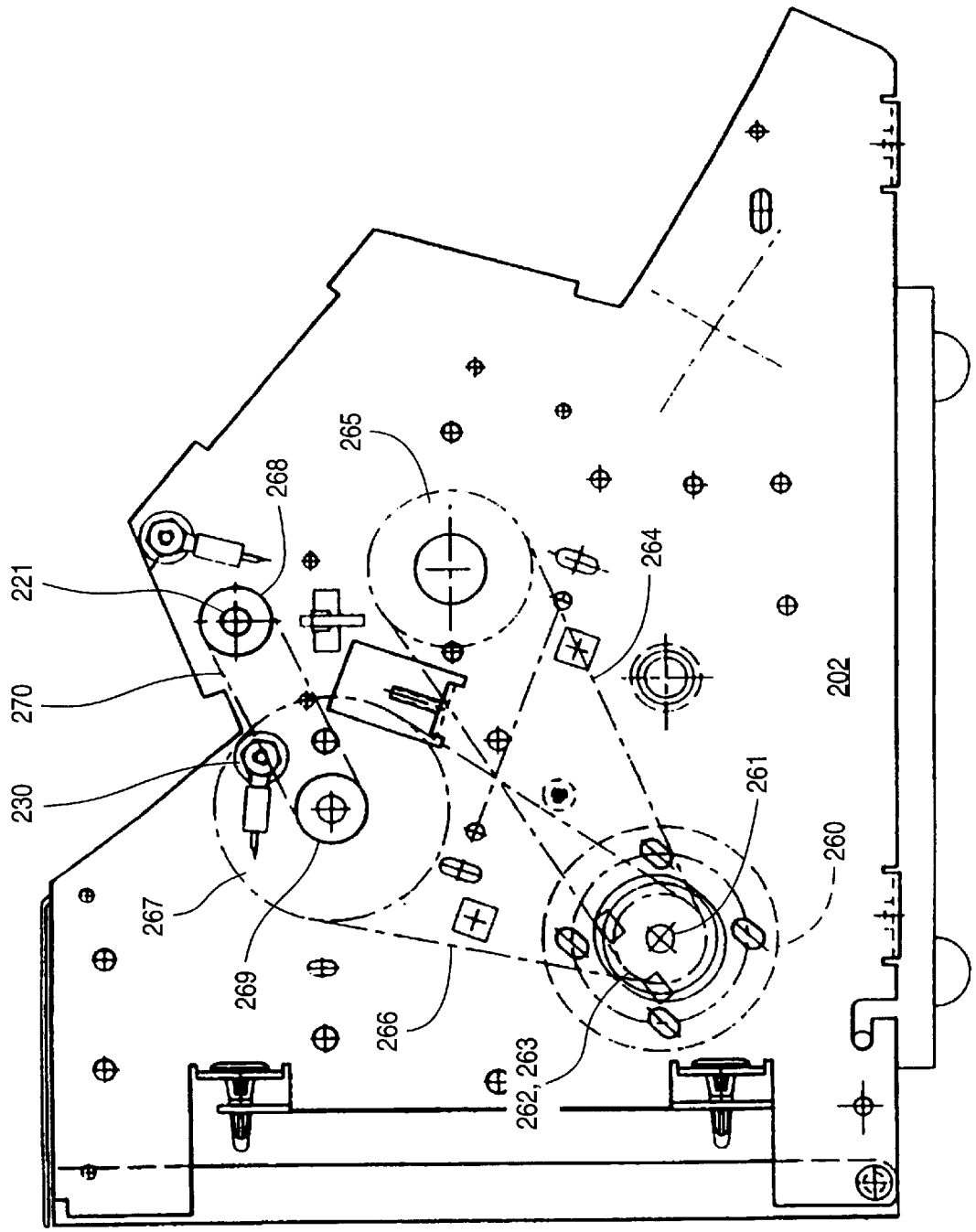
FIG. 22 is a side elevation of the machine of FIG. 1, with the side panel of the housing removed.

FIG. 22 shows the mechanical arrangement for driving the various means for transporting currency bills through the machine. A motor 260 drives a shaft 261 carrying a pair of pulleys 262 and 263. The pulley 262 drives the roll 241 through a belt 264 and pulley 265, and the pulley 263 drives the roll 223 through a belt 266 and pulley 267. Both pulleys 265 and 267 are larger than pulleys 262 and 263 in order to achieve the desired speed reduction from the typically high speed at which the motor 260 operates.

The shaft 221 of the stripping wheels 220 is driven by means of a pulley 268 provided thereon and linked to a corresponding pulley 269 on the shaft 224 through a belt 270. The pulleys 268 and 269 are of the same diameter so that the shafts 221 and 224 rotate in unison.

Figure 20:
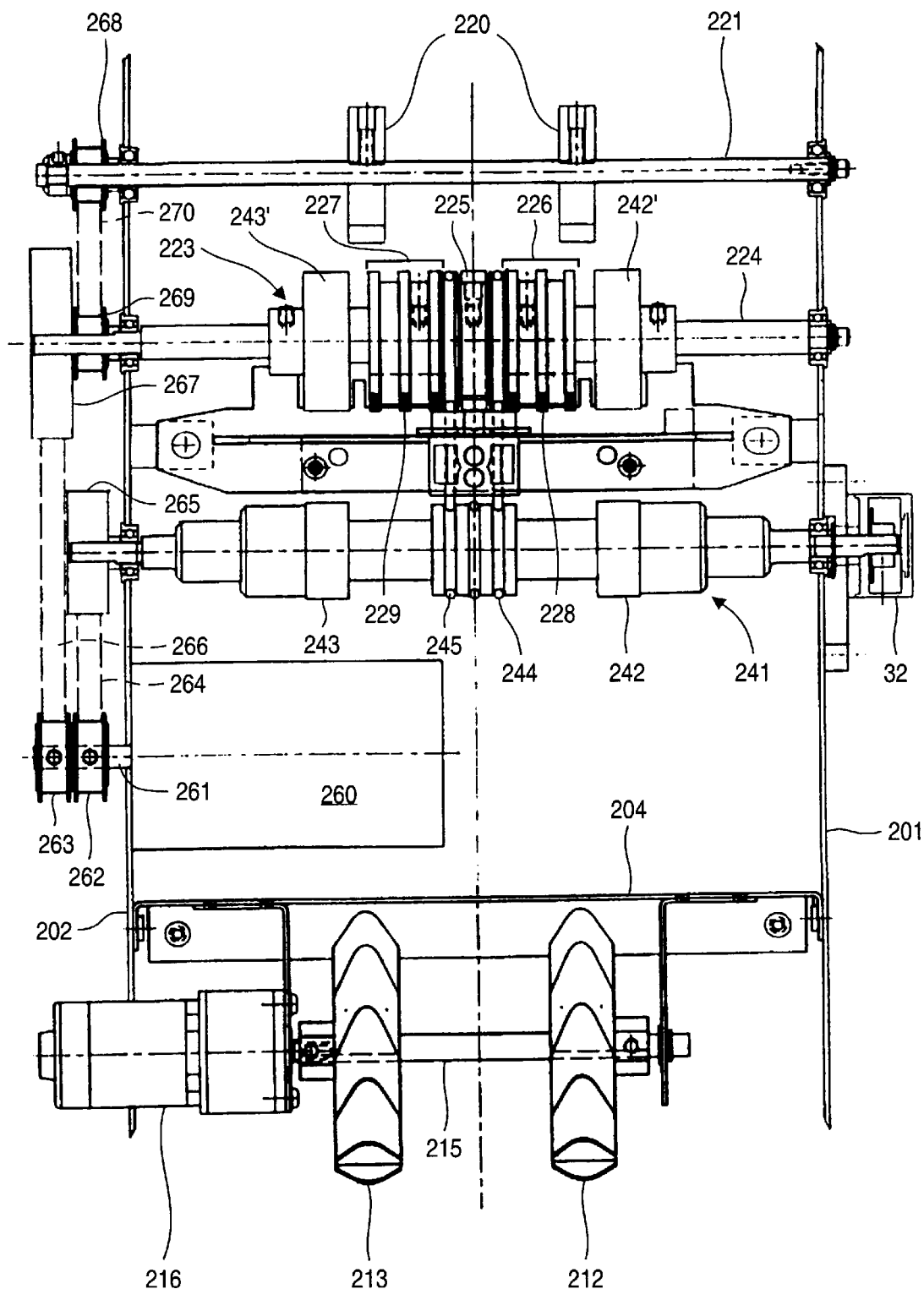
FIG. 20 is a top plan view of the interior mechanism of the machine of FIG. 1 for transporting bills across the optical scanheads, and also showing the stacking wheels at the front of the machine.
Figure 21A:
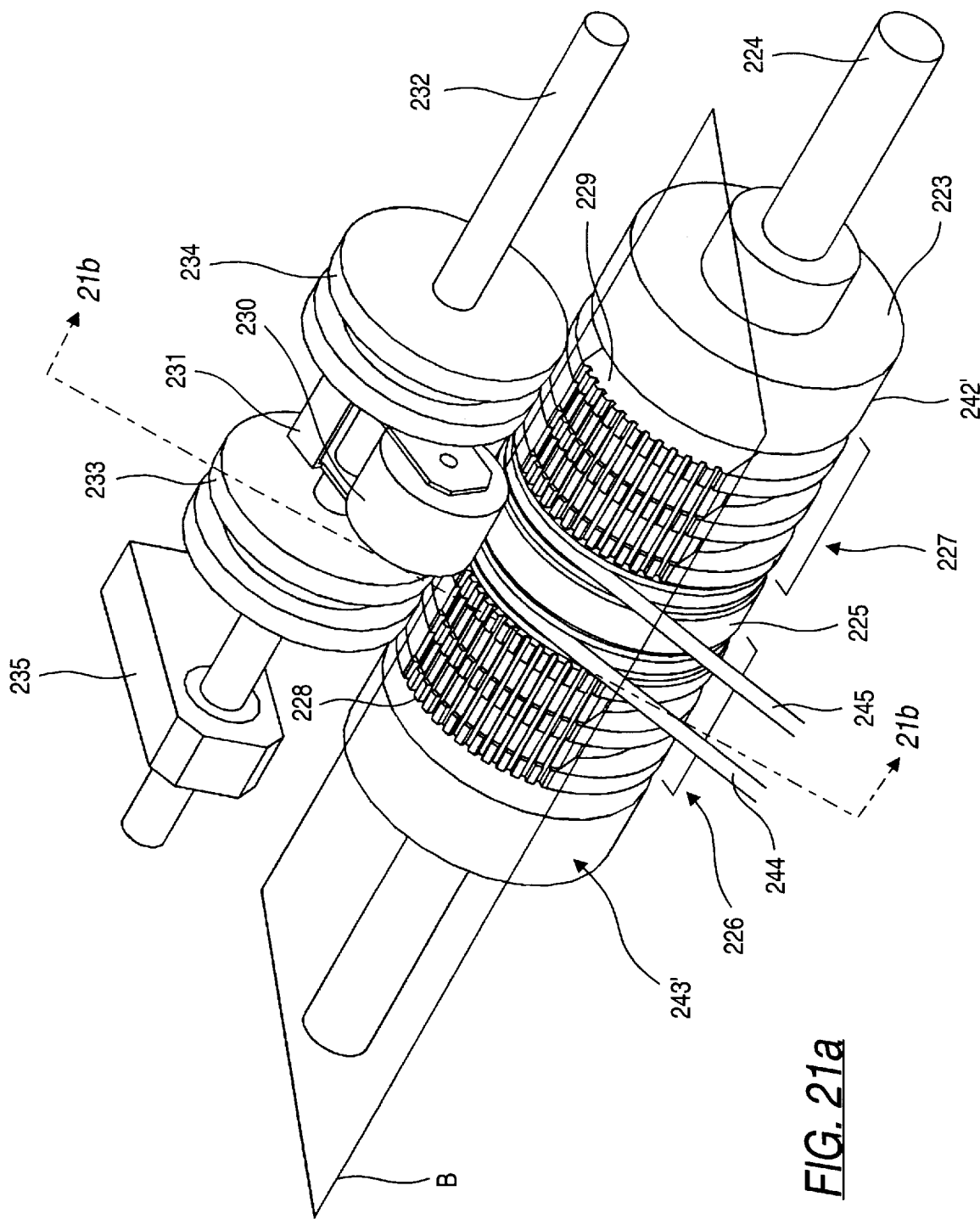
FIG. 21a is an enlarged perspective view of the bill transport mechanism which receives bills from the stripping wheels in the machine of FIG. 1.
Figure 21B:
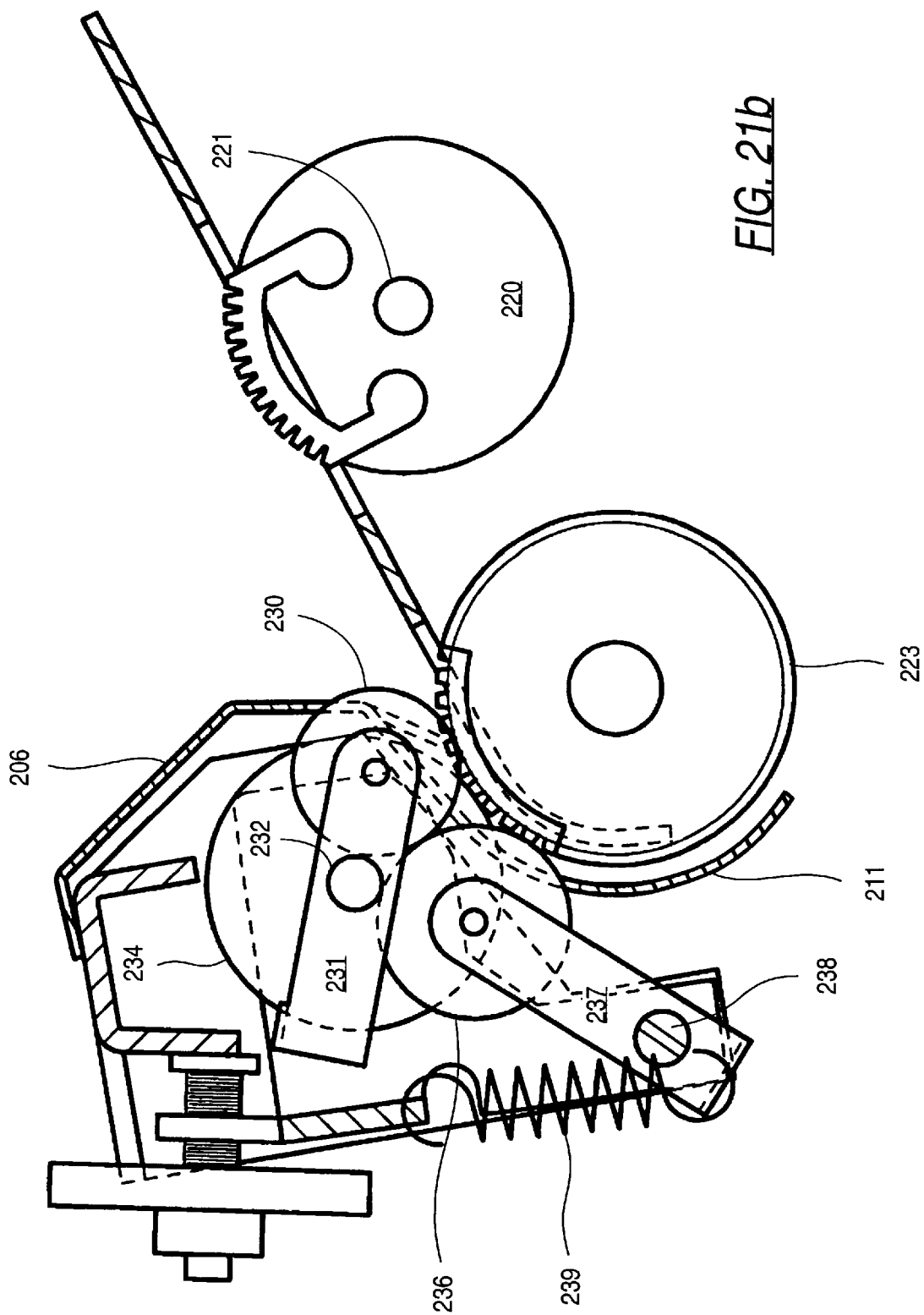
FIG. 21b is a cross-sectional view of the bill transport mechanism depicted in FIG. 21a along line 21b.

As shown in FIG. 20, the optical encoder 32 is mounted on the shaft of the roller 241 for precisely tracking the position of each bill as it is transported through the machine, as discussed in detail above in connection with the optical sensing and correlation technique.

The upper and lower scanhead assemblies are shown most clearly in FIGS. 25–28. It can be seen that the housing for each scanhead is formed as an integral part of a unitary molded plastic support member 280 or 281 that also forms the housings for the light sources and photodetectors of the photosensors PS1 and PS2. The lower member 281 also forms the flat guide plate 240 that receives the bills from the drive roll 223 and supports the bills as they are driven past the scanheads 18a and 18b.

The two support members 280 and 281 are mounted facing each other so that the lenses 282 and 283 of the two scanheads 18a, 18b define a narrow gap through which each bill is transported. Similar, but slightly larger, gaps are formed by the opposed lenses of the light sources and photodetectors of the photosensors PS1 and PS2. The upper support member 280 includes a tapered entry guide 280a which guides an incoming bill into the gaps between the various pairs of opposed lenses.

The lower support member 281 is attached rigidly to the machine frame. The upper support member 280, however, is mounted for limited vertical movement when it is lifted manually by a handle 284, to facilitate the clearing of any paper jams that occur beneath the member 280. To allow for such vertical movement, the member 280 is slidably mounted on a pair of posts 285 and 286 on the machine frame, with a pair of springs 287 and 288 biasing the member 280 to its lowermost position.

Each of the two optical scanheads 18a and 18b housed in the support members 280, 281 includes a pair of light sources acting in combination to uniformly illuminate light strips of the desired dimension on opposite sides of a bill as it is transported across the plate 240. Thus, the upper scanhead 18a includes a pair of LEDs 22a, directing light downwardly through an optical mask on top of the lens 282 onto a bill traversing the flat guide plate 240 beneath the scanhead. The LEDs 22a are angularly disposed relative to the vertical axis of the scanhead so that their respective light beams combine to illuminate the desired light strip defined by an aperture in the mask. The scanhead 18a also includes a photodetector 26a mounted directly over the center of the illuminated strip for sensing the light reflected off the strip. The photodetector 26a is linked to the CPU 30 through the ADC 28 for processing the sensed data as described above.

Figure 29:
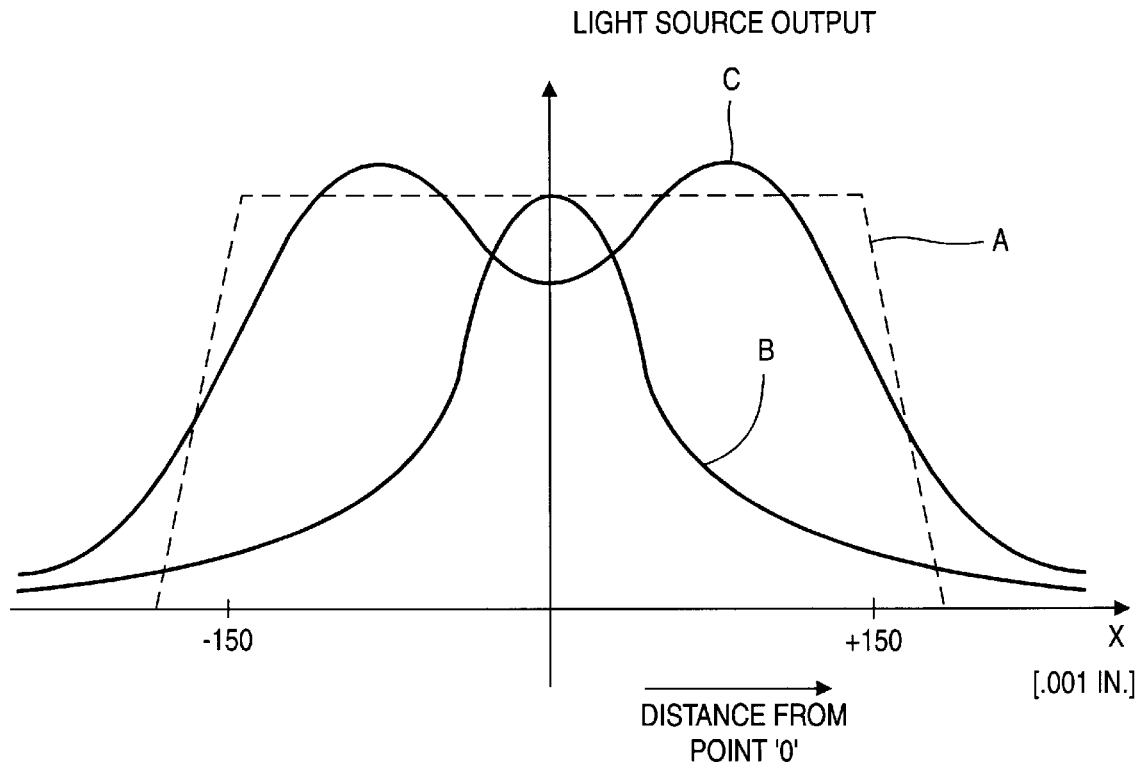
FIG. 29 is an illustration of the light distribution produced about one of the optical scanheads.
Figure 30:
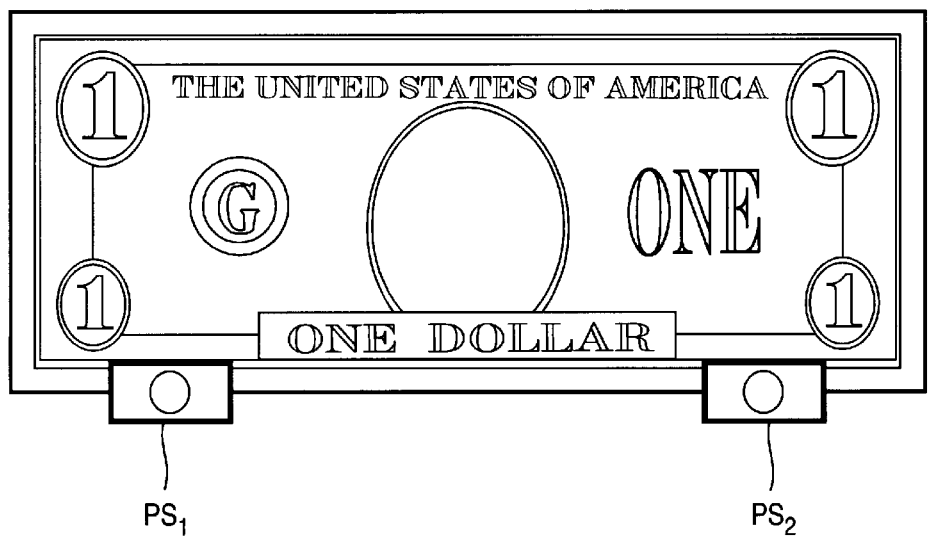
FIG. 30 is a diagrammatic illustration of the location of two auxiliary photo sensors relative to a bill passed thereover by the transport and scanning mechanism shown in FIGS. 19–28.

When the photodetector 26a is positioned on an axis passing through the center of the illuminated strip, the illumination by the LED's as a function of the distance from the central point "0" along the X axis, should optimally approximate a step function as illustrated by the curve A in FIG. 29. With the use of a single light source angularly displaced relative to a vertical axis through the center of the illuminated strip, the variation in illumination by an LED typically approximates a Gaussian function, as illustrated by the curve B in FIG. 29.

The two LEDs 22a are angularly disposed relative to the vertical axis by angles $\alpha$ and $\beta$, respectively. The angles $\alpha$ and $\beta$ are selected to be such that the resultant strip illumination by the LED's is as close as possible to the optimum distribution curve A in FIG. 29. The LED illumination distribution realized by this arrangement is illustrated by the curve designated as "C" in FIG. 29 which effectively merges the individual Gaussian distributions of each light source to yield a composite distribution which sufficiently approximates the optimum curve A.

In the particular embodiment of the scanheads 18a and 18b illustrated in the drawings, each scanhead includes two pairs of LEDs and two photodetectors for illuminating, and detecting light reflected from, strips of two different sizes. Thus, each mask also includes two slits which are formed to allow light from the LEDs to pass through and illuminate light strips of the desired dimensions. More specifically, one slit illuminates a relatively wide strip used for obtaining the reflectance samples which correspond to the characteristic pattern for a test bill. In a preferred embodiment, the wide slit has a length of about 0.500" and a width of about 0.050". The second slit forms a relatively narrow illuminated strip used for detecting the thin borderline surrounding the printed indicia on currency bills, as described above in detail. In a preferred embodiment, the narrow slit 283 has a length of about 0.300" and a width of about 0.010".

In order to prevent dust from fouling the operation of the scanheads, each scanhead includes three resilient seals or gaskets 290, 291, and 292. The two side seals 290 and 291 seal the outer ends of the LEDs 22, while the center seal 292 seals the outer end of the photodetector 26. Thus, dust cannot collect on either the light sources or the photodetectors, and cannot accumulate and block the slits through which light is transmitted from the sources to the bill, and from the bill to the photodetectors.

Doubling or overlapping of bills in the illustrative transport system is detected by two photosensors PS1 and PS2 which are located on a common transverse axis that is perpendicular to the direction of bill flow. The photosensors PS1 and PS2 include photodetectors 293 and 294 mounted within the lower support member 281 in immediate opposition to corresponding light sources 295 and 296 mounted in the upper support member 280. The photodetectors 293, 294 detect beams of light directed downwardly onto the bill transport path from the light sources 295, 296 and generate analog outputs which correspond to the sensed light passing through the bill. Each such output is converted into a digital signal by a conventional ADC convertor unit (not shown) whose output is fed as a digital input to and processed by the system CPU.

The presence of a bill adjacent the photosensors PS1 and PS2 causes a change in the intensity of the detected light, and the corresponding changes in the analog outputs of the photodetectors 293 and 294 serve as a convenient means for density-based measurements for detecting the presence of "doubles" (two or more overlaid or overlapped bills) during the currency scanning process. For instance, the photosensors may be used to collect a predefined number of density measurements on a test bill, and the average density value for a bill may be compared to predetermined density thresholds (based, for instance, on standardized density readings for master bills) to determine the presence of overlaid bills or doubles.

In order to prevent the accumulation of dirt on the light sources 295 and 296 and/or the photodetectors 293, 294 of the photosensors PS1 and PS2, both the light sources and the photodetectors are enclosed by lenses mounted so close to the bill path that they are continually wiped by the bills. This provides a self-cleaning action which reduces maintenance problems and improves the reliability of the outputs from the photosensors over long periods of operation.

The CPU 30, under control of software stored in the EPROM 34, monitors and controls the speed at which the bill transport mechanism 16 transports bills from the bill separating station 14 to the bill stacking unit. Flowcharts of the speed control routines stored in the EPROM 34 are depicted in FIGS. 31–35. To execute more than the first step in any given routine, the currency discriminating system 10 must be operating in a mode requiring the execution of the routine.

Figure 31:
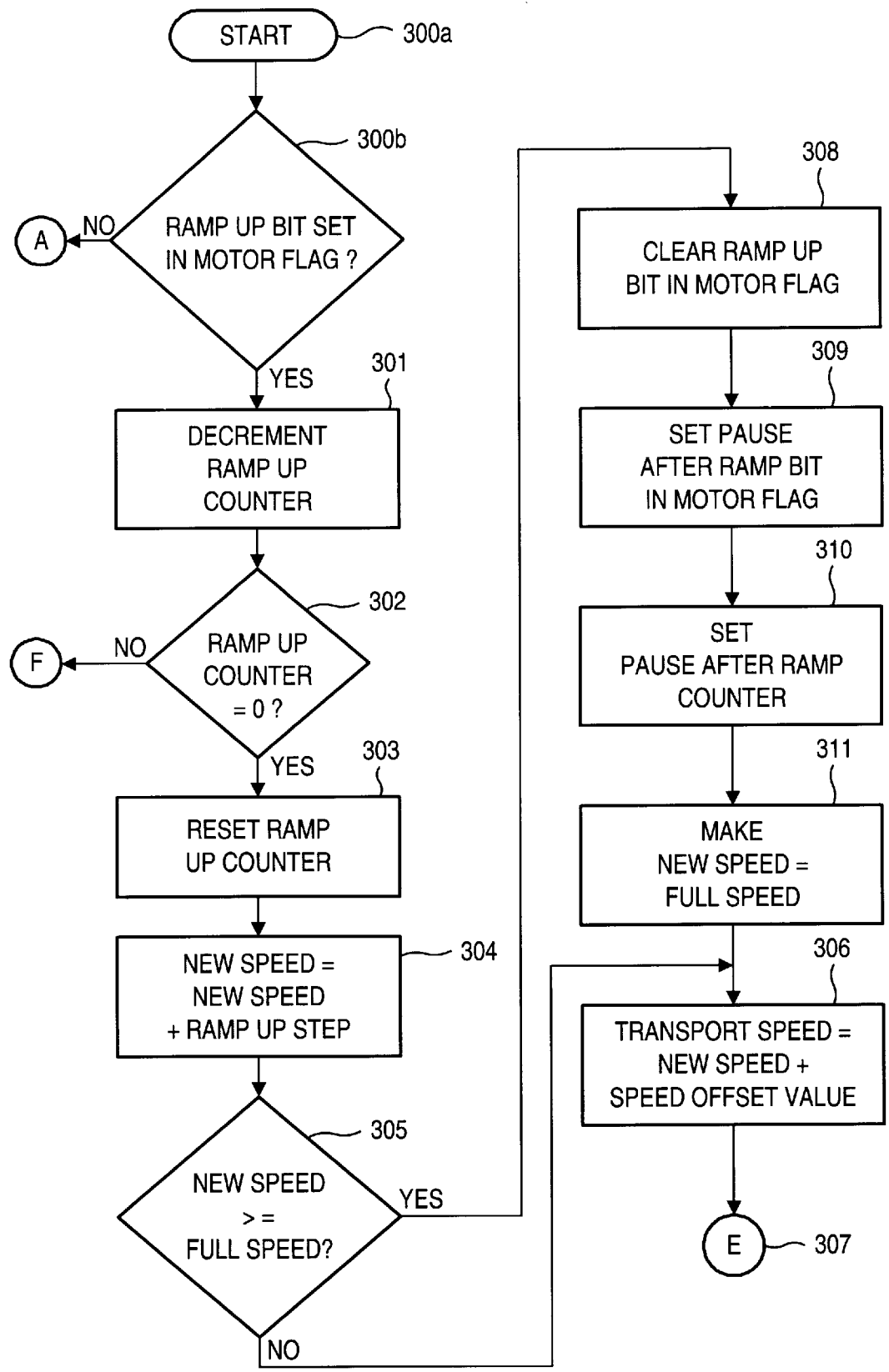
FIG. 31 is a flow chart illustrating the sequential procedure involved in a ramp-up routine for increasing the transport speed of the bill transport mechanism from zero to top speed.

Referring first to FIG. 31, when a user places a stack of bills in the bill accepting station 12 for counting, the transport speed of the bill transport mechanism 16 must accelerate or "ramp up" from zero to top speed. Therefore, in response to receiving the stack of bills in the bill accepting station 12, the CPU 30 sets a ramp-up bit in a motor flag stored in the memory unit 38. Setting the ramp-up bit causes the CPU 30 to proceed beyond step 300b of the ramp-up routine. If the ramp-up bit is set, the CPU 30 utilizes a ramp-up counter and a fixed parameter "ramp-up step" to incrementally increase the transport speed of the bill transport mechanism 16 until the bill transport mechanism 16 reaches its top speed. The "ramp-up step" is equal to the incremental increase in the transport speed of the bill transport mechanism 16, and the ramp-up counter determines the amount of time between incremental increases in the bill transport speed. The greater the value of the "ramp-up step", the greater the increase in the transport speed of the bill transport mechanism 16 at each increment. The greater the maximum value of the ramp-up counter, the greater the amount of time between increments. Thus, the greater the value of the "ramp-up step" and the lesser the maximum value of the ramp-up counter, the lesser the time it takes the bill transport mechanism 16 to reach its top speed.

The ramp-up routine in FIG. 31 employs a variable parameter "new speed", a fixed parameter "full speed", and the variable parameter "transport speed". The "full speed" represents the top speed of the bill transport mechanism 16, while the "new speed" and "transport speed" represent the desired current speed of the bill transport mechanism 16. To account for operating offsets of the bill transport mechanism 16, the "transport speed" of the bill transport mechanism 16 actually differs from the "new speed" by a "speed offset value". Outputting the "transport speed" to the bill transport mechanism 16 causes the bill transport mechanism 16 to operate at the transport speed.

To incrementally increase the speed of the bill transport mechanism 16, the CPU 30 first decrements the ramp-up counter from its maximum value (step 301). If the maximum value of the ramp-up counter is greater than one at step 302, the CPU 30 exits the speed control software in FIGS. 31–35 and repeats steps 300b, 301, and 302 during subsequent iterations of the ramp-up routine until the ramp-up counter is equal to zero. When the ramp-up counter is equal to zero, the CPU 30 resets the ramp-up counter to its maximum value (step 303). Next, the CPU 30 increases the "new speed" by the "ramp-up step" (step 304). If the "new speed" is not yet equal to the "full speed" at step 305, the "transport speed" is set equal to the "new speed" plus the "speed offset value" (step 306). The "transport speed" is output to the bill transport mechanism 16 at step 307 of the routine in FIG. 31 to change the speed of the bill transport mechanism 16 to the "transport speed". During subsequent iterations of the ramp-up routine, the CPU 30 repeats steps 300b–306 until the "new speed" is greater than or equal to the "full speed".

Once the "new speed" is greater than or equal to the "full speed" at step 305, the ramp-up bit in the motor flag is cleared (step 308), a pause-after-ramp bit in the motor flag is set (step 309), a pause-after-ramp counter is set to its maximum value (step 310), and the parameter "new speed" is set equal to the "full speed" (step 311). Finally, the "transport speed" is set equal to the "new speed" plus the "speed offset value" (step 306). Since the "new speed" is equal to the "full speed", outputting the "transport speed" to the bill transport mechanism 16 causes the bill transport mechanism 16 to operate at its top speed. The ramp-up routine in FIG. 31 smoothly increases the speed of the bill transport mechanism without causing jerking or motor spikes. Motor spikes could cause false triggering of the optical scanhead 18 such that the scanhead 18 scans non-existent bills.

Figure 32:
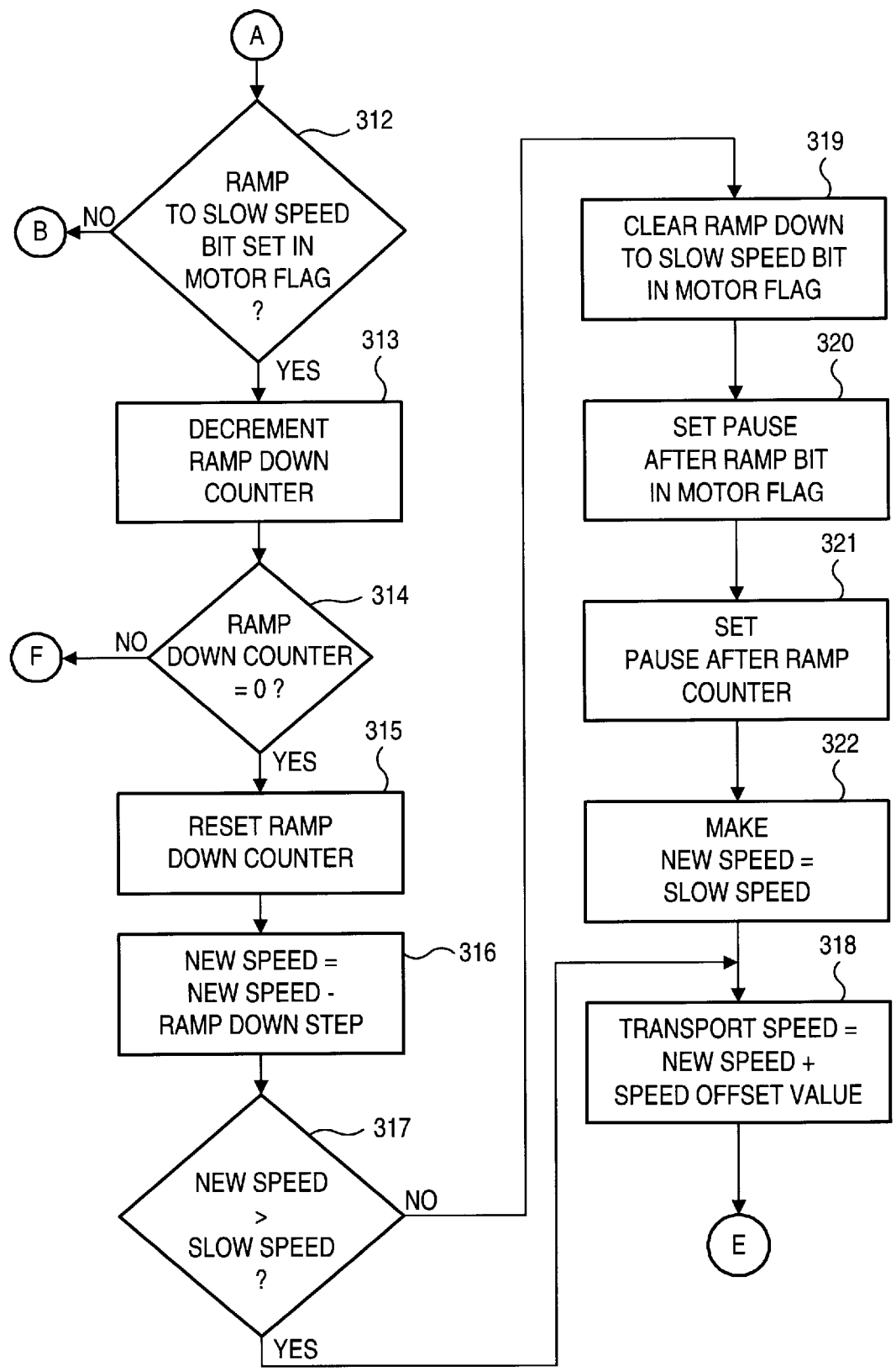
FIG. 32 is a flow chart illustrating the sequential procedure involved in a ramp-to-slow-speed routine for decreasing the transport speed of the bill transport mechanism from top speed to slow speed.

During normal counting, the bill transport mechanism 16 transports bills from the bill separating station 14 to the bill stacking unit at its top speed. In response to the optical scanhead 18 detecting a stranger, suspect or no call bill, however, the CPU 30 sets a ramp-to-slow-speed bit in the motor flag. Setting the ramp-to-slow-speed bit causes the CPU 30 to proceed beyond step 312 of the ramp-to-slow-speed routine in FIG. 32 on the next iteration of the software in FIGS. 31–35. Using the ramp-to-slow-speed routine in FIG. 32, the CPU 30 causes the bill transport mechanism 16 to controllably decelerate or "ramp down" from its top speed to a slow speed. As the ramp-to-slow speed routine in FIG. 32 is similar to the ramp-up routine in FIG. 31, it is not described in detail herein.

It suffices to state that if the ramp-to-slow-speed bit is set in the motor flag, the CPU 30 decrements a ramp-down counter (step 313) and determines whether or not the ramp-down counter is equal to zero (step 314). If the ramp-down counter is not equal to zero, the CPU 30 exits the speed control software in FIGS. 31–35 and repeats steps 312, 313, and 314 of the ramp-to-slow-speed routine in FIG. 32 during subsequent iterations of the speed control software until the ramp-down counter is equal to zero. Once the ramp-down counter is equal to zero, the CPU 30 resets the ramp-down counter to its maximum value (step 315) and subtracts a "ramp-down step" from the variable parameter "new speed" (step 316). The "new speed" is equal to the fixed parameter "full speed" prior to initiating the ramp-to-slow-speed routine in FIG. 32.

After subtracting the "ramp-down step" from the "new speed", the "new speed" is compared to a fixed parameter "slow speed" (step 317). If the "new speed" is greater than the "slow speed", the "transport speed" is set equal to the "new speed" plus the "speed offset value" (step 318) and this "transport speed" is output to the bill transport mechanism 16 (step 307 of FIG. 31). During subsequent iterations of the ramp-to-slow-speed routine, the CPU 30 continues to decrement the "new speed" by the "ramp-down step" until the "new speed" is less than or equal to the "slow speed". Once the "new speed" is less than or equal to the "slow speed" at step 317, the CPU 30 clears the ramp-to-slow-speed bit in the motor flag (step 319), sets the pause-after-ramp bit in the motor flag (step 320), sets the pause-after-ramp counter (step 321), and sets the "new speed" equal to the "slow speed" (step 322). Finally, the "transport speed" is set equal to the "new speed" plus the "speed offset value" (step 318). Since the "new speed" is equal to the "slow speed", outputting the "transport speed" to the bill transport mechanism 16 causes the bill transport mechanism 16 to operate at its slow speed. The ramp-to-slow-speed routine in FIG. 32 smoothly decreases the speed of the bill transport mechanism 16 without causing jerking or motor spikes.

Figure 33:
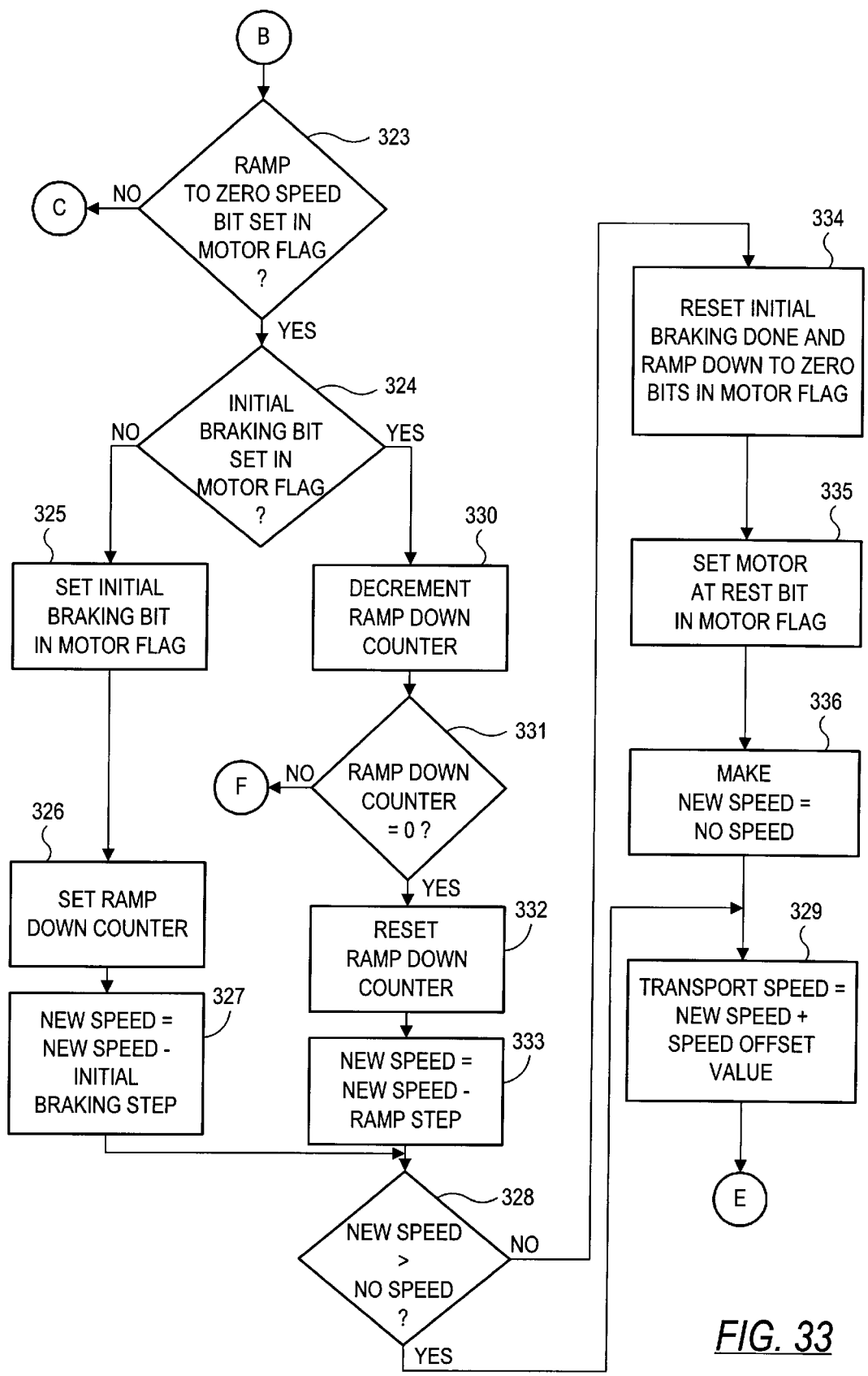
FIG. 33 is a flow chart illustrating the sequential procedure involved in a ramp-to-zero-speed routine for decreasing the transport speed of the bill transport mechanism to zero.

FIG. 33 depicts a ramp-to-zero-speed routine in which the CPU 30 ramps down the transport speed of the bill transport mechanism 16 to zero either from its top speed or its slow speed. In response to completion of counting of a stack of bills, the CPU 30 enters this routine to ramp down the transport speed of the bill transport mechanism 16 from its top speed to zero. Similarly, in response to the optical scanhead 18 detecting a stranger, suspect, or no call bill and the ramp-to-slow-speed routine in FIG. 32 causing the transport speed to be equal to a slow speed, the CPU 30 enters the ramp-to-zero-speed routine to ramp down the transport speed from the slow speed to zero.

With the ramp-to-zero-speed bit set at step 323, the CPU 30 determines whether or not an initial-braking bit is set in the motor flag (step 324). Prior to ramping down the transport speed of the bill transport mechanism 16, the initial-braking bit is clear. Therefore, flow proceeds to the left branch of the ramp-to-zero-speed routine in FIG. 33. In this left branch, the CPU 30 sets the initial-braking bit in the motor flag (step 325), resets the ramp-down counter to its maximum value (step 326), and subtracts an "initial-braking step" from the variable parameter "new speed" (step 327). Next, the CPU 30 determines whether or not the "new speed" is greater than zero (step 328). If the "new speed" is greater than zero at step 328, the variable parameter "transport speed" is set equal to the "new speed" plus the "speed offset value" (step 329) and this "transport speed" is output to the bill transport mechanism 16 at step 307 in FIG. 31.

During the next iteration of the ramp-to-zero-speed routine in FIG. 33, the CPU 30 enters the right branch of the routine at step 324 because the initial-braking bit was set during the previous iteration of the ramp-to-zero-speed routine. With the initial-braking bit set, the CPU 30 decrements the ramp-down counter from its maximum value (step 330) and determines whether or not the ramp-down counter is equal to zero (step 331). If the ramp-down counter is not equal to zero, the CPU 30 immediately exits the speed control software in FIGS. 31–35 and repeats steps 323, 324, 330, and 331 of the ramp-to-slow-speed routine during subsequent iterations of the speed control software until the ramp-down counter is equal to zero. Once the ramp-down counter is equal to zero, the CPU 30 resets the ramp-down counter to its maximum value (step 332) and subtracts a "ramp-down step" from the variable parameter "new speed" (step 333). This "ramp-down step" is smaller than the "initial-braking step" so that the "initial-braking step" causes a larger decremental change in the transport speed of the bill transport mechanism 16 than that caused by the "ramp-down step".

Next, the CPU 30 determines whether or not the "new speed" is greater than zero (step 328). If the "new speed" is greater than zero, the "transport speed" is set equal to the "new speed" plus the "speed offset value" (step 329) and this "transport speed" is outputted to the bill transport mechanism 16 (step 307 in FIG. 31). During subsequent iterations of the speed control software, the CPU 30 continues to decrement the "new speed" by the "ramp-down step" at step 333 until the "new speed" is less than or equal to zero at step 328. Once the "new speed" is less than or equal to the zero at step 328, the CPU 30 clears the ramp-to-zero-speed bit and the initial-braking bit in the motor flag (step 334), sets a motor-at-rest bit in the motor flag (step 335), and sets the "new speed" equal to zero (step 336). Finally, the "transport speed" is set equal to the "new speed" plus the "speed offset value" (step 329). Since the "new speed" is equal to zero, outputting the "transport speed" to the bill transport mechanism 16 at step 307 in FIG. 31 halts the bill transport mechanism 16.

Figure 34:
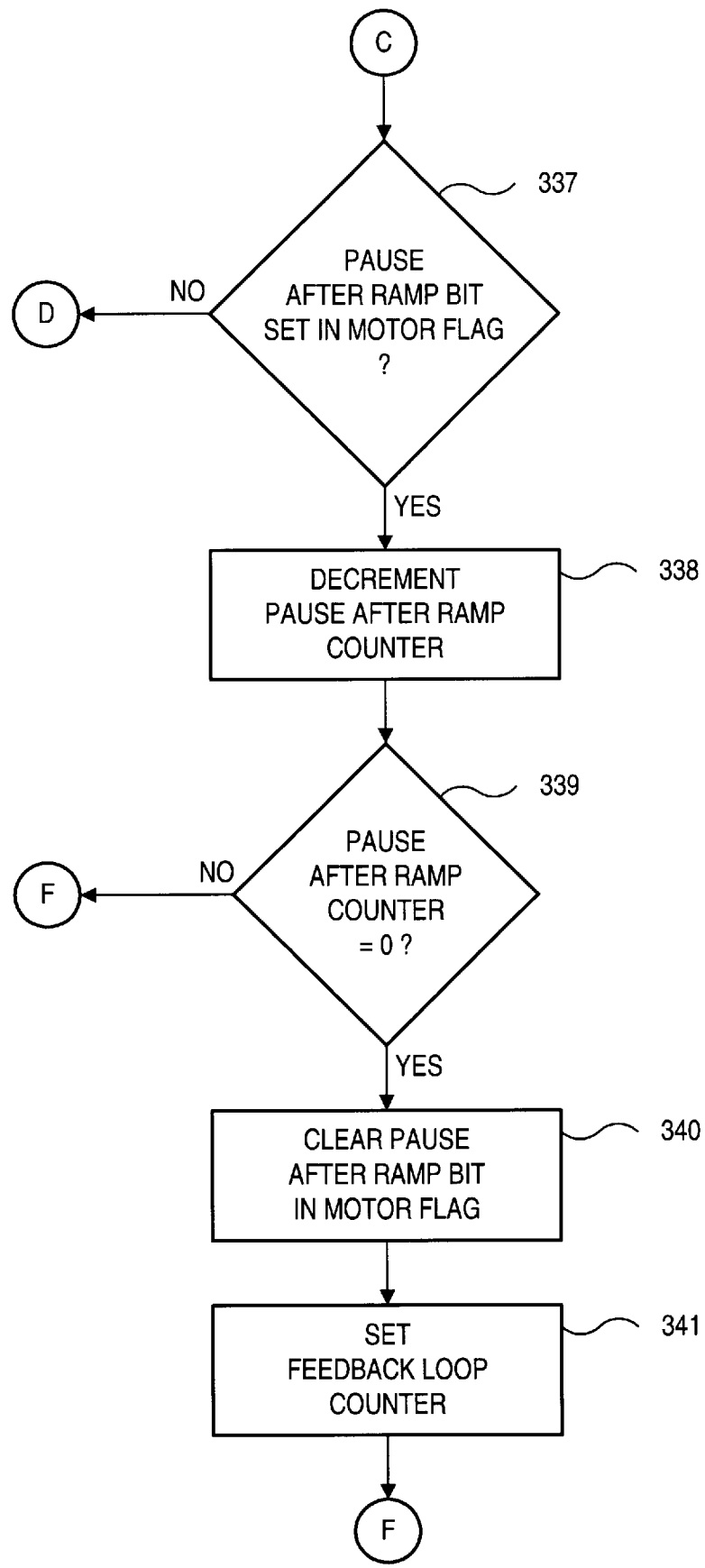
FIG. 34 is a flow chart illustrating the sequential procedure involved in a pause-after-ramp routine for delaying the feedback loop while the bill transport mechanism changes speeds.
Figure 35:
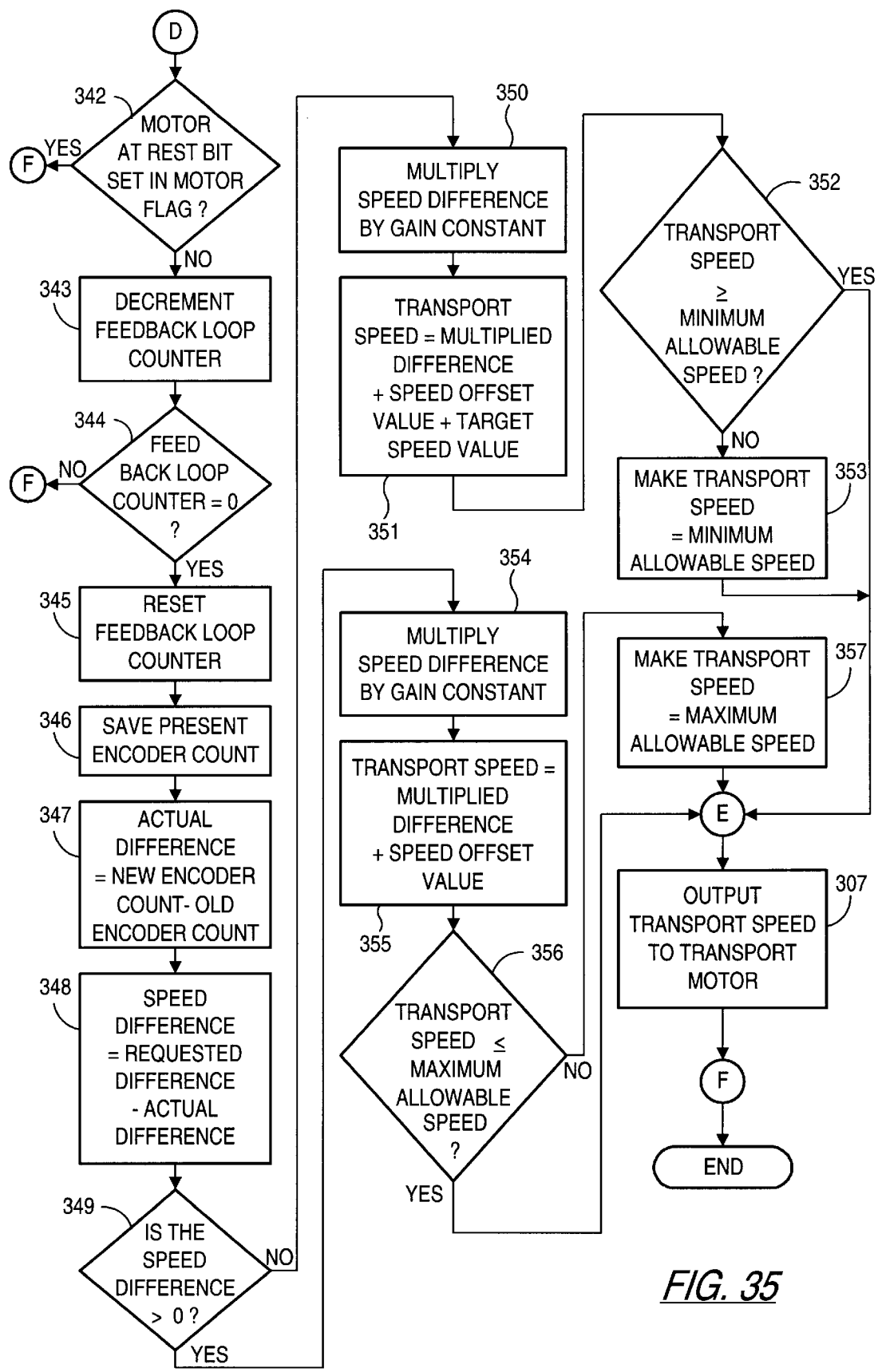
FIG. 35 is a flow chart illustrating the sequential procedure involved in a feedback loop routine for monitoring and stabilizing the transport speed of the bill transport mechanism.

Using the feedback loop routine in FIG. 35, the CPU 30 monitors and stabilizes the transport speed of the bill transport mechanism 16 when the bill transport mechanism 16 is operating at its top speed or at slow speed. To measure the transport speed of the bill transport mechanism 16, the CPU 30 monitors the optical encoder 32. While monitoring the optical encoder 32, it is important to synchronize the feedback loop routine with any transport speed changes of the bill transport mechanism 16. To account for the time lag between execution of the ramp-up or ramp-to-slow-speed routines in FIGS. 31–32 and the actual change in the transport speed of the bill transport mechanism 16, the CPU 30 enters a pause-after-ramp routine in FIG. 34 prior to entering the feedback loop routine in FIG. 35 if the bill transport mechanism 16 completed ramping up to its top speed or ramping down to slow speed during the previous iteration of the speed control software in FIGS. 31–35.

The pause-after-ramp routine in FIG. 34 allows the bill transport mechanism 16 to "catch up" to the CPU 30 so that the CPU 30 does not enter the feedback loop routine in FIG. 35 prior to the bill transport mechanism 16 changing speeds. As stated previously, the CPU 30 sets a pause-after-ramp bit during step 309 of the ramp-up routine in FIG. 31 or step 320 of the ramp-to-slow-speed routine in FIG. 32. With the pause-after-ramp bit set, flow proceeds from step 337 of the pause-after-ramp routine to step 338, where the CPU 30 decrements a pause-after-ramp counter from its maximum value. If the pause-after-ramp counter is not equal to zero at step 339, the CPU 30 exits the pause-after-ramp routine in FIG. 34 and repeats steps 337, 338, and 339 of the pause-after-ramp routine during subsequent iterations of the speed control software until the pause-after-ramp counter is equal to zero. Once the pause-after-ramp counter decrements to zero, the CPU 30 clears the pause-after-ramp bit in the motor flag (step 340) and sets the feedback loop counter to its maximum value (step 341). The maximum value of the pause-after-ramp counter is selected to delay the CPU 30 by an amount of time sufficient to permit the bill transport mechanism 16 to adjust to a new transport speed prior to the CPU 30 monitoring the new transport speed with the feedback loop routine in FIG. 35.

Referring now to the feedback loop routine in FIG. 35, if the motor-at-rest bit in the motor flag is not set at step 342, the CPU 30 decrements a feedback loop counter from its maximum value (step 343). If the feedback loop counter is not equal to zero at step 344, the CPU 30 immediately exits the feedback loop routine in FIG. 35 and repeats steps 342, 343, and 344 of the feedback loop routine during subsequent iterations of the speed control software in FIGS. 31–36 until the feedback loop counter is equal to zero. Once the feedback loop counter is decremented to zero, the CPU 30 resets the feedback loop counter to its maximum value (step 345), stores the present count of the optical encoder 32 (step 346), and calculates a variable parameter "actual difference" between the present count and a previous count of the optical encoder 32 (step 347). The "actual difference" between the present and previous encoder counts represents the transport speed of the bill transport mechanism 16. The larger the "actual difference" between the present and previous encoder counts, the greater the transport speed of the bill transport mechanism. The CPU 30 subtracts the "actual difference" from a fixed parameter "requested difference" to obtain a variable parameter "speed difference" (step 348).

If the "speed difference" is greater than zero at step 349, the bill transport speed of the bill transport mechanism 16 is too slow. To counteract slower than ideal bill transport speeds, the CPU 30 multiplies the "speed difference" by a "gain constant" (step 354) and sets the variable parameter "transport speed" equal to the multiplied difference from step 354 plus the "speed offset value" plus a fixed parameter "target speed" (step 355). The "target speed" is a value that, when added to the "speed offset value", produces the ideal transport speed. The calculated "transport speed" is greater than this ideal transport speed by the amount of the multiplied difference. If the calculated "transport speed" is nonetheless less than or equal to a fixed parameter "maximum allowable speed" at step 356, the calculated "transport speed" is output to the bill transport mechanism 16 at step 307 so that the bill transport mechanism 16 operates at the calculated "transport speed". If, however, the calculated "transport speed" is greater than the "maximum allowable speed" at step 356, the parameter "transport speed" is set equal to the "maximum allowable speed" (step 357) and is output to the bill transport mechanism 16 (step 307).

If the "speed difference" is less than or equal to zero at step 349, the bill transport speed of the bill transport mechanism 16 is too fast or is ideal. To counteract faster than ideal bill transport speeds, the CPU 30 multiplies the "speed difference" by a "gain constant" (step 350) and sets the variable parameter "transport speed" equal to the multiplied difference from step 350 plus the "speed offset value" plus a fixed parameter "target speed" (step 351). The calculated "transport speed" is less than this ideal transport speed by the amount of the multiplied difference. If the calculated "transport speed" is nonetheless greater than or equal to a fixed parameter "minimum allowable speed" at step 352, the calculated "transport speed" is output to the bill transport mechanism 16 at step 307 so that the bill transport mechanism 16 operates at the calculated "transport speed". If, however, the calculated "transport speed" is less than the "minimum allowable speed" at step 352, the parameter "transport speed" is set equal to the "minimum allowable speed" (step 353) and is output to the bill transport mechanism 16 (step 307).

It should be apparent that the smaller the value of the "gain constant", the smaller the variations of the bill transport speed between successive iterations of the feedback control routine in FIG. 35 and, accordingly, the less quickly the bill transport speed is adjusted toward the ideal transport speed. Despite these slower adjustments in the bill transport speed, it is generally preferred to use a relatively small "gain constant" to prevent abrupt fluctuations in the bill transport speed and to prevent overshooting the ideal bill transport speed.

Figure 36:
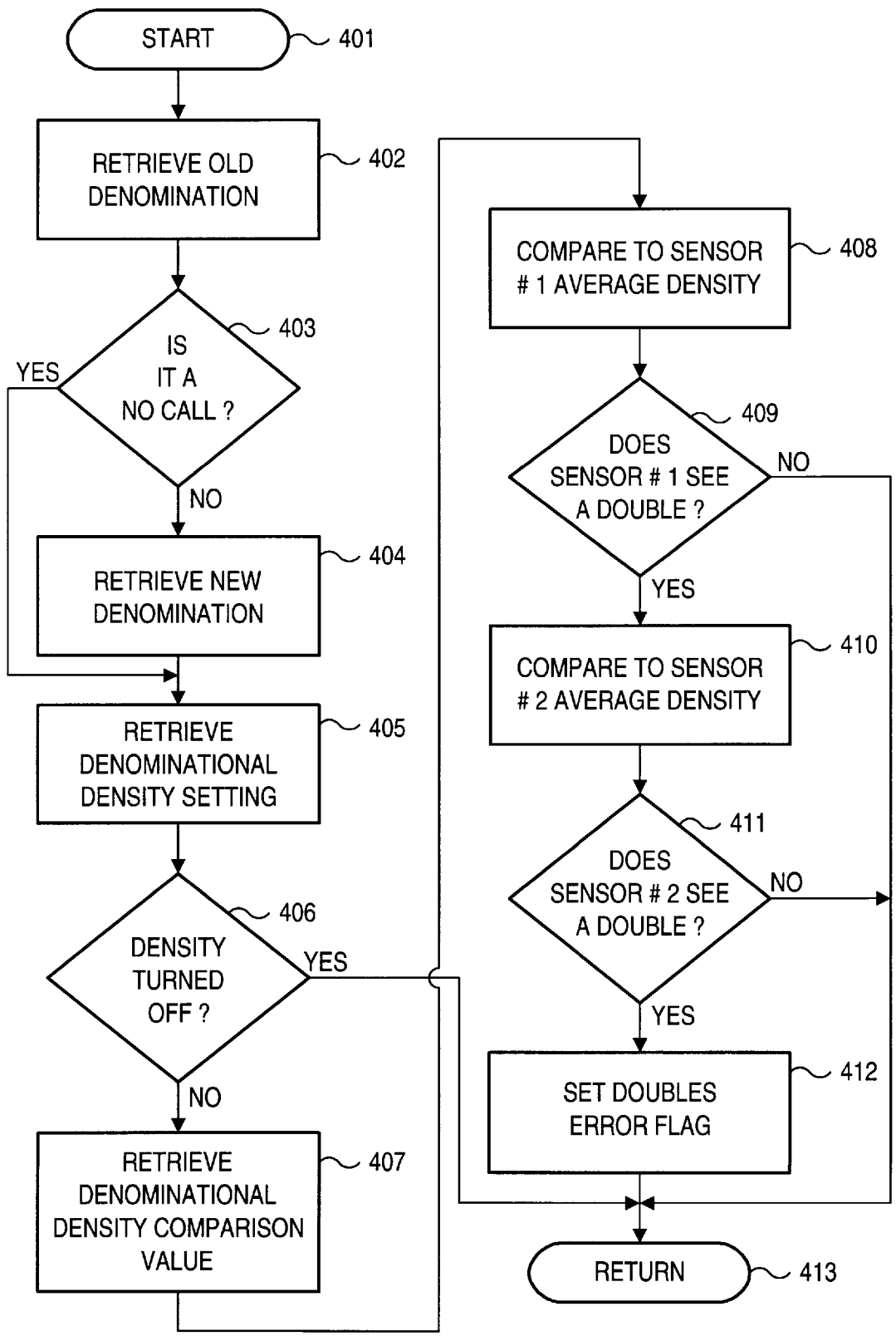
FIG. 36 is a flow chart illustrating the sequential procedure involved in a doubles detection routine for detecting overlapped bills.

A routine for using the outputs of the two photosensors PS1 and PS2 to detect any doubling or overlapping of bills is illustrated in FIG. 36 by sensing the optical density of each bill as it is scanned. This routine starts at step 401 and retrieves the denomination determined for the previously scanned bill at step 402 This previously determined denomination is used for detecting doubles in the event that the newly scanned bill is a "no call", as described below. Step 403 determines whether the current bill is a "no call," and if the answer is negative, the denomination determined for the new bill is retrieved at step 404.

If the answer at step 403 is affirmative, the system jumps to step 405, so that the previous denomination retrieved at step 402 is used in subsequent steps. To permit variations in the sensitivity of the density measurement, a "density setting" is retrieved from memory at step 405. The operator makes this choice manually, according to whether the bills being scanned are new bills, requiring a high degree of sensitivity, or used bills, requiring a lower level of sensitivity. If the "density setting" has been turned off, this condition is sensed at step 406, and the system returns to the main program at step 413. If the "density setting" is not turned off, a denominational density comparison value is retrieved from memory at step 407.

The memory preferably contains five different density values (for five different density settings, i.e., degrees of sensitivity) for each denomination. Thus, for a currency set containing seven different denominations, the memory contains 35 different values. The denomination retrieved at step 404 (or step 402 in the event of a "no call"), and the density setting retrieved st step 405, determine which of the 35 stored values is retrieved at step 407 for use in the comparison steps described below.

At step 408, the density comparison value retrieved at step 407 is compared to the average density represented by the output of the photosensor PS1. The result of this comparison is evaluated at step 409 to determine whether the output of sensor S1 identifies a doubling of bills for the particular denomination of bill determined at step 402 or 404. If the answer is negative, the system returns to the main program at step 413. If the answer is affirmative, step 410 then compares the retrieved density comparison value to the average density represented by the output of the second sensor PS2. The result of this comparison is evaluated at step 411 to determine whether the output of the photosensor PS2 identifies a doubling of bills. Affirmative answers at both step 409 and step 411 result in the setting of a "doubles error" flag at step 412, and the system then returns to the main program at step 413. The "doubles error" flag can, of course, be used to stop the bill transport motor.

Figure 37:
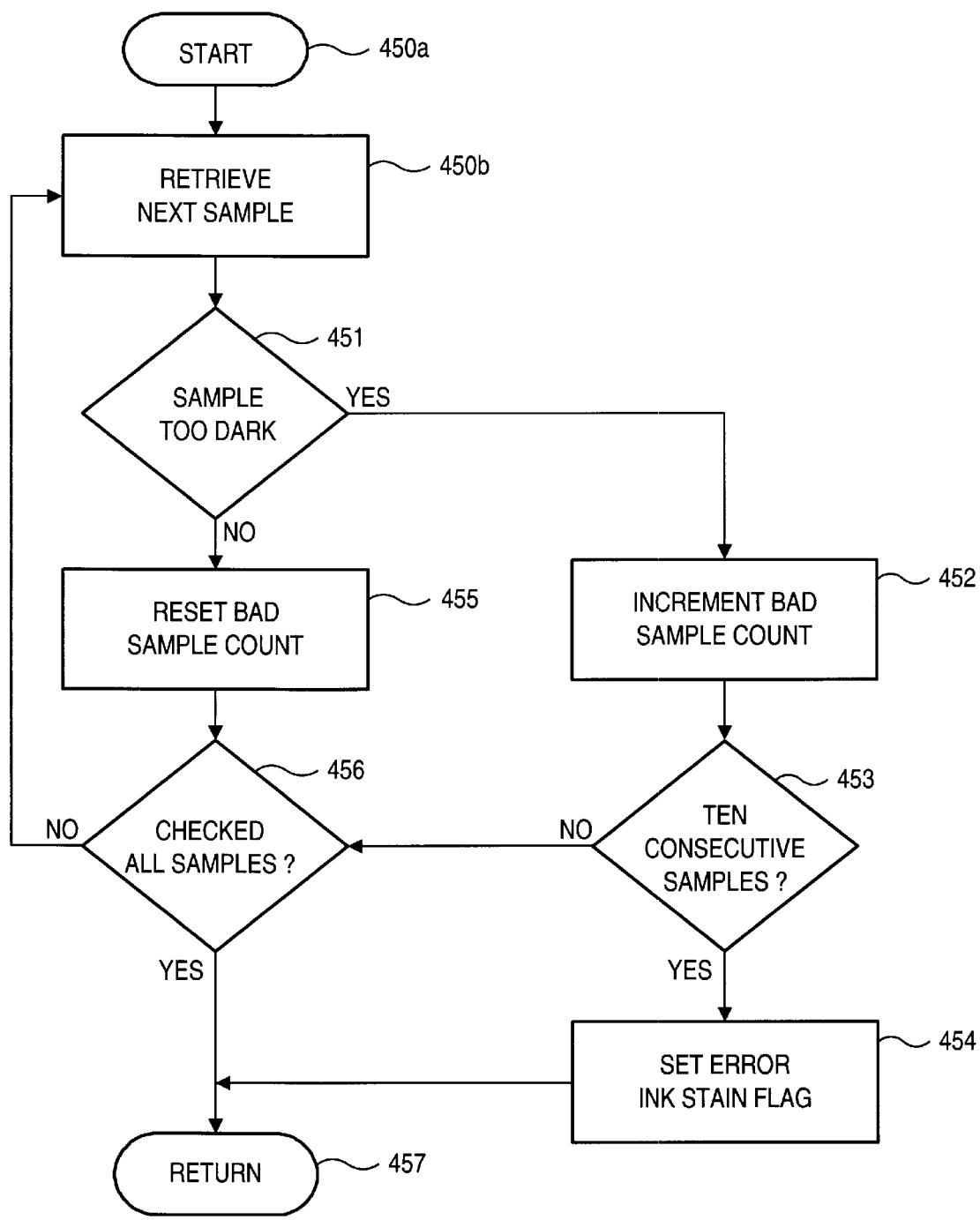
FIG. 37 is a flow chart illustrating the sequential procedure involved in a routine for detecting sample data representing dark blemishes on a bill.

FIG. 37 illustrates a routine that enables the system to detect bills which have been badly defaced by dark marks such as ink blotches, felt-tip pen marks and the like. Such severe defacing of a bill can result in such distorted scan data that the data can be interpreted to indicate the wrong denomination for the bill. Consequently, it is desirable to detect such severely defaced bills and then stop the bill transport mechanism so that the bill in question can be examined by the operator.

The routine of FIG. 37 retrieves each successive data sample at step 450b and then advances to step 451 to determine whether that sample is too dark. As described above, the output voltage from the photodetector 26 decreases as the darkness of the scanned area increases. Thus, the lower the output voltage from the photodetector, the darker the scanned area. For the evaluation carried out at step 451, a preselected threshold level for the photodetector output voltage, such as a threshold level of about 1 volt, is used to designate a sample that is "too dark."

An affirmative answer at step 451 advances the system to step 452 where a "bad sample" count is incremented by one. A single sample that is too dark is not enough to designate the bill as seriously defaced. Thus, the "bad sample" count is used to determine when a preselected number of consecutive samples, e.g., ten consecutive samples, are determined to be too dark. From step 452, the system advances to step 453 to determine whether ten consecutive bad samples have been received. If the answer is affirmative, the system advances to step 454 where an error flag is set. This represents a "no call" condition, which causes the bill transport system to be stopped in the same manner discussed above.

When a negative response is obtained at step 451, the system advances to step 455 where the "bad sample" count is reset to zero, so that this count always represents the number of consecutive bad samples received. From step 455 the system advances to step 456 which determines when all the samples for a given bill have been checked. As long as step 456 yields a negative answer, the system continues to retrieve successive samples at step 450b. When an affirmative answer is produced at step 456, the system returns to the main program at step 457.

Figure 38:
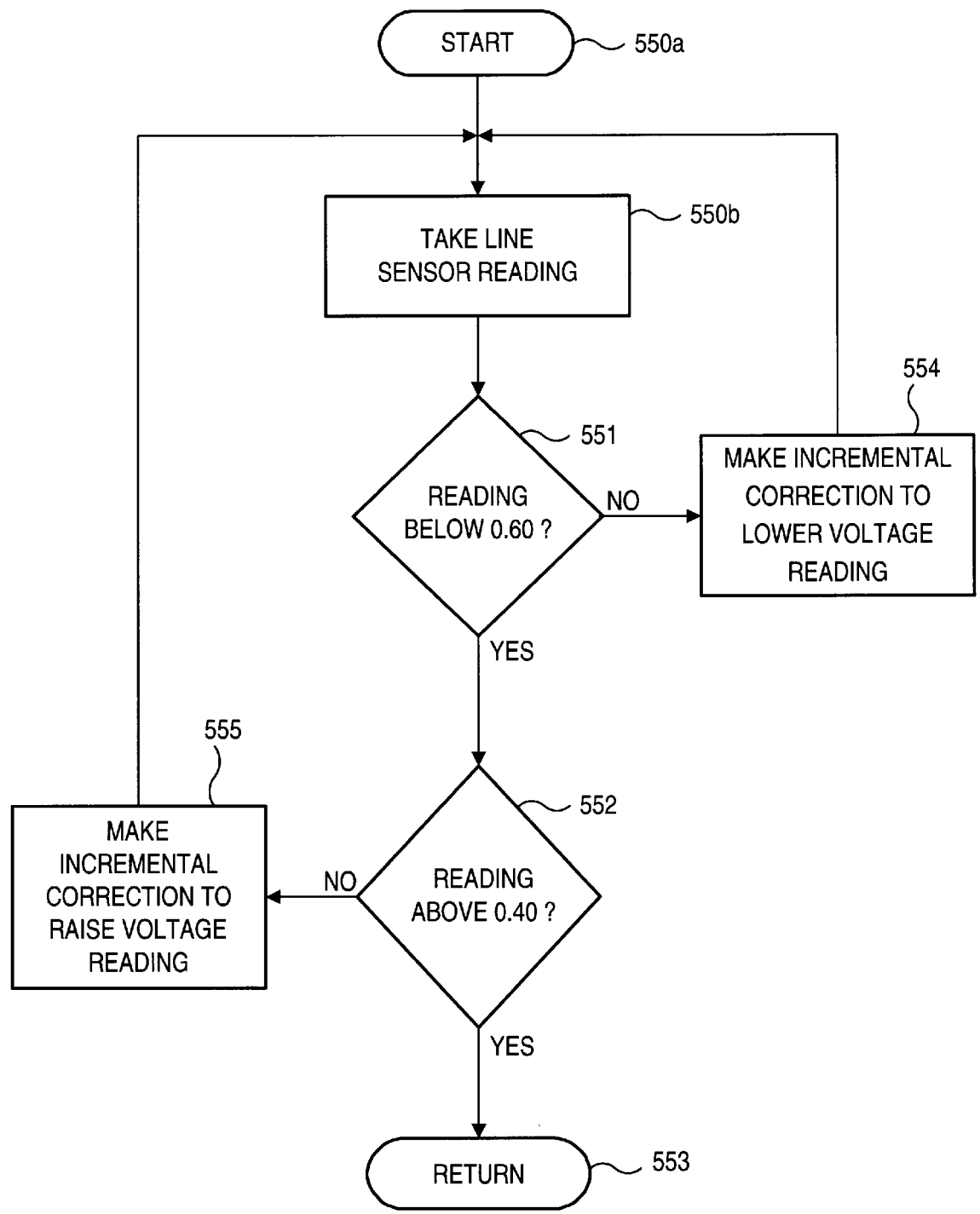
FIG. 38 is a flow chart illustrating the sequential procedure involved in a routine for maintaining a desired readhead voltage level.

A routine for automatically monitoring and making any necessary corrections in various line voltages is illustrated in FIG. 38. This routine is useful in automatically compensating for voltage drifts due to temperature changes, aging of components and the like. The routine starts at step 550 and reads the output of a line sensor which is monitoring a selected voltage at step 550b. Step 551 determines whether the reading is below 0.60, and if the answer is affirmative, step 552 determines whether the reading is above 0.40. If step 552 also produces an affirmative response, the voltage is within the required range and thus the system returns to the main program step 553. If step 551 produces a negative response, an incremental correction is made at step 554 to reduce the voltage in an attempt to return it to the desired range. Similarly, if a negative response is obtained at step 552, an incremental correction is made at step 555 to increase the voltage toward the desired range.

Now that a currency scanner has been described in connection with scanning U.S. currency, an additional currency discrimination system of the present invention will be described.

Figure 39:
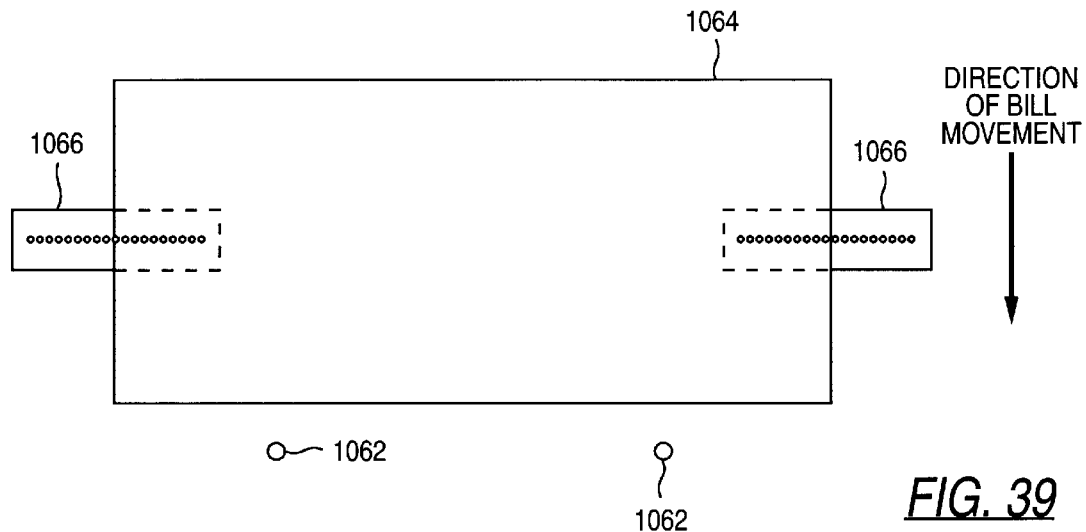
FIG. 39 is a top view of a bill and size determining sensors according to a preferred embodiment of the present invention.

First of all, because currencies come in a variety of sizes, sensors are added to determine the size of a bill to be scanned. These sensors are placed upstream of the scanheads to be described below. A preferred embodiment of size determining sensors is illustrated in FIG. 39. Two leading/trailing edge sensors 1062 detect the leading and trailing edges of a bill 1064 as it passing along the transport path. These sensors in conjunction with the encoder 32 (FIG. 2a–2b) may be used to determine the dimension of the bill along a direction parallel to the scan direction which in FIG. 39 is the narrow dimension (or width) of the bill 1064. Additionally, two side edge sensors 1066 are used to detect the dimension of a bill 1064 transverse to the scan direction which in FIG. 39 is the wide dimension (or length) of the bill 1064. While the sensors 1062 and 1066 of FIG. 39 are optical sensors, other means of determining the size of a bill may be employed.

Once the size of a bill is determined, the potential identity of the bill is limited to those bills having the same size. Accordingly, the area to be scanned can be tailored to the area or areas best suited for identifying the denomination and country of origin of a bill having the measured dimensions.

Figure 40:
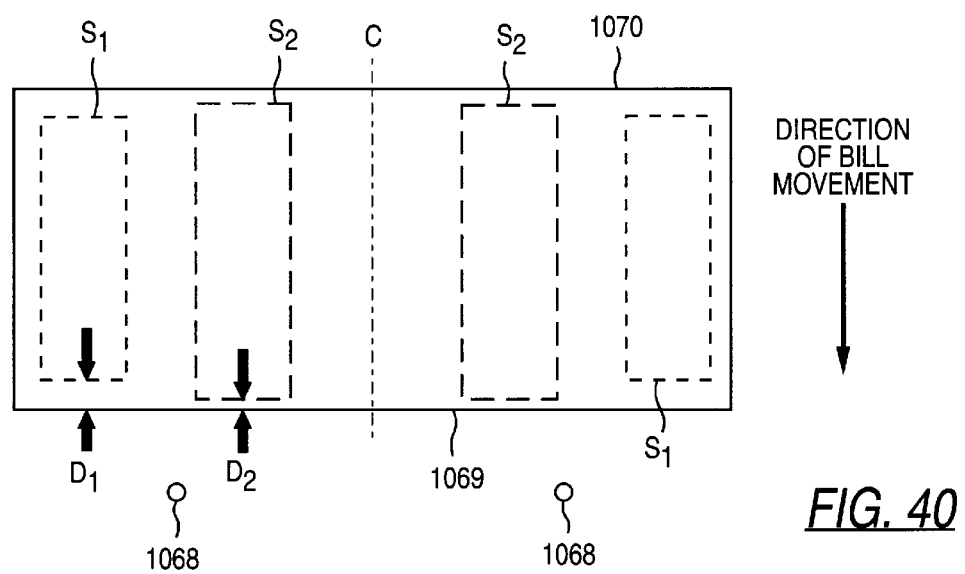
FIG. 40 is a top view of a bill illustrating multiple areas to be optically scanned on a bill according to a preferred embodiment of the present invention.

Secondly, while the printed indicia on U.S. currency is enclosed within a thin borderline, the sensing of which may serve as a trigger to begin scanning using a wider slit, most currencies of other currency systems such as those from other countries do not have such a borderline. Thus the system described above may be modified to begin scanning relative to the edge of a bill for currencies lacking such a borderline. Referring to FIG. 40, two leading edge detectors 1068 are shown. The detection of the leading edge 1069 of a bill 1070 by leading edge sensors 1068 triggers scanning in an area a given distance away from the leading edge of the bill 1070, e.g., $D_1$ or $D_2$, which may vary depending upon the preliminary indication of the identity of a bill based on the dimensions of a bill. Alternatively, the leading edge 1069 of a bill may be detected by one or more of the scanheads (to be described below) in a similar manner as that described with respect to FIGS. 6a and 6b. Alternatively, the beginning of scanning may be triggered by positional information provided by the encoder 32 of FIG. 2a–2b, for example, in conjunction with the signals provided by sensors 1062 of FIG. 39, thus eliminating the need for leading edge sensors 1068.

Figure 41A:
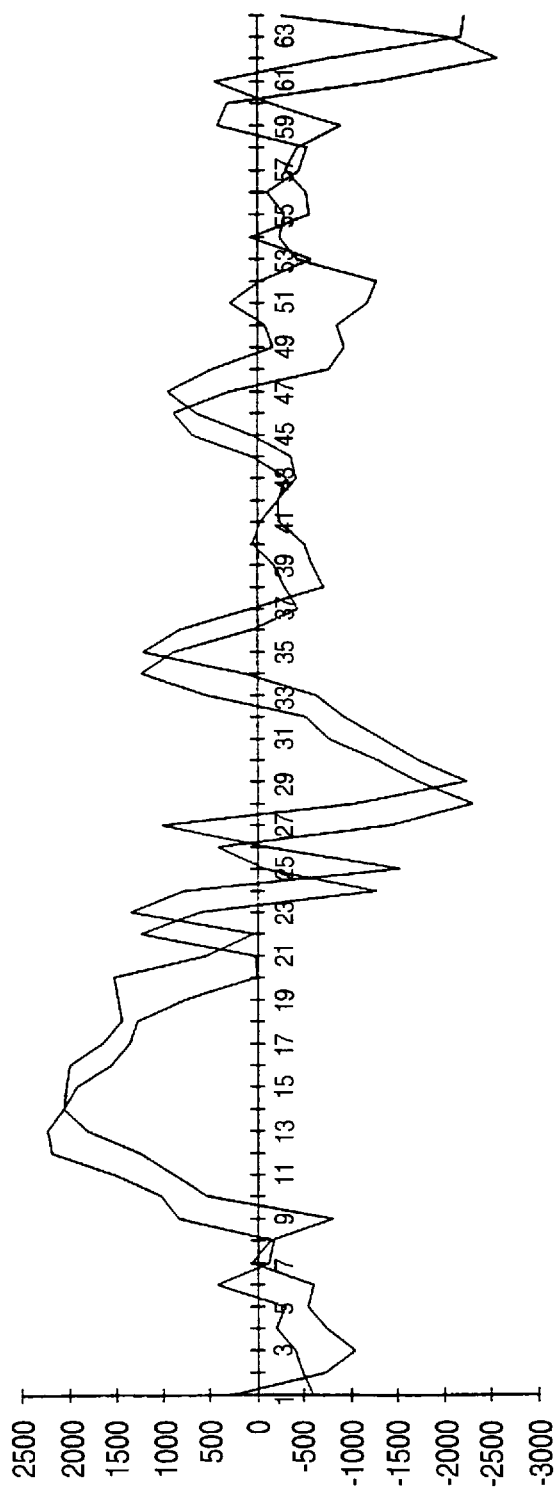
FIG. 41a is a graph illustrating a scanned pattern which is offset from a corresponding master pattern.
Figure 41B:
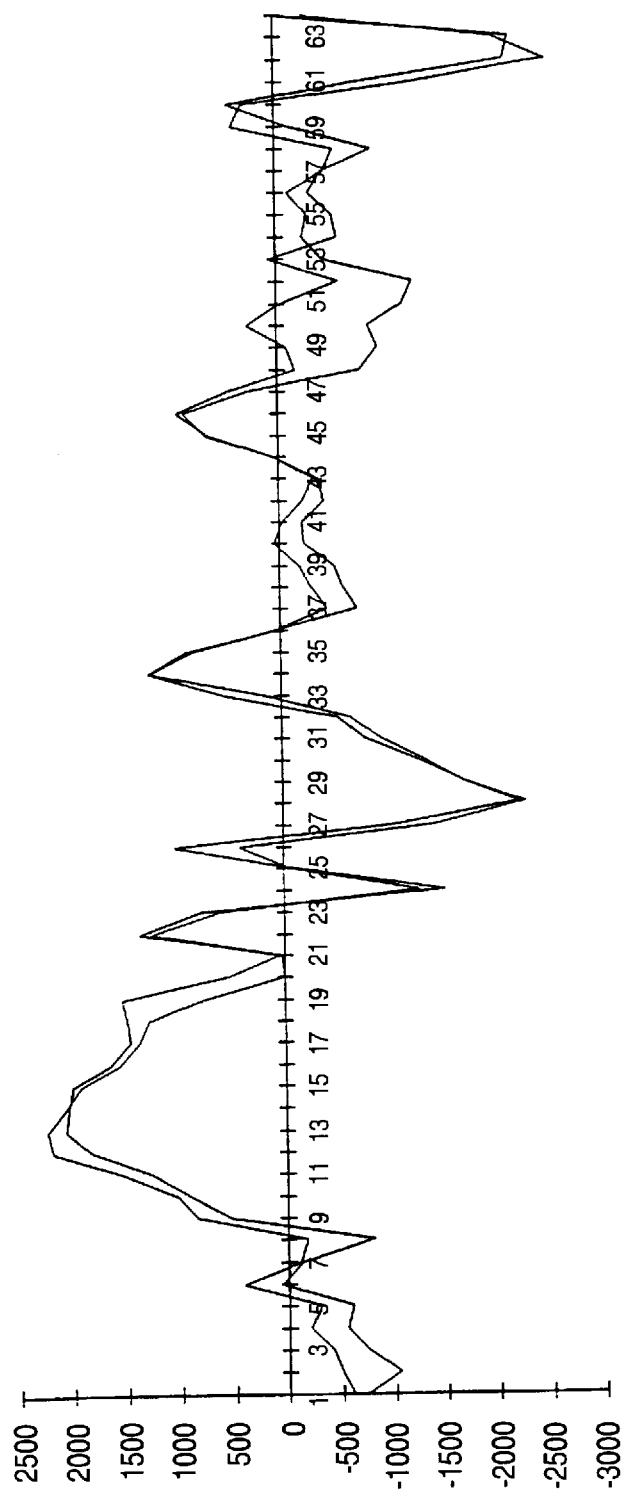
FIG. 41b is a graph illustrating the same patterns of FIG. 41a after the scanned pattern is shifted relative to the master pattern.

However, when the initiation of scanning is triggered by the detection of the leading edge of a bill, the chance that a scanned pattern will be offset relative to a corresponding master pattern increases. Offsets can result from the existence of manufacturing tolerances which permit the location of printed indicia of a document to vary relative to the edges of the document. For example, the printed indicia on U.S. bills may vary relative to the leading edge of a bill by as much as 50 mils which is 0.05 inches (1.27 mm). Thus when scanning is triggered relative to the edge of a bill (rather than the detection of a certain part of the printed indicia itself, such as the printed borderline of U.S. bills), a scanned pattern can be offset from a corresponding master pattern by one or more samples. Such offsets can lead to erroneous rejections of genuine bills due to poor correlation between scanned and master patterns. To compensate, overall scanned patterns and master patterns can be shifted relative to each other as illustrated in FIGS. 41a and 41b. More particularly, FIG. 41a illustrates a scanned pattern which is offset from a corresponding master pattern. FIG. 41b illustrates the same patterns after the scanned pattern is shifted relative to the master pattern, thereby increasing the correlation between the two patterns. Alternatively, instead of shifting either scanned patterns or master patterns, master patterns may be stored in memory corresponding to different offset amounts.

Thirdly, while it has been determined that the scanning of the central area on the green side of a U.S. bill (see segment S of FIG. 4) provides sufficiently distinct patterns to enable discrimination among the plurality of U.S. denominations, the central area may not be suitable for bills originating in other countries. For example, for bills originating from Country 1, it may be determined that segment $S_1$ (FIG. 40) provides a more preferable area to be scanned, while segment $S_2$ (FIG. 40) is more preferable for bills originating from Country 2. Alternatively, in order to sufficiently discriminate among a given set of bills, it may be necessary to scan bills which are potentially from such set along more than one segment, e.g., scanning a single bill along both $S_1$ and $S_2$.

Figure 42:
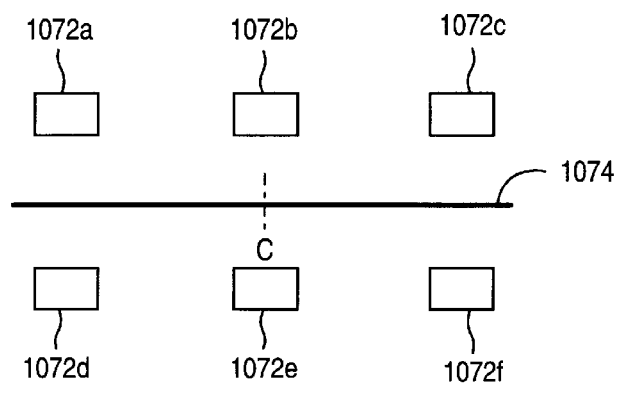
FIG. 42 is a side elevation of a multiple scanhead arrangement according to a preferred embodiment of the present invention.

To accommodate scanning in areas other than the central portion of a bill, multiple scanheads may be positioned next to each other. A preferred embodiment of such a multiple scanhead system is depicted in FIG. 42. Multiple scanheads 1072a–c and 1072d–f are positioned next to each other along a direction lateral to the direction of bill movement. Such a system permits a bill 1074 to be scanned along different segments. Multiple scanheads 1072a–f are arranged on each side of the transport path, thus permitting both sides of a bill 1074 to be scanned.

Two-sided scanning may be used to permit bills to be fed into a currency discrimination system according to the present invention with either side face up. An example of a two-sided scanhead arrangement is disclosed in co-pending U.S. patent application Ser. No. 08/207,592 filed on Mar. 8, 1994 and incorporated herein by reference. Master patterns generated by scanning genuine bills may be stored for segments on one or both sides. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match one of the master patterns. Alternatively, master patterns may be stored for both sides of genuine bills. In such a two-sided system, a pattern retrieved by scanning one side of a bill under test should match with one of the master patterns of one side (Match 1) and a pattern retrieved from scanning the opposite side of a bill under test should match the master pattern associated with the opposite side of a genuine bill identified by Match 1.

Alternatively, in situations where the face orientation of a bill (i.e., whether a bill is "face up" or "face down") may be determined prior to or during characteristic pattern scanning, the number of comparisons may be reduced by limiting comparisons to patterns corresponding to the same side of a bill. That is, for example, when it is known that a bill is "face up", scanned patterns associated with scanheads above the transport path need only be compared to master patterns generated by scanning the "face" of genuine bills. By "face" of a bill it is meant a side which is designated as the front surface of the bill. For example, the front or "face" of a U.S. bill may be designated as the "black" surface while the back of a U.S. bill may be designated as the "green" surface. The face orientation may be determinable in some situations by sensing the color of the surfaces of a bill. An alternative method of determining the face orientation of U.S. bills by detecting the borderline on each side of a bill is disclosed in co-pending U.S. patent application Ser. No. 08/207,592 filed on Mar. 8, 1994. The implementation of color sensing is discussed in more detailed below.

According to the embodiment of FIG. 42, the bill transport mechanism operates in such a fashion that the central area C of a bill 1074 is transported between central scanheads 1072b and 1072e. Scanheads 1072a and 1072c and likewise scanheads 1072d and 1072f are displaced the same distance from central scanheads 1072b and 1072e, respectively. By symmetrically arranging the scanheads about the central region of a bill, a bill may be scanned in either direction, e.g., top edge first (forward direction) or bottom edge first (reverse direction). As described above with respect to FIGS. 1–6, master patterns are stored from the scanning of genuine bills in both the forward and reverse directions. While a symmetrical arrangement is preferred, it is not essential provided appropriate master patterns are stored for a non-symmetrical system.

Figure 43:
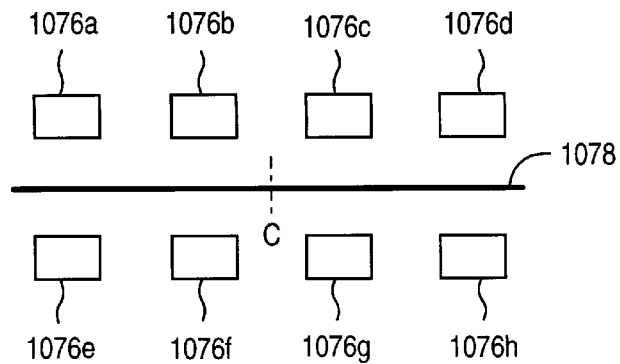
FIG. 43 is a side elevation of a multiple scanhead arrangement according to another preferred embodiment of the present invention.

While FIG. 42 illustrates a system having three scanheads per side, any number of scanheads per side may be utilized. Likewise, it is not necessary that there be a scanhead positioned over the central region of a bill. For example, FIG. 43 illustrates another preferred embodiment of the present invention capable of scanning the segments $S_1$ and $S_2$ of FIG. 40. Scanheads 1076a, 1076d, 1076e, and 1076h scan a bill 1078 along segment $S_1$ while scanheads 1076b, 1076c, 1076f, and 1076g scan segment $S_2$.

Figure 44:
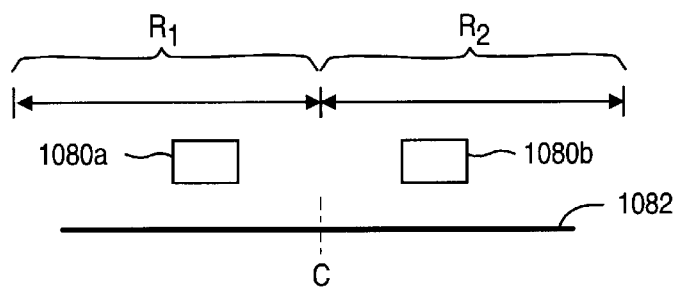
FIG. 44 is a side elevation of a multiple scanhead arrangement according to another preferred embodiment of the present invention.

FIG. 44 depicts another preferred embodiment of a scanning system according to the present invention having laterally moveable scanheads 1080a–b. Similar scanheads may be positioned on the opposite side of the transport path. Moveable scanheads 1080a–b may provide more flexibility that may be desirable in certain scanning situations. Upon the determination of the dimensions of a bill as described in connection with FIG. 39, a preliminary determination of the identity of a bill may be made. Based on this preliminary determination, the moveable scanheads 1080a–b may be positioned over the area of the bill which is most appropriate for retrieving discrimination information. For example, if based on the size of a scanned bill, it is preliminarily determined that the bill is a Japanese 5000 Yen bill-type, and if it has been determined that a suitable characteristic pattern for a 5000 Yen bill-type is obtained by scanning a segment 2.0 cm to the left of center of the bill fed in the forward direction, scanheads 1080a and 1080b may be appropriately positioned for scanning such a segment, e.g., scanhead 1080a positioned 2.0 cm left of center and scanhead 1080b positioned 2.0 cm right of center. Such positioning permits proper discrimination regardless of the whether the scanned bill is being fed in the forward or reverse direction. Likewise scanheads on the opposite side of the transport path (not shown) could be appropriately positioned. Alternatively, a single moveable scanhead may be used on one or both sides of the transport path. In such a system, size and color information (to be described in more detail below) may be used to properly position a single laterally moveable scanhead, especially where the orientation of a bill may be determined before scanning.

FIG. 44 depicts a system in which the transport mechanism is designed to deliver a bill 1082 to be scanned centered within the area in which scanheads 1080a–b are located. Accordingly, scanheads 1080a–b are designed to move relative to the center of the transport path with scanhead 1080a being moveable within the range $R_1$ and scanhead 1080b being moveable within range $R_2$.

Figure 45:
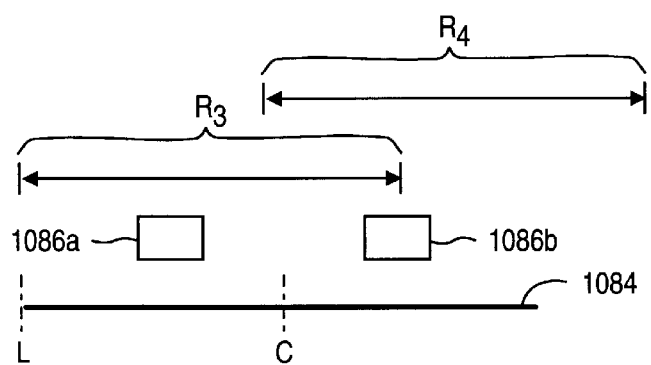
FIG. 45 is a side elevation of a multiple scanhead arrangement according to another preferred embodiment of the present invention.

FIG. 45 depicts another preferred embodiment of a scanning system according to the present invention wherein bills to be scanned are transported in a left justified manner along the transport path, that is wherein the left edge L of a bill 1084 is positioned in the same lateral location relative to the transport path. Based on the dimensions of the bill, the position of the center of the bill may be determined and the scanheads 1086a–b may in turn be positioned accordingly. As depicted in FIG. 45, scanhead 1086a has a range of motion $R_3$ and scanhead 1086b has a range of motion $R_4$. The ranges of motion of scanheads 1086a–b may be influenced by the range of dimensions of bills which the discrimination system is designed to accommodate. Similar scanheads may be positioned on the opposite side of the transport path.

Alternatively, the transport mechanism may be designed such that scanned bills are not necessarily centered or justified along the lateral dimension of the transport path. Rather the design of the transport mechanism may permit the position of bills to vary left and right within the lateral dimension of the transport path. In such a case, the edge sensors 1066 of FIG. 39 may be used to locate the edges and center of a bill, and thus provide positional information in a moveable scanhead system and selection criteria in a stationary scanhead system.

Figure 46:
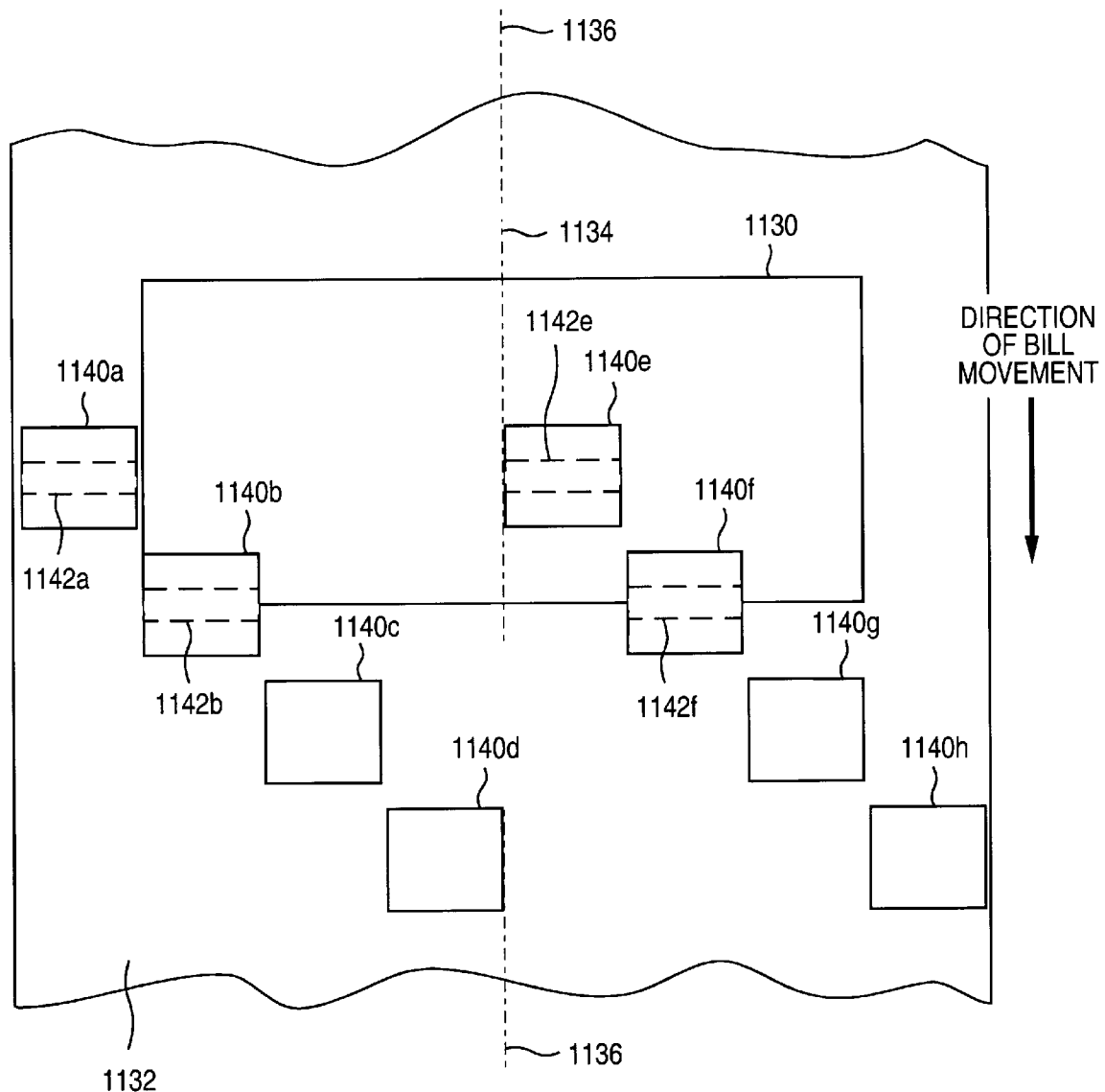
FIG. 46 is a top view of a staggered scanhead arrangement according to a preferred embodiment of the present invention.

In addition to the stationary scanhead and moveable scanhead systems described above, a hybrid system having both stationary and moveable scanheads may be used. Likewise, it should be noted that the laterally displaced scanheads described above need not lie along the same lateral axis. That is, the scanheads may be, for example, staggered upstream and downstream from each other. FIG. 46 is a top view of a staggered scanhead arrangement according to a preferred embodiment of the present invention. As illustrated in FIG. 46, a bill 1130 is transported in a centered manner along the transport path 1132 so that the center 1134 of the bill 1130 is aligned with the center 1136 of the transport path 1132. Scanheads 1140a–h are arranged in a staggered manner so as to permit scanning of the entire width of the transport path 1132. The areas illuminated by each scanhead are illustrated by strips 1142a, 1142b, 1142e, and 1142f for scanheads 1140a, 1140b, 1140e, and 1140f, respectively. Based on size determination sensors, scanheads 1140a and 1140h may either not be activated or their output ignored.

In general, if prior to scanning a document, preliminary information about a document can be obtained, such as its size or color, appropriately positioned stationary scanheads may be activated or laterally moveable scanheads may be appropriately positioned provided the preliminary information provides some indication as to the potential identity of the document. Alternatively, especially in systems having scanheads positioned over a significant portion of the transport path, many or all of the scanheads of a system may be activated to scan a document. Then subsequently, after some preliminary determination as to a document's identity has been made, only the output or derivations thereof of appropriately located scanheads may be used to generate scanned patterns. Derivations of output signals include, for example, data samples stored in memory generated by sampling output signals. Under such an alternative embodiment, information enabling a preliminary determination as to a document's identity may be obtained by analyzing information either from sensors separate from the scanheads or from one or more of the scanheads themselves. An advantage of such preliminary determinations is that the number of scanned patterns which have to be generated or compared to a set of master patterns is reduced. Likewise the number of master patterns to which scanned patterns must be compared may also be reduced.

While the scanheads 1140a–h of FIG. 46 are arranged in a non-overlapping manner, they may alternatively be arranged in an overlapping manner. By providing additional lateral positions, an overlapping scanhead arrangement may provide greater selectivity in the segments to be scanned. This increase in scanable segments may be beneficial in compensating for currency manufacturing tolerances which result in positional variances of the printed indicia on bills relative to their edges. Additionally, in a preferred embodiment, scanheads positioned above the transport path are positioned upstream relative to their corresponding scanheads positioned below the transport path.

Figure 47A:
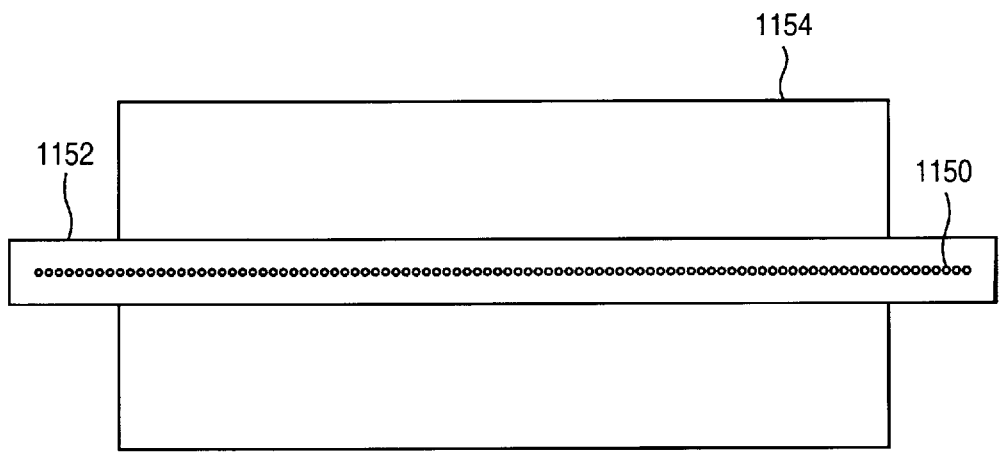
FIG. 47a is a top view of a linear array scanhead according to a preferred embodiment of the present invention illustrating a bill being fed in a centered fashion.
Figure 47B:
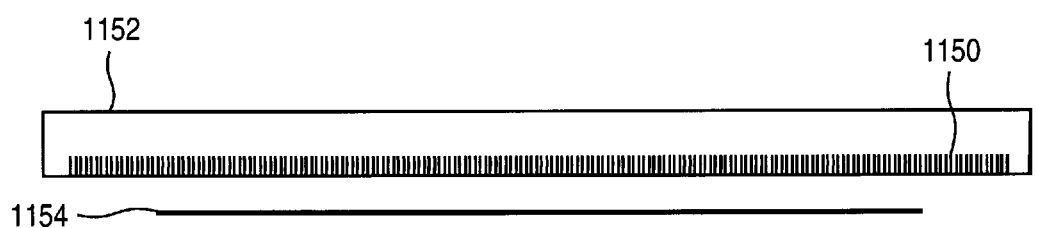
FIG. 47b is a side view of a linear array scanhead according to a preferred embodiment of the present invention illustrating a bill being fed in a centered fashion.

FIGS. 47a and 47b illustrate another preferred embodiment of the present in invention wherein a plurality of analog sensors 1150 such as photodetectors are laterally displaced from each other and are arranged in a linear array within a single scanhead 1152. FIG. 47a is a top view while FIG. 47b is a side elevation view of such a linear array embodiment. The output of individual sensors 1150 are connected to analog-to-digital converters (not shown) through the use of graded index fibers, such as a "lens array" manufactured by MSG America, Inc., part number SLA20A1675702A3, and subsequently to a CPU (not shown) in a manner similar to that depicted in FIGS. 1 and 6a. As depicted in FIGS. 47a and 47b, a bill 1154 is transported past the linear array scanhead 1152 in a centered fashion. A preferred length for the linear array scanhead is about 6–7 inches (15 cm–17 cm).

In a manner similar to that described above, based on the determination of the size of a bill, appropriate sensors may be activated and their output used to generate scanned patterns. Alternatively many or all of the sensors may be activated with only the output or derivations thereof of appropriately located sensors being used to generate scanned patterns. Derivations of output signals include, for example, data samples stored in memory generated by sampling output signals. As a result, a discriminating system incorporating a linear array scanhead according the present invention would be capable of accommodating a wide variety of bill-types. Additionally, a linear array scanhead provides a great deal of flexibility in how information may be read and processed with respect to various bills. In addition to the ability to generate scanned patterns along segments in a direction parallel to the direction of bill movement, by appropriately processing scanned samples, scanned patterns may be "generated" or approximated in a direction perpendicular to the direction of bill movement. For example, if the linear array scanhead 1152 comprises one hundred and sixty (160) sensors 1150 over a length of 7 inches (17.78 cm) instead of taking samples for 64 encoder pulses from say 30 sensors, samples may be taken for 5 encoder pulses from all 160 cells (or all those positioned over the bill 1154). Alternatively, 160 scanned patterns (or selected ones thereof) of 5 data samples each may be used for pattern comparisons. Accordingly, it can be seen that the data acquisition time is significantly reduced from 64 encoder pulses to only 5 encoder pulses. The time saved in acquiring data can be used to permit more time to be spent processing data and/or to reduce the total scanning time per bill thus enabling increased throughput of the identification system. Additionally, the linear array scanhead permits a great deal of flexibility in tailoring the areas to be scanned. For example, it has been found that the leading edge of Canadian bills contain valuable graphic information. Accordingly, when it is determined that a test bill may be a Canadian bill (or when the identification system is set to a Canadian currency setting), the scanning area can be limited to the leading edge area of bills, for example, by activating many laterally displaced sensors for a relatively few number of encoder pulses.

Figure 48:
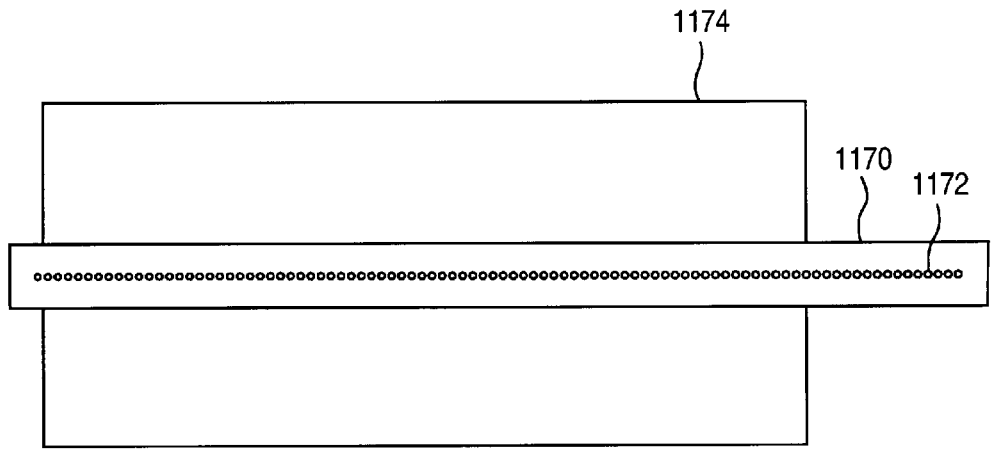
FIG. 48 is a top view of a linear array scanhead according to another preferred embodiment of the present invention illustrating a bill being fed in a non-centered fashion.

FIG. 48 is a top view of another preferred embodiment of a linear array scanhead 1170 having a plurality of analog sensors 1172 such as photodetectors wherein a bill 1174 is transported past the scanhead 1170 in a non-centered manner. As discussed above, positional information from size determining sensors may be used to select appropriate sensors. Alternatively, the linear array scanhead itself may be employed to determine the size of a bill, thus eliminating the need for separate size determining sensors. For example, all sensors may be activated, data samples derived from sensors located on the ends of the linear array scanhead may be preliminarily processed to determine the lateral position and the length of a bill. The width of a bill may be determined either by employing separate leading/trailing edge sensors or pre-processing data samples derived from initial and ending cycle encoder pulses. Once size information is obtained about a bill under test, only the data samples retrieved from appropriate areas of a bill need be further processed.

Figure 49:
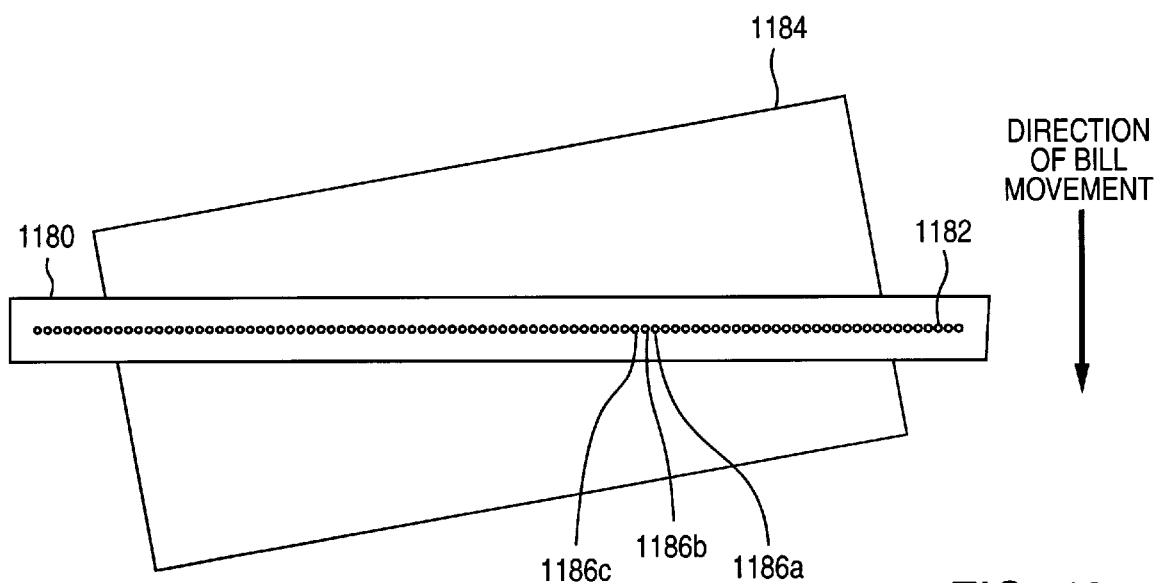
FIG. 49 is a top view of a linear array scanhead according to another preferred embodiment of the present invention illustrating a bill being fed in a skewed fashion.

FIG. 49 is a top view of another preferred embodiment of a linear scanhead 1180 according to the present invention illustrating the ability to compensate for skewing of bills. Scanhead 1180 has a plurality of analog sensors 1182 and a bill 1184 is transported past scanhead 1180 in a skewed manner. Once the skew of a bill has been determined, for example through the use of leading edge sensors, readings from sensors 1182 along the scanhead 1180 may be appropriately delayed. For example, suppose it is determined that a bill is being fed past scanhead 1180 so that the left front corner of the bill reaches the scanhead five encoder pulses before the right front corner of the bill. In such a case, sensor readings along the right edge of the bill can be delayed for 5 encoder pulses to compensate for the skew. Where scanned patterns are to be generated over only a few encoder pulses, the bill may be treated as being fed in a non-skewed manner since the amount of lateral deviation between a scan along a skewed angle and a scan along a non-skewed angle is minimal for a scan of only a few encoder pulses. However, where it is desired to obtain a scan over a large number of encoder pulses, a single scanned pattern may be generated from the outputs of more than one sensor. For example, a scanned pattern may be generated by taking data samples from sensor 1186a for a given number of encoder pulses, then taking data samples from sensor 1186b for a next given number of encoder pulses, and then taking data samples from sensor 1186c for a next given number of encoder pulses. The number of given encoder pulses for which data samples may be taken from the same sensor is influenced by the degree of skew, the greater the degree of skew of the bill, the fewer the number of data samples which may be obtained before switching to the next sensor. Alternatively, master patterns may be generated and stored for various degrees of skew, thus permitting a single sensor to generate a scanned pattern from a bill under test.

With regards to FIGS. 47–49, while only a single linear array scanhead is shown, another linear array scanhead may be positioned on the opposite side of the transport path to permit scanning of either or both sides of a bill. Likewise, the benefits of using a linear array scanhead may also be obtainable using a multiple scanhead arrangement which is configured appropriately, for example such as depicted in FIG. 46 or a linear arrangement of multiple scanheads.

In addition to size and scanned characteristic patterns, color may also be used to discriminate bills. For example, while all U.S. bills are printed in the same colors, e.g., a green side and a black side, bills from other countries often vary in color with the denomination of the bill. For example, a German 50 deutsche mark bill-type is brown in color while a German 100 deutsche mark bill-type is blue in color. Alternatively, color detection may be used to determine the face orientation of a bill, such as where the color of each side of a bill varies. For example, color detection may be used to determine the face orientation of U.S. bills by detecting whether or not the "green" side of a U.S. bill is facing upwards. Separate color sensors may be added upstream of the scanheads described above. According to such an embodiment, color information may be used in addition to size information to preliminarily identify a bill. Likewise, color information may be used to determine the face orientation of a bill which determination may be used to select upper or lower scanheads for scanning a bill accordingly or compare scanned patterns retrieved from upper scanheads with a set of master patterns generated by scanning a corresponding face while the scanned patterns retrieved from the lower scanheads are compared with a set of master patterns generated by scanning an opposing face. Alternatively, color sensing may be incorporated into the scanheads described above. Such color sensing may be achieved by, for example, incorporating color filters, colored light sources, and/or dichroic beamsplitters into the currency discrimination system of the present invention. Color information acquisition is described in more detail in co-pending U.S. application Ser. No. 08/219,093 filed Mar. 29, 1994, for a "Currency Discriminator and Authenticator" incorporated herein by reference. Various color information acquisition techniques are described in U.S. Pat. Nos. 4,841,358; 4,658,289; 4,716,456; 4,825,246; and 4,992,860.

Figure 50A:
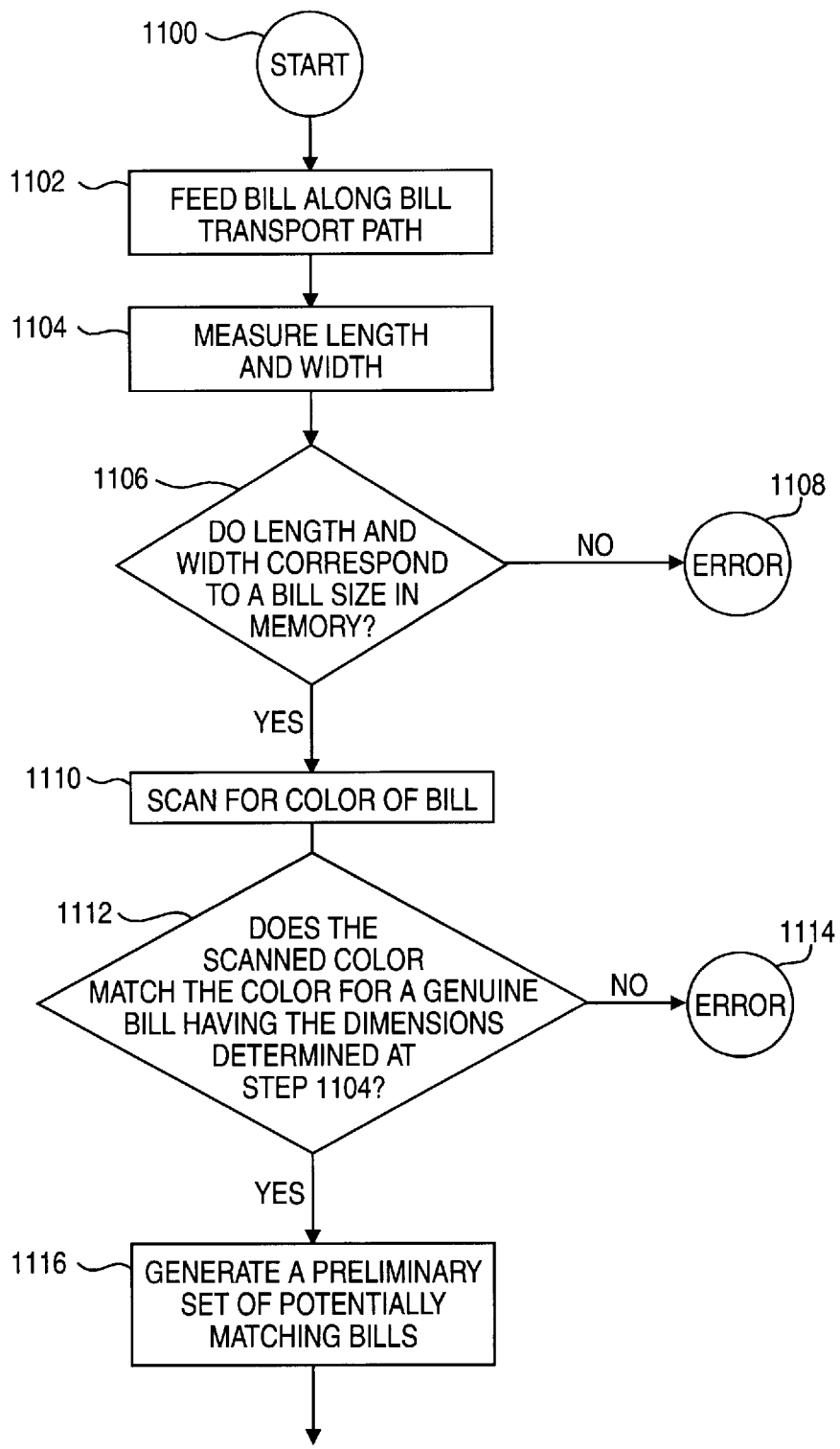
FIGS. 50a and 50b are a flowchart of the operation of a currency discrimination system according to a preferred embodiment of the present invention.
Figure 50B:
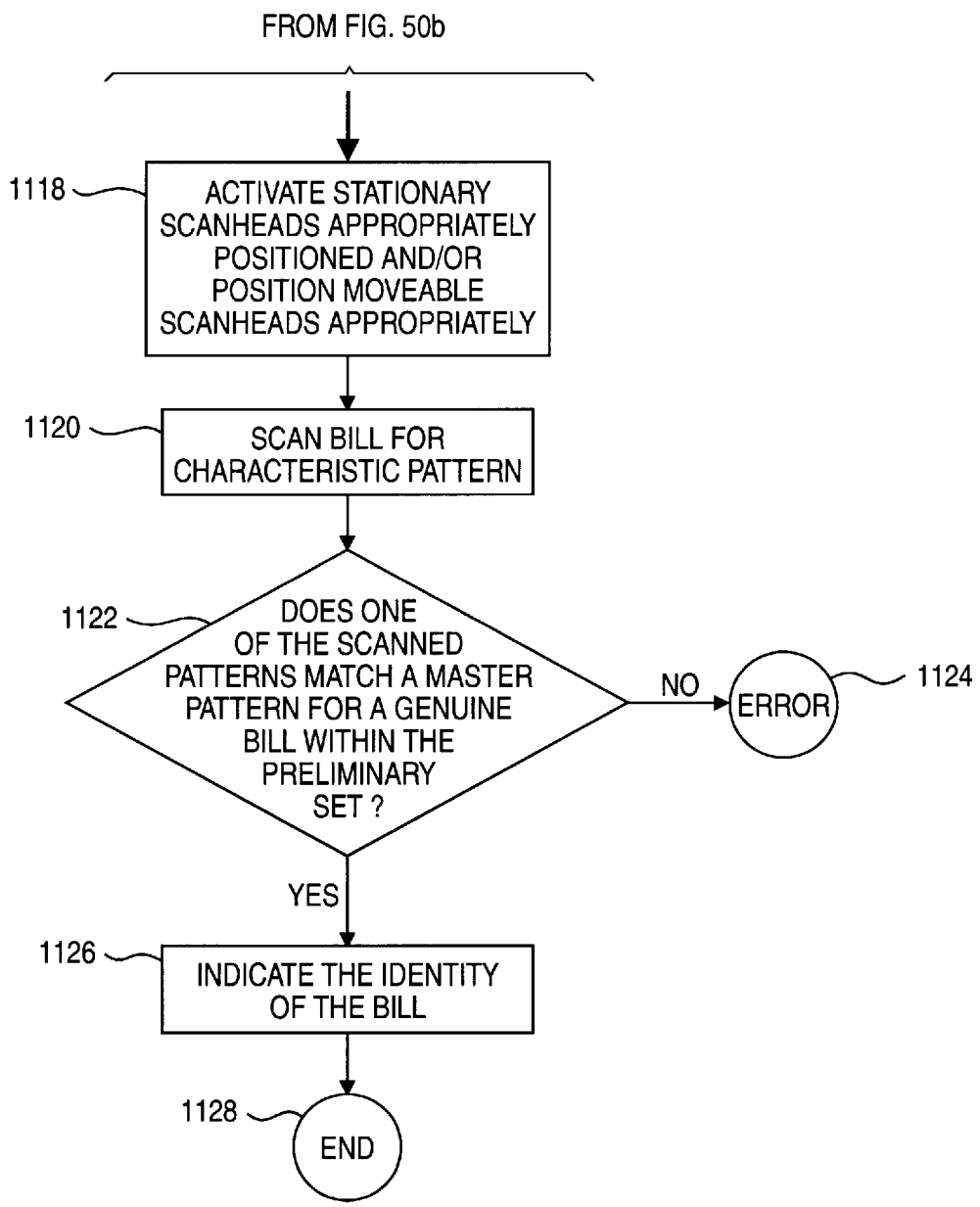

The operation of a currency discriminator according to a preferred embodiment of the present invention may be further understood by referring to the flowchart of FIGS. 50a and 50b. In the process beginning at step 1100, a bill is fed along a transport path (step 1102) past sensors which measure the length and width of the bill (step 1104). These size determining sensors may be, for example, those illustrated in FIG. 39. Next at step 1106, it is determined whether the measured dimensions of the bill match the dimensions of at least one bill stored in memory, such as EPROM 60 of FIG. 6a. If no match is found, an appropriate error is generated at step 1108. If a match is found, the color of the bill is scanned for at step 1110. At step 1112, it is determined whether the color of the bill matches a color associated with a genuine bill having the dimensions measured at step 1104. An error is generated at step 1114 if no such match is found. However, if a match is found, a preliminary set of potentially matching bills is generated at step 1116. Often, only one possible identity will exist for a bill having a given color and dimensions. However, the preliminary set of step 1116 is not limited to the identification of a single bill-type, that is, a specific denomination of a specific currency system; but rather, the preliminary set may comprise a number of potential bill-types. For example, all U.S. bills have the same size and color. Therefore, the preliminary set generated by scanning a U.S. $5 bill would include U.S. bills of all denominations.

Based on the preliminary set (step 1116), selected scanheads in a stationary scanhead system may be activated (step 1118). For example, if the preliminary identification indicates that a bill being scanned has the color and dimensions of a German 100 deutsche mark, the scanheads over regions associated with the scanning of an appropriate segment for a German 100 deutsche mark may be activated. Then upon detection of the leading edge of the bill by sensors 1068 of FIG. 40, the appropriate segment may be scanned. Alternatively, all scanheads may be active with only the scanning information from selected scanheads being processed. Alternatively, based on the preliminary identification of a bill (step 1116), moveable scanheads may be appropriately positioned (step 1118).

Subsequently, the bill is scanned for a characteristic pattern (step 1120). At step 1122, the scanned patterns produced by the scanheads are compared with the stored master patterns associated with genuine bills as dictated by the preliminary set. By only making comparisons with master patterns of bills within the preliminary set, processing time may be reduced. Thus for example, if the preliminary set indicated that the scanned bill could only possibly be a German 100 deutsche mark, then only the master pattern or patterns associated with a German 100 deutsche mark need be compared to the scanned patterns. If no match is found, an appropriate error is generated (step 1124). If a scanned pattern does match an appropriate master pattern, the identity of the bill is accordingly indicated (step 1126) and the process is ended (step 1128).

While some of the preferred embodiments discussed above entailed a system capable of identifying a plurality of bill-types, the system may be adapted to identify a bill under test as either belonging to a specific bill-type or not. For example, the system may be adapted to store master information associated with only a single bill-type such as a United Kingdom 5 pound bill. Such a system would identify bills under test which were United Kingdom 5 pound bills and would reject all other bill-types.

The scanheads of the present invention may be incorporated into a document identification system capable of identifying a variety of documents. For example, the system may be designed to accommodate a number of currencies from different countries. Such a system may be designed to permit operation in a number of modes. For example, the system may be designed to permit an operator to select one or more of a plurality of bill-types which the system is designed to accommodate. Such a selection may be used to limit the number of master patterns with which scanned patterns are to be compared. Likewise, the operator may be permitted to select the manner in which bills will be fed, such as all bills face up, all bills top edge first, random face orientation, and/or random top edge orientation. Additionally, the system may be designed to permit output information to be displayed in a variety of formats to a variety of peripherals, such as a monitor, LCD display, or printer. For example, the system may be designed to count the number of each specific bill-types identified and to tabulate the total amount of currency counted for each of a plurality of currency systems. For example, a stack of bills could be placed in the bill accepting station 12 of FIG. 2a–2b, and the output unit 36 of FIG. 2a–2b may indicate that a total of 370 British pounds and 650 German marks were counted. Alternatively, the output from scanning the same batch of bills may provide more detailed information about the specific denominations counted, for example one 100 pound bill, five 50 pound bills, and one 20 pound bill and thirteen 50 deutsche mark bills. Such a device would be useful in a bank teller environment. A bank customer could hand the teller the above stack of bills. The teller could then place the stack of bills in the device. The device quickly scans the bills and indicates that a total of 370 British pounds and 650 German marks were counted. The teller could then issue the customer a receipt. At some point after the above transaction, the teller could separate the bills either by hand and/or by using an automatic sorter device located, for example, in a back room. The above transaction could then be performed rapidly without the customer being detained while the bills are being sorted.

In a document identification system capable of identifying a variety of bills from a number of countries, a manual selection device, such as a switch or a scrolling selection display, may be provided so that the operator may designate what type of currency is to be discriminated. For example, in a system designed to accommodate both Canadian and German currency, the operator could turn a dial to the Canadian bill setting or scroll through a displayed menu and designate Canadian bills. By pre-declaring what type of currency is to be discriminated, scanned patterns need only be compared to master patterns corresponding to the indicated type of currency, e.g., Canadian bills. By reducing the number of master patterns which have to be compared to scanned patterns, the processing time can be reduced.

Alternatively, a system may be designed to compare scanned patterns to all stored master patterns. In such a system, the operator need not pre-declare what type of currency is to be scanned. This reduces the demands on the operator of the device. Furthermore, such a system would permit the inputting of a mixture of bills from a number of countries. The system would scan each bill and automatically determine the issuing country and the denomination.

In addition to the manual and automatic bill-type discriminating systems, an alternate system employs a semi-automatic bill-type discriminating method. Such a system would work in a manner similar to the stranger mode described above. In such a system, a stack of bills is placed in the input hopper. The first bill is scanned and the generated scanned pattern is compared with the master patterns associated with bills from a number of different countries. The discriminator identifies the country-type and the denomination of the bill. Then the discriminator compares all subsequent bills in the stack to the master patterns associated with bills only from the same country as the first bill. For example, if a stack of U.S. bills were placed in the input hopper and the first bill was a $5 bill, the first bill would be scanned. The scanned pattern would be compared to master patterns associated with bills from a number of countries, e.g., U.S., Canadian, and German bills. Upon determining that the first bill is a U.S. $5 bill, scanned patterns from the remaining bills in the stack are compared only to master patterns associated with U.S. bills, e.g., $1, $2, $5, $10, $20, $50 , and $100 bills. When a bill fails to sufficiently match one of the compared patterns, the bill may be flagged as described above such as by stopping the transport mechanism with the flagged bill being the last bill deposited in the output receptacle.

A currency discriminating device designed to accommodate both Canadian and German currency bills will now be described. According to this preferred embodiment, a currency discriminating device similar to that described above in connection with scanning U.S. currency (see, e.g., FIGS. 1–38 and accompanying description) is modified so as to be able to accept both Canadian and German currency bills. According to a preferred embodiment when Canadian bills are being discriminated, no magnetic sampling or authentication is performed.

Canadian bills have one side with a portrait (the portrait side) and a reverse side with a picture (the picture side). Likewise, German bills also have one side with a portrait (the portrait side) and a reverse side with a picture (the picture side). In a preferred embodiment, the discriminator is designed to accept either stacks of Canadian bills or stacks of German bills, the bills in the stacks being faced so that the picture side of all the bills will be scanned by a triple scanhead arrangement to be described in connection with FIG. 51. In a preferred embodiment, this triple scanhead replaces the single scanhead arrangement housed in the unitary molded plastic support member 280 (see, e.g., FIGS. 25 and 26).

Figure 51:
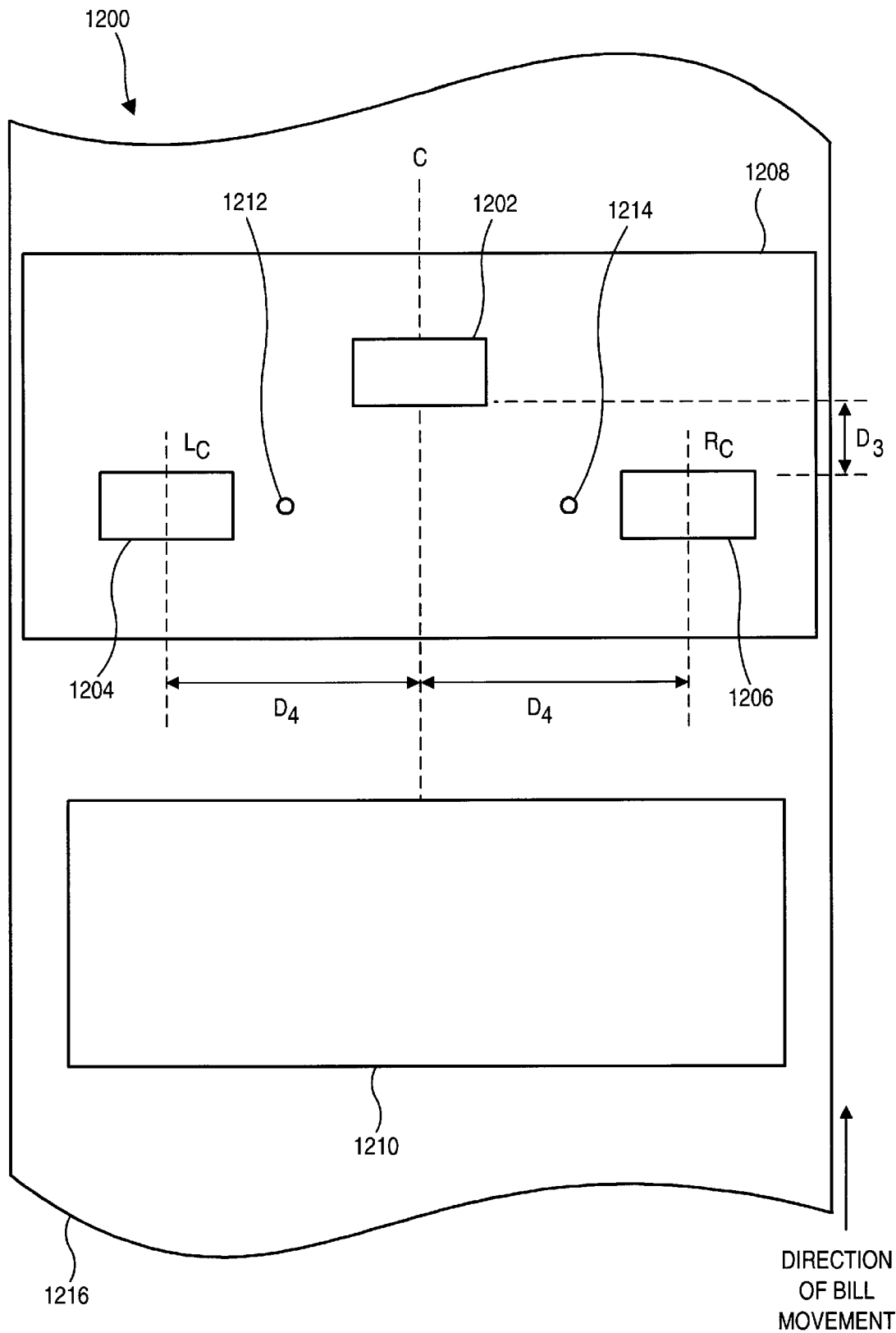
FIG. 51 is a top view of a triple scanhead arrangement utilized in a discriminating device able to discriminate both Canadian and German bills according to a preferred embodiment of the present invention.

FIG. 51 is a top view of a triple scanhead arrangement 1200. The triple scanhead arrangement 1200 comprises a center scanhead 1202, a left scanhead 1204, and a right scanhead 1206 housed in a unitary molded plastic support member 1208. A bill 1210 passes under the arrangement 1200 in the direction shown. O-rings are positioned near each scanhead, preferably two O-rings per scanhead, one on each side of a respective scanhead, to engage the bill continuously while transporting the bill between rolls 223 and 241 (FIG. 20a) and to help hold the bill flat against the guide plate 240 (FIG. 20a). The left 1204 and right 1206 scanhead are placed slightly upstream of the center scanhead 1202 by a distance $D_3$. In a preferred embodiment, $D_3$ is 0.083 inches (0.21 cm). The center scanhead 1202 is centered over the center C of the transport path 1216. The center $L_C$ of the left scanhead 1204 and the center $R_C$ of the right scanhead 1206 are displaced laterally from center C of the transport path in a symmetrical fashion by a distance $D_4$. In a preferred embodiment $D_4$ is 1.625 inches (4.128 cm).

The scanheads 1202, 1204, and 1206 are each similar to the scanheads describe above connection with FIGS. 1–38, except only a wide slit having a length of about 0.500" and a width of about 0.050" is utilized. The wide slit of each scanhead is used both to detect the leading edge of a bill and to scan a bill after the leading edge has been detected.

Two photosensors 1212 and 1214 are located along the lateral axis of the left and right scanheads 1204 and 1206, one on either side of the center scanhead 1202. Photosensors 1212 and 1214 are same as the photosensors PS1 and PS2 describe above (see, e.g., FIGS. 26 and 30). Photosensors 1212 and 1214 are used to detect doubles and also to measure the dimension of bills in the direction of bill movement which in the preferred embodiment depicted in FIG. 51 is the narrow dimension of bills. Photosensors 1212 and 1214 are used to measure the narrow dimension of a bill by indicating when the leading and trailing edges of a bill passes by the photosensors 1212 and 1214. This information in combination with the encoder information permits the narrow dimension of a bill to be measured.

All Canadian bills are 6" (15.24 cm) in their long dimension and 2.75" (6.985 cm) in their narrow dimension. German bills vary in size according to denomination. In a preferred embodiment of the currency discriminating system, the discriminating device is designed to accept and discriminate $2, $5, $10, $20, $50, and $100 Canadian bills and 10 DM, 20 DM, 50 DM, and 100 DM German bills. These German bills vary in size from 13.0 cm (5.12") in the long dimension by 6.0 cm (2.36") in the narrow dimension for 10 DM bills to 16.0 cm (6.30") in the long dimension by 8.0 cm (3.15") in the narrow dimension for 100 DM bills. The input hopper of the discriminating device is made sufficiently wide to accommodate all the above listed Canadian and German bills, e.g., 6.3" (16.0 cm) wide.

Figure 52:
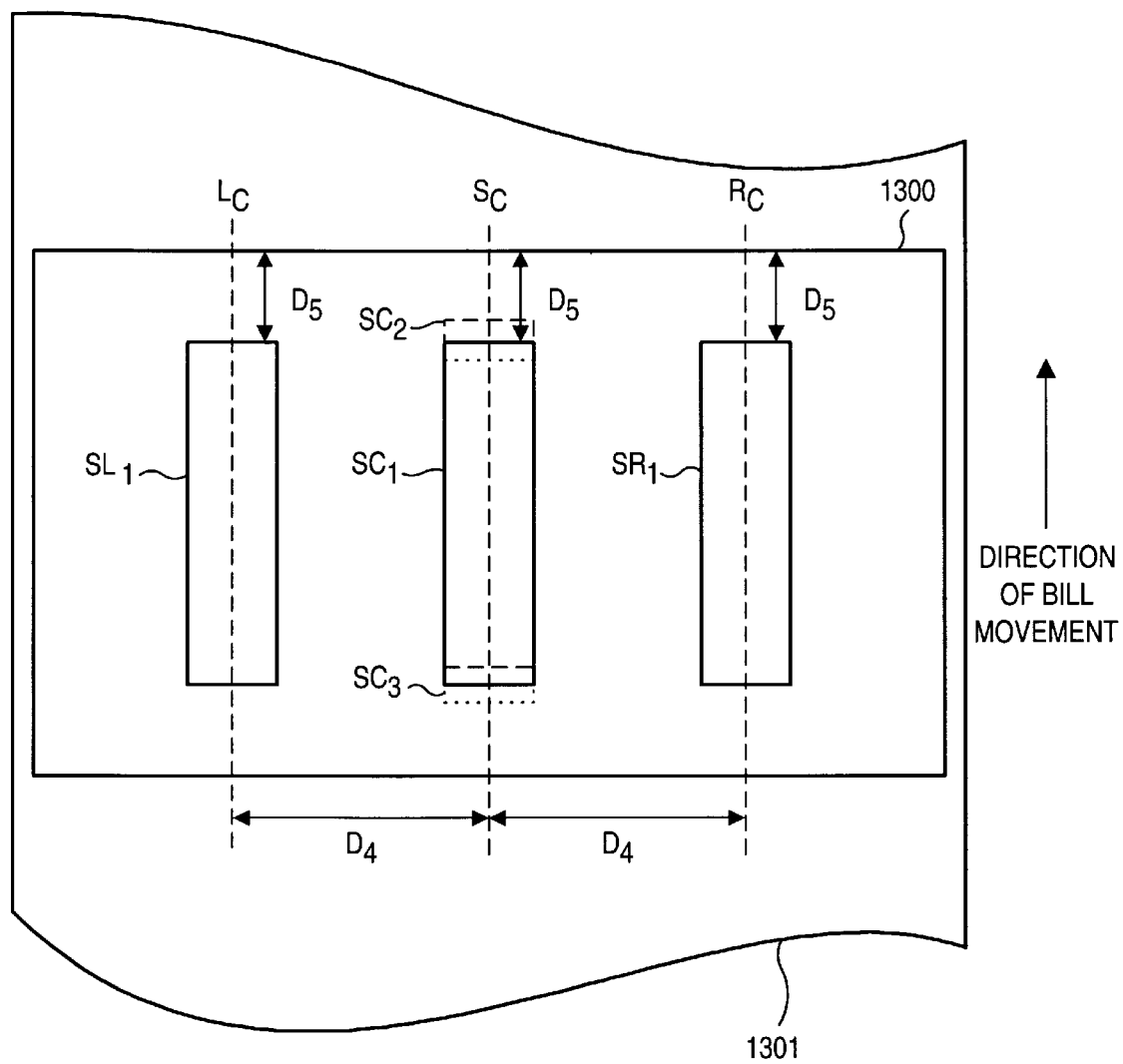
FIG. 52 is a top view of Canadian bill illustrating the areas scanned by the triple scanhead arrangement of FIG. 51 according to a preferred embodiment of the present invention.

FIG. 52 is a top view of a Canadian bill illustrating the areas scanned by the triple scanhead arrangement of FIG. 51. In generating scanned patterns from a Canadian bill 1300 traveling along a transport path 1301, segments $SL_1$, $SC_1$, and $SR_1$ are scanned by the left 1204, center 1202, and right 1206 scanheads, respectively, on the picture side of the bill 1300. These segments are similar to segment S in FIG. 4. Each segment begins a predetermined distance $D_5$ inboard of the leading edge of the bill. In a preferred embodiment $D_5$ is 0.5" (1.27 cm). Segments $SL_1$, $SC_1$, and $SR_1$ each comprise 64 samples as shown in FIGS. 3 and 5. In a preferred embodiment Canadian bills are scanned at a rate of 1000 bills per minute. The lateral location of segments $SL_1$, $SC_1$, and $SR_1$ is fixed relative to the transport path 1301 but may vary left to right relative to bill 1300 since the lateral position of bill 1300 may vary left to right within the transport path 1301.

A set of eighteen (18) master Canadian patterns are stored for each type of Canadian bill that the system is designed to discriminate, three (3) for each scanhead in both the forward and reverse directions. For example, three patterns are generated by scanning a given genuine Canadian bill in the forward direction with the center scanhead. One pattern is generated by scanning down the center of the bill along segment $SC_1$, a second is generated by scanning along a segment $SC_2$ initiated 1.5 samples before the beginning of $SC_1$, and a third is generated by scanning along a segment $SC_3$ initiated 1.5 samples after the beginning of $SC_1$. The second and third patterns are generated to compensate for the problems associated with triggering off the edge of a bill as discussed above.

To compensate for possible lateral displacement of bills to be scanned along a direction transverse to the direction of bill movement, the exact lateral location along which each of the above master patterns is generated is chosen after considering the correlation results achieved when a bill is displaced slightly to the left or to the right of the center of each scanhead, i.e., lines $L_C$, $S_C$, and $R_C$. For example, in generating a master pattern associated with segment $SC_1$, a scan of a genuine bill may be taken down the center of a bill, a second scan may be taken along a segment 0.15" to the right of center (+0.15"), and a third scan may be taken along a segment 0.15" to the left of center (−0.15"). Based on the correlation result achieved, the actual scan location may be adjusted slightly to the right or left so the effect of the lateral displacement of a bill on the correlation results is minimized. Thus, for example, the master associated with a forward scan of a Canadian $2 bill using the center scanhead 1202 may be taken along a line 0.05" to the right of the center of the bill.

Furthermore, the above stored master patterns are generated either by scanning both a relatively new crisp genuine bill and an older yellowed genuine bill and averaging the patterns generated from each or, alternatively, by scanning an average looking bill.

Master patterns are stored for nine (9) types of Canadian bills, namely, the newer series $2, $5, $10, $20, $50, and $100 bills and the older series $20, $50, and $100 bills. Accordingly, a total of 162 Canadian master patterns are stored (9 types×18 per type).

Figure 53:
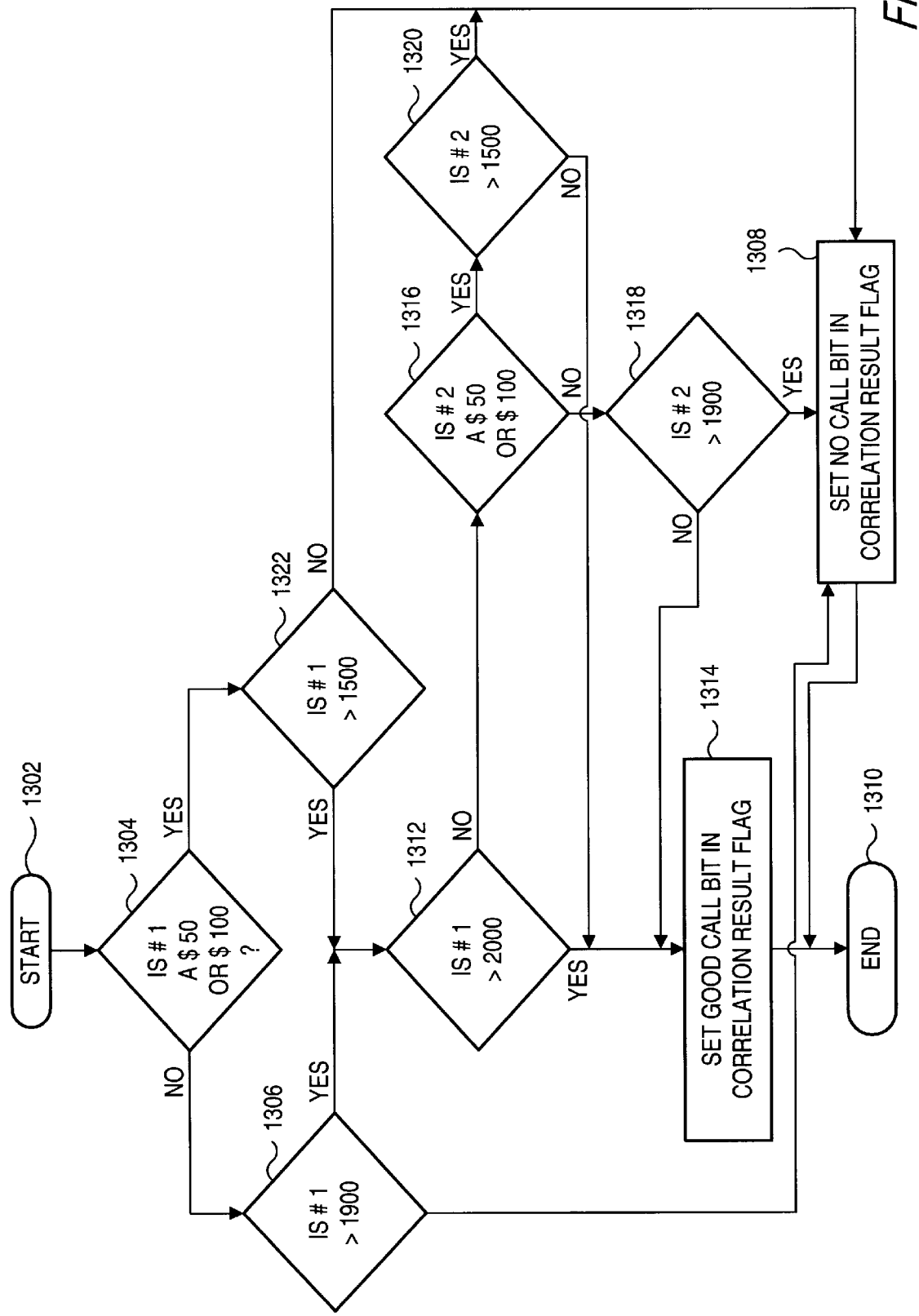
FIG. 53 is a flowchart of the threshold tests utilized in calling the denomination of a Canadian bill according to a preferred embodiment of the present invention.

FIG. 53 is a flowchart of the threshold test utilized in calling the denomination of a Canadian bill. When Canadian bills are being discriminated the flowchart of FIG. 53 replaces the flowchart of FIG. 13. The correlation results associated with correlating a scanned pattern to a master pattern of a given type of Canadian bill in a given scan direction and a given offset in the direction of bill movement from each of the three scanheads are summed. The highest of the resulting 54 summations is designated the #1 correlation and the second highest is preliminarily designated the #2 correlation. The #1 and #2 correlations each have a given bill type associated with them. If the bill type associated with the #2 correlation is merely a different series from, but the same denomination as, the bill type associated with the #1 denomination, the preliminarily designated #2 correlation is substituted with the next highest correlation where the bill denomination is different from the denomination of the bill type associated with the #1 correlation.

The threshold test of FIG. 53 begins at step 1302. Step 1304 checks the denomination associated with the #1 correlation. If the denomination associated with the #1 correlation is not a $50 or $100, the #1 correlation is compared to a threshold of 1900 at step 1306. If the #1 correlation is less than or equal to 1900, the correlation number is too low to identify the denomination of the bill with certainty. Therefore, step 1308 sets a "no call" bit in a correlation result flag and the system returns to the main program at step 1310. If, however, the #1 correlation is greater than 1900 at step 1306, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1 correlation is not greater than 2000 at step 1312, step 1316 checks the denomination associated with the #2 correlation. If the denomination associated with the #2 correlation is not a $50 or $100, the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty because the #1 and #2 correlations are both above 1900 and, yet, are associated with different denominations. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308.

If the denomination associated with the #1 correlation is a $50 or $100 at step 1304, the #1 correlation is compared to a threshold of 1500 at step 1322. If the #1 correlation is less than or equal to 1500, the denomination of the scanned bill cannot be identified with certainty and, therefore, the "no call" bit is set in the correlation result flag at step 1308. If, however, the #1 correlation at step 1322 is greater than 1500, the system advances to step 1312 which determines whether the #1 correlation is greater than 2000. If the #1 correlation is greater than 2000, the correlation number is sufficiently high that the denomination of the scanned bill can be identified with certainty without any further checking. Consequently, a "good call" bit is set in the correlation result flag at step 1314 and the system returns to the main program at step 1310.

If the #1correlation is not greater than 2000 at step 1312, step 1316 checks the denomination associated with the #2 correlation. If the denomination associated with the #2 correlation is not a $50 or $100 , the #2 correlation is compared to a threshold of 1900 at step 1318. If the #2 correlation is less than or equal to 1900, the denomination identified by the #1 correlation is acceptable, and thus the "good call" bit is set in the correlation result flag at step 1314 and the system returns to the main program at step 1310. If, however, the #2 correlation is greater than 1900 at step 1318, the denomination of the scanned bill cannot be identified with certainty. Accordingly, the "no call" bit is set in the correlation result flag at step 1308.

If the denomination associated with the #2 correlation is a $50 or $100 at step 1316, the #2 correlation is compared to a threshold of 1500 at step 1320. If the #2 correlation is less than or equal to 1500, the denomination identified by the #1 correlation is acceptable, and thus the "good call" bit is set in the correlation result flag at step 1314 and the system returns to the main program at step 1310. If, however, the #2 correlation is greater than 1500 at step 1320, the denomination of the scanned bill cannot be identified with certainty. As a result, the "no call" bit is set in the correlation result flag at step 1308 and the system returns to the main program at step 1310.

Now the use of the triple scanhead arrangement 1200 in scanning and discriminating German currency will be described. When scanning German bills, only the output of the center scanhead 1202 is utilized to generate scanned patterns. A segment similar to segment S of FIG. 4 is scanned over the center of the transport path at a predetermined distance $D_6$ inboard after the leading edge of a bill is detected. In a preferred embodiment $D_6$ is 0.25" (0.635 cm). The scanned segment comprises 64 samples as shown in FIGS. 3 and 5. In a preferred embodiment German bills are scanned at a rate of 1000 bills per minute. The lateral location of the scanned segment is fixed relative to the transport path 1216 but may vary left to right relative to bill 1210 since the lateral position of bill 1210 may vary left to right within the transport path 1216.

Figure 54A:
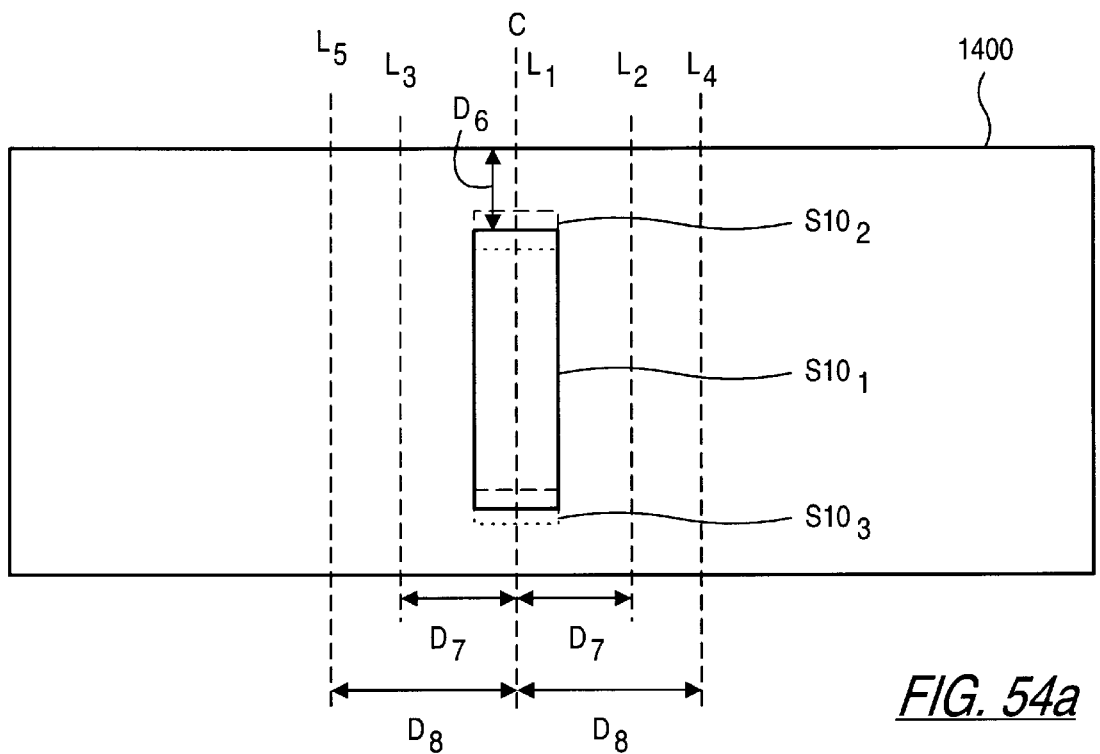
FIG. 54a illustrates the general areas scanned in generating master 10 DM German patterns according to a preferred embodiment of the present invention.

FIG. 54a illustrates the general areas scanned in generating master 10 DM German patterns. Due to the short length of 10 DM bills in their long dimension relative to the width of the transport path, thirty (30) 10 DM master patterns are stored. A first set of five patterns are generated by scanning a genuine 10 DM bill 1400 in the forward direction along laterally displaced segments all beginning a predetermined distance $D_6$ inboard of the leading edge of the bill 1400. Each of these five laterally displaced segments is centered about a respective one of lines $L_{1-L5}$. One such segment $S10_1$ centered about line $L_1$ is illustrated in FIG. 54a. Line $L_1$ is disposed down the center C of the bill 1400. In a preferred embodiment lines $L_2$–$L_5$ are disposed in a symmetrical fashion about the center C of the bill 1400. In a preferred embodiment lines $L_2$ and $L_3$ are laterally displaced from $L_1$ by a distance $D_7$ where $D_7$ is 0.24" (0.61 cm) and lines $L_4$ and $L_5$ are laterally displaced from $L_1$ by a distance $D_8$ where $D_8$ is 0.48" (1.22 cm).

A second set of five patterns are generated by scanning a genuine 10 DM bill 1400 in the forward direction along laterally displaced segments along lines $L_1$–$L_5$ all beginning at a second predetermined distance inboard of the leading edge of the bill 1400, the second predetermined distance being less than the predetermined distance $D_6$. One such segment $S10_2$ centered about line $L_1$ is illustrated in FIG. 54a. In a preferred embodiment the second predetermined distance is such that scanning begins one sample earlier than $D_6$, that is about 30 mils before the initiation of the patterns in the first set of five patterns.

A third set of five patterns are generated by scanning a genuine 10 DM bill 1400 in the forward direction along laterally displaced segments along lines $L_1$–$L_5$ all beginning at a third predetermined distance inboard of the leading edge of the bill 1400, the third predetermined distance being greater than the predetermined distance $D_6$. One such segment $S10_3$ centered about line $L_1$ is illustrated in FIG. 54a. In a preferred embodiment the third predetermined distance is such that scanning begins one sample later than $D_6$, that is about 30 mils after the initiation of the patterns in the first set of five patterns.

The above three sets of five patterns yield fifteen patterns in the forward direction. Fifteen additional 10 DM master patterns taken in the manner described above but in the reverse direction are also stored.

Figure 54B:
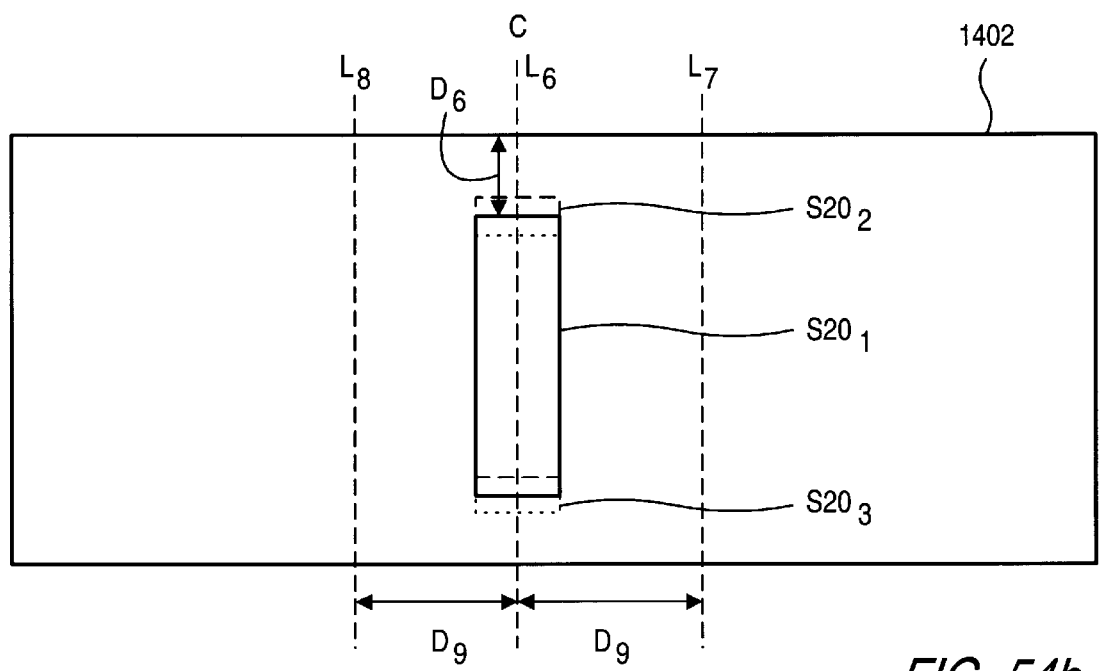
FIG. 54b illustrates the general areas scanned in generating master 20 DM, 50 DM, and 100 DM German patterns according to a preferred embodiment of the present invention.

FIG. 54b illustrates the general areas scanned in generating master 20 DM, 50 DM, and 100 DM German patterns. Due to the lengths of 20 DM, 50 DM, and 100 DM bills in their long dimension being shorter than the width of the transport path, eighteen (18) 20 DM master patterns, eighteen (18) 50 DM master patterns, and eighteen (18) 100 DM master patterns are stored. The 50 DM master patterns and the 100 DM master patterns are taken in the same manner as the 20 DM master patterns except that the 50 DM master patterns and 100 DM master patterns are generated from respective genuine 50 DM bills and 100 DM bills while the 20 DM master patterns are generated from genuine 20 DM bills. Therefore, only the generation of the 20 DM master patterns will be described in detail.

A first set of three patterns are generated by scanning a genuine 20 DM bill 1402 in the forward direction along laterally displaced segments all beginning a predetermined distance $D_6$ inboard of the leading edge of the bill 1402. Each of these three laterally displaced segments is centered about a respective one of lines $L_6$–$L_8$. One such segment $S20_1$ centered about line $L_6$ is illustrated in FIG. 54b. Line $L_6$ is disposed down the center C of the bill 1402. In a preferred embodiment lines $L_7$–$L_8$ are disposed in a symmetrical fashion about the center C of the bill 1402. In a preferred embodiment lines $L_7$ and $L_8$ are laterally displaced from $L_6$ by a distance $D_9$ where $D_9$ is 0.30" (0.76 cm) for the 20 DM bill. The value of $D_9$ is 0.20" (0.51 cm) for the 50 DM bill and 0.10" (0.25 cm) for the 100 DM bill.

A second set of three patterns are generated by scanning a genuine 20 DM bill 1402 in the forward direction along laterally displaced segments along lines $L_6$–$L_8$ all beginning at a second predetermined distance inboard of the leading edge of the bill 1402, the second predetermined distance being less than the predetermined distance $D_6$. One such segment $S20_2$ centered about line $L_6$ is illustrated in FIG. 54b. In a preferred embodiment the second predetermined distance is such that scanning begins one sample earlier than $D_6$, that is about 30 mils before the initiation of the patterns in the first set of three patterns.

A third set of three patterns are generated by scanning a genuine 20 DM bill 1402 in the forward direction along laterally displaced segments along lines $L_6$–$L_8$ all beginning at a third predetermined distance inboard of the leading edge of the bill 1402, the third predetermined distance being greater than the predetermined distance $D_6$. One such segment $S20_3$ centered about line $L_6$ is illustrated in FIG. 54b. In a preferred embodiment the third predetermined distance is such that scanning begins one sample later than $D_6$, that is about 30 mils after the initiation of the patterns in the first set of three patterns.

The above three sets of three patterns yield nine patterns in the forward direction. Nine additional 20 DM master patterns taken in the manner described above but in the reverse direction are also stored. Furthermore, the above stored master patterns are generated either by scanning both a relatively new crisp genuine bill and an older yellowed genuine bill and averaging the patterns generated from each or, alternatively, by scanning an average looking bill.

This yields a total of 84 German master patterns (30 for 10 DM bills, 18 for 20 DM bills, 18 for 50 DM bills, and 18 for 100 DM bills). To reduce the number of master patterns that must compared to a given scanned pattern, the narrow dimension of a scanned bill is measured using photosensors 1212 and 1214. After a given bill has been scanned by the center scanhead 1202, the generated scanned pattern is correlated only against certain ones of above described 84 master patterns based on the size of the narrow dimension of the bill as determined by the photosensors 1212 and 1214. The narrow dimension of each bill is measured independently by photosensors 1212 and 1214 and then averaged to indicate the length of the narrow dimension of a bill. In particular, a first number of encoder pulses occur between the detection of the leading and trailing edges of a bill by the photosensor 1212. Likewise, a second number of encoder pulses occur between the detection of the leading and trailing edges of the bill by the photosensor 1214. These first and second numbers of encoder pulses are averaged to indicate the length of the narrow dimension of the bill in terms of encoder pulses.

The photosensors 1212 and 1214 can also determine the degree of skew of a bill as it passes by the triple scanhead arrangement 1200. By counting the number of encoder pulses between the time when photosensors 1212 and 1214 detect the leading edge of a bill, the degree of skew can be determined in terms of encoder pulses. If no or little skew is measured, a generated scanned pattern is only compared to master patterns associated with genuine bills having the same narrow dimension length. If a relatively large degree of skew is detected, a scanned pattern will be compared with master patterns associated with genuine bills having the next smaller denominational amount than would be indicated by the measured narrow dimension length.

Table 3 indicates which denominational set of master patterns are chosen for comparison to the scanned pattern based on the measured narrow dimension length in terms of encoder pulses and the measured degree of skew in terms of encoder pulses:

TABLE 3

| Narrow Dimension Length in Encoder Pulses | Degree of Skew in Encoder Pulses | Selected Set of Master Patterns |
| --- | --- | --- |
| <1515 | Not applicable | 10 DM |
| ≧1515 and <1550 | ≧175 | 10 DM |
| ≧1515 and <1550 | <175 | 20 DM |
| ≧1550 and <1585 | ≧300 | 10 DM |
| ≧1550 and <1585 | <300 | 20 DM |
| ≧1585 and <1620 | ≧200 | 20 DM |
| ≧1585 and <1620 | <200 | 50 DM |
| ≧1620 and <1655 | ≧300 | 20 DM |
| ≧1620 and <1655 | <300 | 50 DM |
| ≧1655 and <1690 | ≧150 | 50 DM |
| ≧1655 and <1690 | <150 | 100 DM |
| ≧1690 and <1725 | ≧300 | 50 DM |
| ≧1690 and <1725 | <300 | 100 DM |
| ≧1725 | Not applicable | 100 DM |

Figure 55:
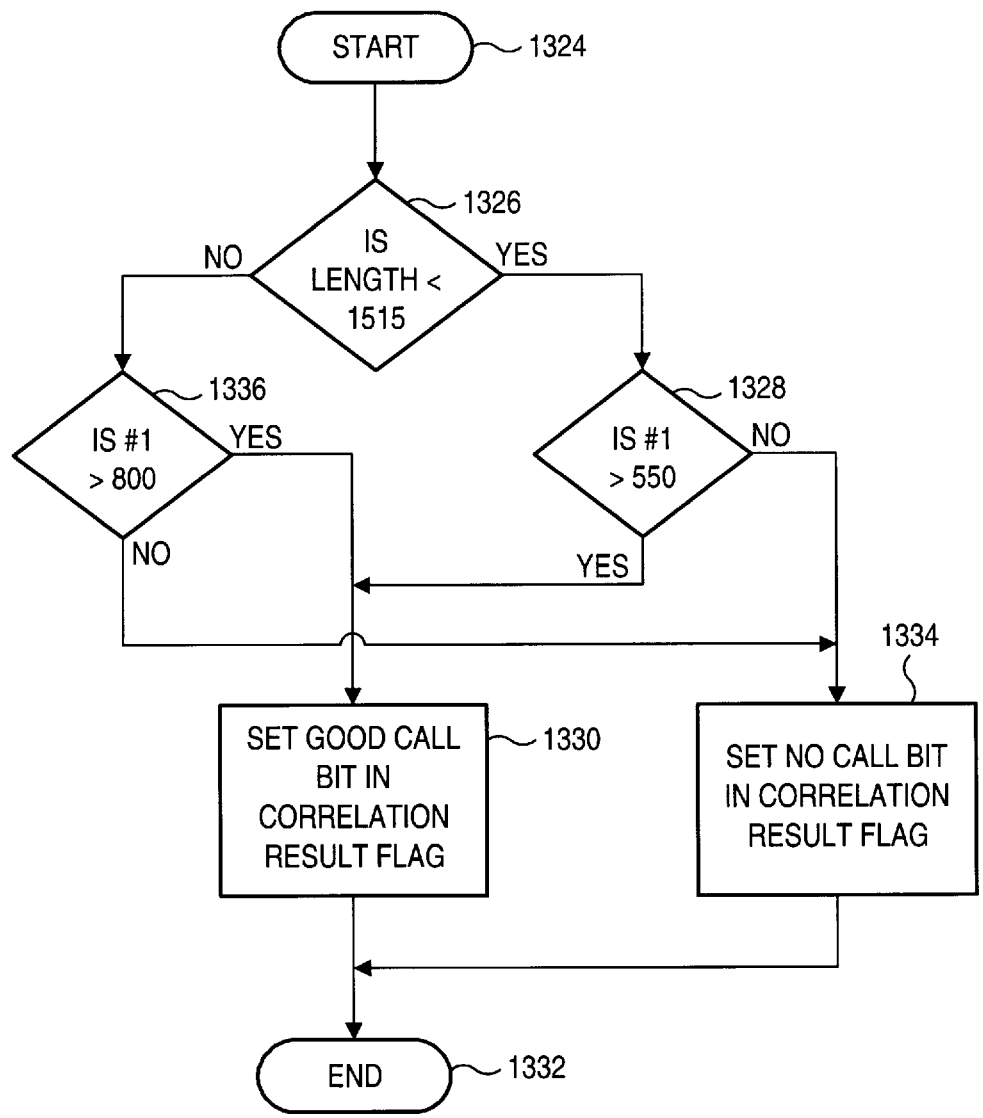
FIG. 55 is a flowchart of the threshold tests utilized in calling the denomination of a German bill according to a preferred embodiment of the present invention.

FIG. 55 is a flowchart of the threshold test utilized in calling the denomination of a German bill. It should be understood that this threshold test compares the scanned bill pattern only to the set of master patterns selected in accordance with Table 3. Therefore, the selection made in accordance with Table 3 provides a preliminary indication as to the denomination of the scanned bill. The threshold test in FIG. 55, in effect, serves to confirm or overturn the preliminary indication given by Table 3.

The threshold test of FIG. 55 begins at step 1324. Step 1326 checks the narrow dimension length of the scanned bill in terms of encoder pulses. If the narrow dimension length is less than 1515 at step 1326, the preliminary indication is that the denomination of the scanned bill is a 10 DM bill. In order to confirm this preliminary indication, the #1 correlation is compared to 550 at step 1328. If the #1 correlation is greater than 550, the correlation number is sufficiently high to identify the denomination of the bill as a 10 DM bill. Accordingly, a "good call" bit is set in a correlation result flag at step 1330, and the system returns to the main program at step 1332. If, however, the #1 correlation is less than or equal to 550 at step 1328, the preliminary indication that the scanned bill is a 10 DM bill is effectively overturned. The system advances to step 1334 which sets a "no call" bit in the correlation result flag.

If step 1326 determines that the narrow dimension length is greater than or equal to 1515, a correlation threshold of 800 is required to confirm the preliminary denominational indication provided by Table 3. Therefore, if the #1 correlation is greater than 800 at step 1336, the preliminary indication provided by Table 3 is confirmed. To confirm the preliminary indication, the "good call" bit is set in the correlation result flag. If, however, the #1 correlation is less than or equal to 800 at step 1336, the preliminary indication is rejected and the "no call" bit in the correlation result flag is set at step 1334. The system then returns to the main program at step 1332.

According to a preferred embodiment, the operator of the above described currency discriminating device designed to accommodate both Canadian and German currency bills pre-declares whether Canadian or German bills are to be discriminated. By depressing an appropriate key on the keypad 62 (FIG. 7), the display 63 will scroll through five different modes: a count mode, a Canadian stranger mode, a Canadian mixed mode, a German stranger mode, and a German mixed mode. In the count mode, the device acts like a simply bill counter (counting the number of bills in a stack but not discriminating them by denomination). Canadian stranger mode is similar to the stranger mode described above in connection with FIG. 7 but bills are scanned as described above in connection with FIG. 52 and scanned patterns are correlated against Canadian master patterns. Likewise, Canadian mixed mode is similar to the mixed mode described above in connection with FIG. 7 but bills are scanned as described above in connection with FIG. 52 and scanned patterns are correlated against Canadian master patterns. Likewise German stranger and German mixed mode are similar to the stranger and mixed modes described above in connection with FIG. 7 but bills are scanned as described above in connection with the scanning of German bills and scanned patterns are correlated against German master patterns.

We claim:

1. A currency evaluation device for identifying currency bills of different denominations of a plurality of currency systems comprising:

a discriminating unit for retrieving characteristic information from one or more bills;

a transport mechanism for transporting bills, one at a time, along a transport path past said discriminating unit to a single output receptacle;

a memory for storing master characteristic information associated with each genuine bill which the system is capable of identifying; said memory storing master characteristic information associated with at least one genuine bill from at least two currency systems; and a signal processing means for comparing said retrieved characteristic information with master characteristic information associated with at least one genuine bill; said signal processing means generating an indication of the identity of said bill based on said comparison when said retrieved characteristic information sufficiently matches said master characteristic information.

2. The currency evaluation device of claim 1 wherein said memory stores master characteristic information associated with genuine Canadian and German bills.

3. The currency evaluation device of claim 1 transport mechanism for transporting bills, one at a time, along a transport path past said wherein said discriminating unit comprises a scanhead positioned near the center of said transport path; and wherein said memory stores master characteristic information associated with laterally displaced scans of genuine bills.

4. The currency evaluation device of claim 1 wherein said discriminating unit scans said bill; wherein said retrieved characteristic information comprises a scanned pattern; and wherein said memory stores at least one master pattern associated with at least one genuine bill from at least two currency systems.

5. The currency evaluation device of claim 4 wherein said discriminating unit comprises a scanhead positioned near the center of the transport path; and wherein said memory stores, for a specific denomination of bill, a plurality of master patterns associated with laterally displaced scans.

6. The currency evaluation device of claim 5 further comprising means for determining the size of said bill and wherein said signal processing means compares said scanned pattern only to certain ones of said master patterns; said certain master patterns being selected based on the size of said bill.

7. The currency evaluation device of claim 4 wherein said discriminating unit initiates scanning a segment of said bill at a predetermined distance inboard of the leading edge of said bill; said scanned pattern being associated with the scanning of said segment; and wherein said memory stores a first master pattern associated with the scanning of a segment of a genuine bill having a given denomination beginning at said predetermined distance inboard of the leading edge of the given denomination genuine bill and a second master pattern associated with the scanning of a segment of a genuine bill having the given denomination beginning before said predetermined distance inboard of the leading edge of the given denomination genuine bill.

8. The currency evaluation device of claim 7 wherein said signal processing means compares said scanned pattern to the first and second master patterns associated with scans beginning at and before said predetermined distance inboard.

9. The currency evaluation device of claim 4 wherein said discriminating unit initiates scanning a segment of said bill at a predetermined distance inboard of the leading edge of said bill; said scanned pattern being associated with the scanning of said segment; and wherein said memory stores a first master pattern associated with the scanning of a segment of a genuine bill having a given denomination beginning at said predetermined distance inboard of the leading edge of the given denomination genuine bill and a second master pattern associated with the scanning of a segment of a genuine bill having the given denomination beginning after said predetermined distance inboard of the leading edge of the given denomination genuine bill.

10. The currency evaluation device of claim 9 wherein said signal processing means compares said scanned pattern to the first and second master patterns associated with scans beginning at and after said predetermined distance inboard.

11. The currency evaluation device of claim 1 further comprising a transport mechanism for transporting bills, one at a time, along a transport path at a rate in excess of about 1000 bills per minute past said discriminating unit.

12. The currency evaluation device of claim 1 wherein said discriminating unit comprises three laterally displaced scanheads.

13. The currency evaluation device of claim 1 wherein said discriminating unit comprises at three laterally displaced scanheads and wherein said memory stores master characteristic information associated with genuine bills of a plurality of denominations and said memory stores master characteristic information associated with laterally displaced scans for at least one of said denominations.

14. The currency evaluation device of claim 13 further comprising a transport mechanism for transporting bills, one at a time, along a transport path at a rate in excess of about 1000 bills per minute past said discriminating unit.

15. The currency evaluation device of claim 13 wherein said at least three scanheads are arranged so that a center scanhead is positioned downstream relative to other of said scanheads.

16. The currency evaluation device of claim 1 wherein:
said transport path is at least as wide as the widest type of bill that the system is designed to discriminate;
said discriminating unit retrieving characteristic information from a bill using a scanhead located near the center of said transport path;
said memory storing master characteristic information associated with laterally displaced scans for at least one genuine bill, said master characteristic information associated with laterally displaced scans assisting in compensating for lateral displacement of said bill relative to the center of said transport path.

17. The currency evaluation device of claim 16 wherein said transport mechanism transports said bills at a rate in excess of about 1000 bills per minute.

18. The currency evaluation device of claim 16 further comprising means for determining the size of said bill and wherein said signal processing means compares said retrieved characteristic information only to certain master characteristic information; said certain master characteristic information being selected based on the size of said bill.

19. The currency evaluation device of claim 16 wherein said retrieved characteristic information comprises a scanned pattern; and wherein said memory stores at least one master pattern for each of a plurality of denominations.

20. The currency evaluation device of claim 19 wherein said discriminating unit initiates scanning a segment of said bill at a predetermined distance inboard of the leading edge of said bill; said scanned pattern being associated with the scanning of said segment; and
wherein said memory stores a first master pattern associated with the scanning of a segment of a genuine bill having a given denomination beginning at said predetermined distance inboard of the leading edge of the given denomination genuine bill and a second master pattern associated with the scanning of a segment of a genuine bill having the given denomination beginning before said predetermined distance inboard of the leading edge of the given denomination genuine bill.

21. The currency evaluation device of claim 20 wherein said signal processing means compares said scanned pattern to the first and second master patterns associated with scans beginning at and before said predetermined distance inboard.

22. The currency evaluation device of claim 19 wherein said discriminating unit initiates scanning a segment of said bill at a predetermined distance inboard of the leading edge of said bill; said scanned pattern being associated with the scanning of said segment; and wherein said memory stores a first master pattern associated with the scanning of a segment of a genuine bill having a given denomination beginning at said predetermined distance inboard of the leading edge of the given denomination genuine bill and a second master pattern associated with the scanning of a segment of a genuine bill having the given denomination beginning after said predetermined distance inboard of the leading edge of the given denomination genuine bill.

23. The currency evaluation device of claim 22 wherein said signal processing means compares said scanned pattern to the first and second master patterns associated with scans beginning at and after said predetermined distance inboard.

24. The currency evaluation device of claim 1 further comprising a currency system selection device for designating one or more of said at least two currency systems whereby said signal processing means compares said retrieved characteristic information only with master characteristic information associated with genuine bills from said designated one or more currency systems;
wherein said currency system selection device comprises a manual selection device, said manual selection device permitting the operator of the system to designate said one or more of said at least two currency systems.

25. The currency evaluation device of claim 24 wherein said manual selection device comprises a key.

26. The currency evaluation device of claim 24 wherein said manual selection device comprises a switch.

27. The currency evaluation device of claim 24 wherein said manual selection device comprises a dial.

28. The currency evaluation device of claim 24 wherein said manual selection device comprises a displayed menu of currency system choices which may be scrolled through in designating a currency system.

29. The currency evaluation device of claim 1 further comprising a currency system selection device for designating one or more of said at least two currency systems whereby said signal processing means compares said retrieved characteristic information only with master characteristic information associated with genuine bills from said designated one or more currency systems;
wherein said currency system selection device comprises a semi-automatic selection device identifying the currency system associated with a first bill processed by said evaluation device, wherein said semi-automatic device designates said currency system associated with said first bill whereby said signal processing means then compares retrieved characteristic information from subsequent bills only with master characteristic information associated with genuine bills from said designated currency system.

30. The currency evaluation device of claim 1 wherein said signal processing means compares retrieved characteristic information from a first bill with master characteristic information from a plurality of currency systems, said signal processing means identifying which one of said plurality of currency systems said first bill is associated with and designating said identified one of said plurality of currency systems whereby said processing means thereafter compares retrieved characteristic information from subsequent bills only with master characteristic information associated with genuine bills from said designated one of said plurality of currency systems.

31. A currency identification system for identifying currency bills of different denominations comprising:
a discriminating unit for retrieving a given type of characteristic information from a bill, said discriminating unit comprising at least three laterally displaced scanheads retrieving said type of characteristic information by scanning said bill along laterally displaced segments and generating laterally displaced scanned patterns for the laterally displaced segments;
a memory for storing master characteristic information of said given type associated with each genuine bill which the system is capable of identifying; said memory storing master characteristic patterns associated with genuine bills of a plurality of denominations, said memory storing laterally displaced master patterns associated with laterally displaced scans for at least one of said denominations; and a signal processing means for comparing laterally displaced scanned patterns with laterally displaced master patterns associated with corresponding laterally displaced scans of at least one genuine bill; said signal processing means generating an indication of the identity of said bill based on said comparison when said scanned patterns sufficiently match said master patterns.

32. The currency identification system of claim 31 further comprising a transport mechanism for transporting bills, one at a time, along a transport path at a rate in excess of about 1000 bills per minute past said discriminating unit.

33. The currency identification system of claim 32 wherein said at least three scanheads are arranged so that a center scanhead is positioned downstream relative to other of said scanheads.

34. The currency identification system of claim 31 wherein said memory stores master characteristic information associated with genuine bills from at least two currency systems.

35. The currency identification system of claim 34 further comprising a currency system selection device for designating one or more of said at least two currency systems whereby said signal processing means compares said retrieved characteristic information only with master characteristic information associated with genuine bills from said designated one or more currency systems.

36. The currency identification system of claim 31 wherein at least one of said scanheads retrieves characteristic information by employing a rectangular sample region having one dimension measuring about ½ inch to sample said bill.

37. The currency identification system of claim 31 wherein at least one of said scanheads retrieves characteristic information by employing a rectangular sample region having one dimension measuring about 0.050 inch to sample said bill.

38. The currency identification system of claim 31 wherein at least one of said scanheads retrieves characteristic information by employing a rectangular sample region having dimensions measuring about ½ inch by 0.050" inch to sample said bill.

39. The currency identification system of claim 31 wherein scanned and master patterns approximate analog variations of said characteristic information, said scanned and master patterns comprising a plurality of sample values, each sample value being proportional to retrieved characteristic information.

40. A currency evaluation device for identifying currency bills of a plurality of denominations and a plurality of sizes comprising:
a transport mechanism for transporting bills, one at a time, along a transport path past a discriminating unit, said transport path being at least as wide as the widest type of bill that the system is designed to discriminate;
said discriminating unit retrieving characteristic information from a bill using a scanhead located near the center of said transport path and generating a scanned pattern;
a memory for storing at least one master characteristic pattern associated with each genuine bill which the system is designed to discriminate; said memory storing master characteristic patterns associated with genuine bills of a plurality of denominations, said memory storing a first master characteristic pattern generated by scanning a genuine bill having a first denomination along a first segment and a second master characteristic pattern generated by scanning a genuine bill having the first denomination along a second segment that is laterally displaced from the first segment, said master characteristic patterns associated with laterally displaced scans assisting in compensating for lateral displacement of said bill relative to the center of said transport path; and
a signal processing means for comparing the scanned pattern generated from using said scanhead with the first and second master characteristic patterns associated with laterally displaced scans; said signal processing means generating an indication of the identity of said bill based on said comparison when said scanned pattern sufficiently matches a master pattern.

41. The currency evaluation device of claim 40 wherein said transport mechanism transports said bills at a rate in excess of about 1000 bills per minute.

42. The currency evaluation device of claim 40 further comprising means for determining the size of said bill and wherein said signal processing means compares said scanned pattern to only certain master patterns; said certain master patterns being selected based on the size of said bill.

43. The currency evaluation device of claim 40 wherein said discriminating unit initiates scanning a segment of said bill at a predetermined distance inboard of the leading edge of said bill; said scanned pattern being associated with the scanning of said segment; and
wherein said memory stores a third master pattern associated with the scanning of a segment of a genuine bill having a given denomination beginning at said predetermined distance inboard of the leading edge of the given denomination genuine bill and a fourth master pattern associated with the scanning of a segment of a genuine bill having the given denomination beginning before said predetermined distance inboard of the leading edge of the given denomination genuine bill.

44. The currency evaluation device of claim 43 wherein said signal processing means compares said scanned pattern to the third and fourth master patterns associated with scans beginning at and before said predetermined distance inboard.

45. The currency evaluation device of claim 44 wherein said given denomination is said first denomination.

46. The currency evaluation device of claim 40 wherein scanned and master patterns approximate analog variations of said characteristic information, said scanned and master patterns comprising a plurality of sample values, each sample value being proportional to retrieved characteristic information.

47. The currency evaluation device of claim 40 wherein said discriminating unit initiates scanning a segment of said bill at a predetermined distance inboard of the leading edge of said bill; said scanned pattern being associated with the scanning of said segment; and wherein said memory stores a third master pattern associated with the scanning of a segment of a genuine bill having a given denomination beginning at said predetermined distance inboard of the leading edge of the given denomination genuine bill and a fourth master pattern associated with the scanning of a segment of a genuine bill having the given denomination beginning after said predetermined distance inboard of the leading edge of the given denomination genuine bill.

48. The currency evaluation device of claim 47 wherein said signal processing means compares said scanned pattern to the third and fourth master patterns associated with scans beginning at and after said predetermined distance inboard.

49. The currency evaluation device of claim 48 wherein said given denomination is said first denomination.

50. A currency evaluation device for receiving a stack of currency bills of different denominations and rapidly evaluating all the bills in the stack, said device comprising:

an input receptacle for receiving a stack of bills to be evaluated;

a transport mechanism for transporting said bills, one at a time, along a transport path past a discriminating unit to a single output receptacle, said discriminating unit retrieving characteristic information from said bills;

a memory for storing master characteristic information associated with each genuine bill which the system is capable of identifying; said memory storing master characteristic information associated with at least one genuine bill from at least two currency systems;

a currency system selection device for designating one or more of said at least two currency systems;

a signal processor comparing said retrieved characteristic information with master characteristic information associated with said designated one or more of said at least two currency systems; said signal processor generating an indication of the identity of said bill based on said comparison when said retrieved characteristic information sufficiently matches said master characteristic information associated with said designated one or more of said at least two currency systems.

51. The currency evaluation device of claim 50 wherein said currency system selection device comprises a manual selection device, said manual selection device permitting the operator of the system to designate said one or more of said at least two currency systems.

52. The currency evaluation device of claim 50 wherein said currency system selection device comprises a semi-automatic selection device identifying the currency system associated with a first bill processed by said evaluation system, wherein said semi-automatic device designates said currency system associated with said first bill whereby said signal processor then compares retrieved characteristic information from subsequent bills with master characteristic information associated with genuine bills only from said designated currency system.

53. A method for rapidly evaluating a stack of currency bills of different denominations using a currency evaluation device, said method comprising the steps of:

receiving a stack of bills to be evaluated in an input receptacle of said currency evaluation device;

transporting said bills under control of said device, one at a time, along a transport path;

evaluating a first bill by retrieving characteristic information therefrom;

comparing said retrieved characteristic information with master characteristic information associated with at least two currency systems;

identifying with which one of said at least two currency systems said first bill is associated;

evaluating subsequent bills by retrieving characteristic information therefrom;

comparing characteristic information retrieved from subsequent bills only with master characteristic information associated with said one of said at least two currency systems said first bill is associated.

54. The method of claim 53 wherein the step of transporting comprises transporting the bills from the input receptacle to a single output receptacle.

55. A currency identification system for identifying currency bills of a plurality of denominations and a plurality of sizes comprising:

a transport mechanism for transporting bills, one at a time, along a transport path past a discriminating unit, said transport path being at least as wide as the widest type of bill that the system is designed to discriminate;

said discriminating unit retrieving characteristic information from a bill using a scanhead positioned along said transport path and generating a scanned pattern;

a memory for storing at least one masters characteristic pattern associated with each genuine bill which the system is designed to discriminate; said memory storing master characteristic patterns associated with genuine bills of a plurality of denominations, said memory storing a first master characteristic pattern generated by scanning a genuine bill having a first denomination along a first segment and a second master characteristic pattern generated by scanning a genuine bill having the first denomination along a second segment that is laterally displaced from the first segment, said master characteristic patterns associated with laterally displaced scans assisting in compensating for lateral displacement of said bill relative to said transport path; and a signal processor for comparing the scanned pattern generated from using said scanhead with the first and second master characteristic patterns associated with laterally displaced scans; said signal processing means generating an indication of the identity of said bill based on said comparison when said scanned pattern sufficiently matches a master pattern.

56. The currency identification system of claim 55 wherein scanned and master patterns approximate analog variations of said characteristic information, said scanned and master patterns comprising a plurality of sample values, each sample value being proportional to detected characteristic information.

57. A currency evaluation device for identifying currency bills of different denominations of a plurality of currency systems, said device comprising:

an input receptacle for receiving a stack of bills to be evaluated;

a transport mechanism for transporting said bills, one at a time, along a transport path past a discriminating unit, said discriminating unit retrieving rectangularly shaped samples of characteristic information from said bills by employing a scanhead; said samples having one dimension measuring about ½ inch;

a memory for storing master characteristic information associated with each genuine bill which the system is capable of identifying; said memory storing master characteristic information associated with at least one genuine bill from at least two currency systems; and a signal processing means for comparing said retrieved characteristic information with master characteristic information associated with at least one genuine bill; said signal processing means generating an indication of the identity of said bill based on said comparison when said retrieved characteristic information sufficiently matches said master characteristic information.

58. The currency evaluation device of claim 57 wherein said samples have a second dimension measuring about 0.050 inch.

59. A multiple currency system currency evaluation device for identifying currency bills of different denominations of a plurality of currency systems comprising:

a discriminating unit for retrieving characteristic information from one or more bills, the discriminating unit comprising one or more scanheads for scanning one or more segments along bills, wherein the discriminating unit scans substantially less than the entire bill;

a memory for storing master characteristic information associated with each genuine bill which the system is capable of identifying; the memory storing master characteristic information associated with at least one genuine bill from at least two currency systems;

a signal processing means for comparing the retrieved characteristic information with master characteristic information associated with at least one genuine bill; the signal processing means generating an indication of the identity of the bill based on the comparison when the retrieved characteristic information sufficiently matches the master characteristic information.

60. The multiple currency system currency evaluation device of claim 59 wherein the discriminating unit scans less than a third of the entire bill.

61. The multiple currency system currency evaluation device of claim 59 wherein the discriminating unit scans less than or equal to about a fourth of the entire bill.

62. A method for identifying currency bills of different denominations of a plurality of currency systems using a currency evaluation device, the method comprising the steps of the device:

retrieving characteristic information from a bill including scanning one or more segments along the bill, wherein the scanning is of substantially less than the entire bill;

comparing the retrieved characteristic information with master characteristic information associated with at least one genuine bill, the master characteristic information being stored in a memory of the device, the memory having stored therein master characteristic information associated with each genuine bill which the device is capable of identifying, including master characteristic information associated with at least one genuine bill from each of at least two currency systems; and generating an indication of the identity of the bill based on said comparing when the retrieved characteristic information sufficiently matches the master characteristic information.

63. The method of claim 62 wherein less than a third of the entire bill is scanned during the scanning step.

64. The method of claim 62 wherein less than a fourth of the entire bill is scanned during the scanning step.

65. A multiple currency system currency evaluation device for identifying currency bills of different denominations of a plurality of currency systems comprising:

a discriminating unit for retrieving characteristic information from one or more bills, the discriminating unit comprising one or more scanheads for scanning one or more segments along bills, wherein the discriminating unit scans substantially less than the entire bill and wherein the one or more scanheads are positioned so that the characteristic information retrieved by scanning along the one or more segments is sufficient to discriminate the denominations of bills of a plurality of currency systems;

a memory for storing master characteristic information associated with each genuine bill which the system is capable of identifying; the memory storing master characteristic information associated with at least one genuine bill from at least two currency systems; and a signal processing means for comparing the retrieved characteristic information with master characteristic information associated with at least one genuine bill; the signal processing means generating an indication of the identity of the bill based on the comparison when the retrieved characteristic information sufficiently matches the master characteristic information.

66. A method for identifying currency bills of different denominations of a plurality of currency systems using a currency evaluation device, the method comprising the steps of the device:

retrieving characteristic information from a bill, including scanning one or more selected segments along the bill, wherein the scanning is of substantially less than the entire bill and wherein the selected segments for scanning are selected so that the characteristic information retrieved by scanning along the one or more selected segments is sufficient to discriminate among the denominations of bills of a plurality of currency systems;

comparing the retrieved characteristic information with master characteristic information associated with at least one genuine bill, the master characteristic information being stored in a memory of the device, the memory having stored therein master characteristic information associated with each genuine bill which the device is capable of identifying, including master characteristic information associated with at least one genuine bill from each of at least two currency systems; and generating an indication of the identity of the bill based on the comparing when the retrieved characteristic information sufficiently matches the master characteristic information.

67. The method of claim 66 wherein less than a fourth of the entire bill is scanned during the scanning step.

68. A multiple currency system currency evaluation device for identifying currency bills of different denominations of a plurality of currency systems comprising:

a discriminating unit for retrieving characteristic information from one or more bills, the discriminating unit comprising at least one scanhead for scanning at least one segment along bills, wherein the discriminating unit utilizes characteristic information derived from only selected areas of the bill containing sufficient information to identify the scanned bill and to discriminate the scanned bill from other bills in said plurality of currency systems, the selected areas totaling substantially less than the entire bill;

a memory for storing master characteristic information associated with each genuine bill which the system is capable of identifying; the memory storing master characteristic information associated with at least one genuine bill from each of at least two currency systems; and a signal processing means for comparing the retrieved characteristic information with master characteristic information associated with at least one genuine bill; the signal processing means generating an indication of the identity of the bill based on the comparison when the retrieved characteristic information sufficiently matches the master characteristic information.

69. The multiple currency system currency evaluation device of claim 68 wherein the total of the selected areas do not exceed about a fourth of the entire bill.

70. A method for identifying currency bills of different denominations of a plurality of currency systems using a currency evaluation device, the method comprising the steps of the device:

retrieving characteristic information from a bill, including scanning at least one segment along the bill;

comparing the retrieved characteristic information with master characteristic information associated with at least one genuine bill, the master characteristic information being stored in a memory of the device, the memory having stored therein master characteristic information associated with each genuine bill which the device is capable of identifying, including master characteristic information associated with at least one genuine bill from each of at least two currency systems; and generating an indication of the identity of the bill based on the comparing when the retrieved characteristic information sufficiently matches the master characteristic information, wherein the device utilizes characteristic information derived from only selected areas of the bill containing sufficient information to identify the scanned bill and to discriminate the scanned bill from other bills in said plurality of currency systems, the selected areas totaling substantially less than the entire bill.

71. The method of claim 70 wherein the selected areas total less than a fourth of the entire bill.

72. A multiple currency system currency evaluation device for identifying currency bills of different denominations of a plurality of currency systems comprising:

a discriminating unit for retrieving characteristic information from one or more bills, the discriminating unit comprising at least one scanhead for scanning at least one segment along bills;

a memory for storing master characteristic information associated with each genuine bill which the system is capable of identifying; said master characteristic information corresponding to only selected areas of a bill containing sufficient information to identify the bill and to discriminate the bill from other bills in said at least two currency systems, the selected areas totaling substantially less than the entire bill; the memory storing master characteristic information associated with at least one genuine bill from each of at least two currency systems; and a signal processing means for comparing the retrieved characteristic information with master characteristic information associated with at least one genuine bill; the signal processing means generating an indication of the identity of the bill based on the comparison when the retrieved characteristic information sufficiently matches the master characteristic information.

73. The multiple currency system currency evaluation device of claim 72 wherein the total of the selected areas do not exceed about a fourth of the entire bill.

74. A method for identifying currency bills of different denominations of a plurality of currency systems using a currency evaluation device, the method comprising the steps of the device:

retrieving characteristic information from a bill, including scanning at least one segment along the bill;

comparing the retrieved characteristic information with master characteristic information associated with at least one genuine bill, the master characteristic information being stored in a memory of the device, the memory having stored therein master characteristic information associated with each genuine bill which the device is capable of identifying, including master characteristic information associated with at least one genuine bill from each of at least two currency systems, the master characteristic information corresponding to only selected areas of a bill containing sufficient information to identify the bill and to discriminate the bill from other bills in said at least two currency systems, the selected areas totaling substantially less than the entire bill; and generating an indication of the identity of the bill based on the comparing when the retrieved characteristic information sufficiently matches the master characteristic information.

75. A compact currency evaluation device for identifying currency bills of different denominations of a plurality of currency systems comprising:

an input receptacle for receiving a stack of bills to be evaluated;

a transport mechanism for transporting the bills, one at a time, along a transport path past a discriminating unit to a single output receptacle, the discriminating unit retrieving characteristic information from the bills;

a memory for storing master characteristic information associated with each genuine bill which the system is capable of identifying; the memory storing master characteristic information associated with at least one genuine bill from at least two currency systems;

a signal processor for comparing the retrieved characteristic information with master characteristic information associated with at least one genuine bill; the signal processor generating an indication of the identity of the bill based on the comparison when the retrieved characteristic information sufficiently matches the master characteristic information; and further comprising a currency system selection device for designating one or more of the at least two currency systems whereby the signal processor only compares the retrieved characteristic information with master characteristic information associated with genuine bills from the designated one or more currency systems.

76. A currency evaluation device for receiving a stack of currency bills and rapidly evaluating all the bills in the stack, the device comprising:

an input receptacle for receiving a stack of bills to be evaluated;

a transport mechanism for transporting the bills from the input receptacle, one at a time, along a transport path past a discriminating unit to a single output receptacle, the discriminating unit retrieving characteristic information from the bills;

a memory for storing master characteristic information associated with each genuine bill which the system is capable of identifying; the memory storing master characteristic information associated with at least one genuine bill from at least two currency systems;

a currency system selection device for designating one or more of the at least two currency systems;

a signal processor comparing the retrieved characteristic information with master characteristic information associated with the designated one or more of the at least two currency systems; the signal processor generating an indication of the identity of the bill based on the comparison when the retrieved characteristic information sufficiently matches the master characteristic information associated with the designated one or more of the at least two currency systems.

77. A multiple currency system currency evaluation device for identifying currency bills of different denominations of a plurality of currency systems comprising:
a transport mechanism for transporting a bill along a transport path past a discriminating unit to a single output receptacle, the discriminating unit retrieving bill-type characteristic information from the bill;
a memory for storing master bill-type characteristic information associated with each genuine bill which the system is capable of identifying; the memory storing master bill-type characteristic information associated with at least one genuine bill from at least two currency systems; the memory also storing master authenticating information associated with each of the at least two currency systems;
a signal processor for comparing said retrieved bill-type characteristic information with master bill-type characteristic information associated with at least one genuine bill; the signal processor generating an indication of the identity of the bill based on the comparison when the retrieved bill-type characteristic information sufficiently matches the master bill-type characteristic information, the signal processor thus determining with which one of the at least two currency systems that the bill is associated; and
an authenticating unit for authenticating the bill identified by the signal processor by retrieving authenticating information from the bill and comparing the retrieved authenticating information to master authenticating information associated with the one of the at least two currency systems that the bill is associated.

78. A method for identifying currency bills of different denominations of a plurality of currency systems using a currency evaluation device, the method comprising the steps of the device:
transporting bills, one at a time, past a discriminating unit to a single output receptacle,
the discriminating unit retrieving bill-type characteristic information from a bill;
comparing the retrieved bill-type characteristic information with master bill-type characteristic information associated with at least one genuine bill, the master bill-type
characteristic information being stored in a memory of the device, the memory having stored therein master bill-type characteristic information associated with each genuine bill which the device is capable of identifying, including master bill-type characteristic information associated with at least one genuine bill from each of at least two currency systems, the memory also having stored therein master authenticating information associated with each of the at least two currency systems;
generating an indication of the identity of said bill including the currency system with which the bill is associated based on said comparing when said retrieved characteristic information sufficiently matches said master characteristic information;
retrieving authenticating information from the bill; and
authenticating the bill by comparing the retrieved authenticating information to master authenticating information associated with the currency system with which the bill is associated.

79. A currency evaluation method for identifying currency bills different denominations of a plurality of currency systems using a currency evaluation device, the method comprising the steps of:
the device:
transporting bills, one at a time, along a transport path past a discriminating region to a single output receptacle,
retrieving characteristic information from a bill passing the discriminating region;
comparing the retrieved characteristic information with master characteristic information associated with at least one genuine bill, the master characteristic information being stored in a memory of the device, the memory having stored therein master characteristic information associated with each genuine bill which the device is capable of identifying, including master characteristic information associated with at least one genuine bill from each of at least two currency systems; and
generating an indication of the identity of said bill based on said comparison when said retrieved characteristic information sufficiently matches said master characteristic information;
the method further comprising the step of designating one or more of said at least two currency systems whereby said comparing step compares said retrieved characteristic information only with master characteristic information associated with genuine bills from said designated one or more currency systems.

80. The currency evaluation method of claim 79 further comprising the step of transporting bills, one at a time, along a transport path past a scanhead positioned near a center of the transport path; and wherein memory has stored therein master characteristic information associated with laterally displaced scans of genuine bills.

81. The currency evaluation method of claim 79 wherein the step of retrieving characteristic information comprises producing a scanned pattern; and wherein the memory has stored therein at least one master pattern associated with at least one genuine bill from each of at least two currency systems.

82. The currency evaluation method of claim 81 wherein the step of retrieving includes beginning scanning a segment of the bill at a predetermined distance inboard of a leading edge of the bill; said scanned pattern being associated with the scanning of said segment; and wherein the memory has stored therein a first master pattern associated with scanning of a segment of a genuine bill having a given denomination beginning at said predetermined distance inboard of the leading edge of the given denomination genuine bill and a second master pattern associated with scanning of a segment of a genuine bill having the given denomination beginning after said predetermined distance inboard of the leading edge of the given denomination genuine bill.

83. The currency evaluation method of claim 82 wherein the step of comparing includes comparing said scanned pattern to the first and second master patterns associated with scans beginning at and after said predetermined distance inboard.

84. The currency evaluation method of claim 81 further comprising the step of transporting bills, one at a time, along a transport path past a scanhead positioned near a center of the transport path; and wherein memory has stored therein, for a specific denomination of bill, a plurality of master patterns associated with laterally displaced scans of genuine bills.

85. The currency evaluation method of claim 84 further comprising the step of determining the size of said bill and wherein the step of comparing includes selecting certain master patterns based on the size of said bill and comparing said scanned pattern only to the selected ones of said master patterns.

86. The currency evaluation method of claim 81 wherein the step of retrieving includes beginning scanning a segment of the bill at a predetermined distance inboard of a leading edge of the bill; said scanned pattern being associated with the scanning of said segment; and wherein the memory has stored therein a first master pattern associated with scanning of a segment of a genuine bill having a given denomination beginning at said predetermined distance inboard of the leading edge of the given denomination genuine bill and a second master pattern associated with scanning of a segment of a genuine bill having the given denomination beginning before said predetermined distance inboard of the leading edge of the given denomination genuine bill.

87. The currency evaluation method of claim 86 wherein the step of comparing includes comparing said scanned pattern to the first and second master patterns associated with scanning beginning at and before said predetermined distance inboard.

88. The currency evaluation method of claim 79 further comprising the step of transporting bills, one at a time, along a transport path at a rate in excess of about 1000 bills per minute, said step of retrieving taking place during said transporting of bills along said transport path.

89. The currency evaluation method of claim 79 wherein the step of retrieving comprises scanning said bill along at three laterally displaced segments and wherein the memory has stored therein master characteristic information associated with genuine bills of a plurality of denominations including master characteristic information associated with laterally displaced scans for at least one of said denominations.

90. The currency evaluation method of claim 89 further comprising the step of transporting bills, one at a time, along a transport path at a rate in excess of about 1000 bills per minute, said step of retrieving taking place during said transporting of bills along said transport path.

91. The currency evaluation method of claim 79 further comprising the steps of:
transporting bills, one at a time, along a transport path at least as wide as the widest type of bill that the method is intended to evaluate, said step of retrieving taking place during said transporting of bills along said transport path;
wherein the step of retrieving comprises retrieving characteristic information from a bill using a scanhead located near the center of said transport path; and
wherein the memory has stored therein master characteristic information associated with laterally displaced scans for at least one genuine bill, said master characteristic information associated with laterally displaced scans assisting in compensating for lateral displacement of said bill relative to the center of said transport path.

92. The currency evaluation method of claim 79 wherein the step of designating includes the step of the operator of the device manually designating said one or more of said at least two currency systems.

93. The currency evaluation method of claim 79 further comprising the step of transporting a stack of bills, one at a time, along a transport path; wherein the step of designating comprises the further steps of the device identifying a currency system associated with a first bill processed by the device and designating the currency system associated with said first bill, and wherein the step of comparing comprises comparing retrieved characteristic information from bills subsequent to said first bill only with master characteristic information associated with genuine bills from said designated currency system associated with said first bill.

94. The currency evaluation method of claim 79 further comprising the step of transporting a stack of bills, one at a time, along a transport path; wherein the step of comparing includes comparing retrieved characteristic information from a first bill with master characteristic information from a plurality of currency systems, identifying one of said plurality of currency systems with which said first bill is associated and designating said one of said plurality of currency systems with which said first bill is associated, and thereafter comparing retrieved characteristic information from bills subsequent to said first bill only with master characteristic information associated with genuine bills from said designated one of said plurality of currency systems.

95. A currency identification method for identifying currency bills of different denominations using a currency evaluation device, the device performing the method comprising the steps of:
retrieving a given type of characteristic information from a bill by scanning said bill along at least three laterally displaced segments, and generating laterally displaced scanned patterns for the laterally displaced segments;
comparing laterally displaced scanned patterns with laterally displaced master patterns associated with corresponding laterally displaced scans of at least one genuine bill, the master patterns being stored in a memory of the device, the memory having stored therein master characteristic information of said given type associated with each genuine bill which the method is capable of identifying; said master characteristic information including master patterns associated with genuine bills of a plurality of denominations, and laterally displaced master patterns associated with laterally displaced scans of at least one genuine bill of at least one of said denominations; and
generating an indication of the identity of said bill based on said comparison when said scanned patterns sufficiently match said master patterns.

96. The currency identification method of claim 95 further comprising the step of transporting a stack of bills, one at a time, along a transport path at a rate in excess of about 1000 bills per minute past a discriminating unit.

97. The currency identification method of claim 95 wherein the memory has stored therein master characteristic information associated with genuine bills from at least two currency systems.

98. The currency identification method of claim 97 further comprising the step of designating one or more of said at least two currency systems and wherein the step of comparing comprises comparing said retrieved characteristic information only with master characteristic information associated with genuine bills from said designated one or more currency systems.

99. The currency identification method of claim 95 wherein the step of retrieving comprises employing a rectangular sample region to sample said bill along at least one of said laterally displaced segments.

100. The currency identification method of claim 99 wherein said rectangular sample region has one dimension measuring about ½ inch.

101. The currency identification method of claim 99 wherein said rectangular sample region has dimensions measuring about ½ inch by 0.050 inch.

102. The currency identification method of claim 95 wherein the scanned patterns and the master patterns approximate analog variations of said characteristic information, said scanned and master patterns comprising a plurality of sample values, each sample value being proportional to retrieved characteristic information.

103. A currency evaluation method for identifying currency bills of a plurality of denominations and a plurality of widths using a currency evaluation device, said method comprising the steps of the device:

transporting bills having a plurality of widths, one at a time, along a transport path past a discriminating unit, said transport path being at least as wide as the widest type of bill that the method is designed to identify;

retrieving characteristic information from a bill to be identified by using a scanhead located near a center of said transport path;

generating a scanned pattern corresponding to said characteristic information from said retrieving step;

comparing the scanned pattern generated from using said scanhead with first and second master patterns associated with laterally displaced scans, the first and second master patterns being stored in a memory of the device, the memory having stored therein at least one master pattern associated with each genuine bill which the system is designed to discriminate including master patterns associated with genuine bills having a plurality of widths, wherein the first master pattern is generated by retrieving characteristic information from a genuine bill having a first denomination along a first segment of the genuine bill and the second master pattern is generated by retrieving characteristic information from a genuine bill having the first denomination along a second segment of the genuine bill that is laterally displaced from the first segment, a genuine bill having the first denomination having a width shorter than the widest type bill;

the master patterns associated with laterally displaced scans assisting in compensating for lateral displacement of a bill relative to the center of the transport path so that if a bill to be discriminated having the first denomination is transported past the discriminating unit in manner whereby a segment corresponding to the first segment is scanned then the resulting scanned pattern will sufficiently match the first master pattern and if a bill to be discriminated having the first denomination is transported past the discriminating unit in manner whereby a segment corresponding to the second segment is scanned then the resulting scanned pattern will sufficiently match the second master pattern; and generating an indication of the identity of said bill based on said comparing when said scanned pattern sufficiently matches a stored master pattern.

104. The currency evaluation method of claim 103 wherein the step of transporting includes transporting said bills at a rate in excess of about 1000 bills per minute.

105. The currency evaluation method of claim 103 further comprising the step of determining the size of said bill and wherein the step of comparing includes selecting certain master characteristic information based on the size of said bill, and comparing said retrieved characteristic information only to said certain master characteristic information.

106. The currency evaluation method of claim 103 wherein the memory has stored therein at least one master pattern for each of a plurality of denominations.

107. The currency evaluation method of claim 106 wherein the step of retrieving characteristic information comprises scanning a segment of said bill at a predetermined distance inboard of a leading edge of said bill and generating a scanned pattern corresponding to the scanning of said segment; and wherein the memory has stored therein a third master pattern associated with the scanning of a segment of a genuine bill having a given denomination beginning at said predetermined distance inboard of the leading edge of the given denomination genuine bill and a fourth master pattern associated with the scanning of a segment of a genuine bill having the given denomination beginning before said predetermined distance inboard of the leading edge of the given denomination genuine bill; and wherein the step of comparing includes comparing said scanned pattern to the third and fourth master patterns associated with scanning beginning at and before said predetermined distance inboard.

108. The currency evaluation method of claim 107 wherein said given denomination is said first denomination.

109. The currency evaluation method of claim 106 wherein the step of retrieving includes scanning a segment of said bill at a predetermined distance inboard of a leading edge of said bill; and generating a scanned pattern associated with the scanning of said segment; and wherein the memory has stored therein a third master pattern associated with the scanning of a segment of a genuine bill having a given denomination beginning at said predetermined distance inboard of the leading edge of the given denomination genuine bill and a fourth master pattern associated with the scanning of a segment of a genuine bill having the given denomination beginning after said predetermined distance inboard of the leading edge of the given denomination genuine bill, and wherein the step of comparing includes comparing said scanned pattern to the third and fourth master patterns associated with scanning beginning at and after said predetermined distance inboard.

110. The currency evaluation method of claim 109 wherein said given denomination is said first denomination.

111. A currency evaluation device for identifying currency bills of different denominations of a plurality of currency systems comprising:

a discriminating unit for retrieving characteristic information from bills;

a memory for storing master characteristic information associated with each genuine bill which the system is capable of identifying; said memory storing master characteristic information associated with at least one genuine bill from at least two currency systems; and a signal processor for comparing said retrieved characteristic information with master characteristic information associated with at least one genuine bill; said signal processor generating an indication of the identity of said bill based on said comparison when said retrieved characteristic information sufficiently matches said master characteristic information; wherein said signal processor compares retrieved characteristic information from a first bill with master characteristic information from a plurality of currency systems, said signal processor identifying which one of said plurality of currency systems said first bill is associated with and designating said identified one of said plurality of currency systems whereby said processor thereafter compares retrieved characteristic information from subsequent bills only with master characteristic information associated with genuine bills from said designated one of said plurality of currency systems.

112. A currency evaluation device for identifying currency bills of a plurality of denominations and a plurality of sizes comprising:

an input receptacle for receiving a stack of bills to be processed, the bills being of different sizes, the input receptacle having alignment guides being approximately as wide as the widest type of bill that the device is to accommodate;

a transport mechanism for transporting bills, one at a time, from the input receptacle along a transport path having a center past a discriminating unit;

the alignment guides aligning bills of the widest type with the transport path so that the center of the widest type bills is aligned with the center of the transport path, the alignment guides however not necessarily aligning bills that are not as wide as the widest type bills with the center of the transport path but rather permitting the center of shorter bills to be shifted laterally respect to the center of the transport path;

the discriminating unit retrieving characteristic information from a bill to be discriminated using a scanhead located near the center of the transport path and generating a scanned pattern;

a memory for storing at least one master characteristic pattern associated with each genuine bill which the system is designed to discriminate; the memory storing master characteristic patterns associated with genuine bills of a plurality of denominations, some of the genuine bills being of different sizes, the memory storing a first master characteristic pattern generated by scanning a genuine bill having a first denomination along a first segment located near the center of the genuine bill and a second master characteristic pattern generated by scanning a genuine bill having the first denomination along a second segment that is slightly laterally displaced from the first segment, a genuine bill having the first denomination being shorter than the widest type bill;

the master characteristic patterns associated with laterally displaced scans assisting in compensating for the lateral displacement of a bill having the first denomination relative to the center of the transport path so that if a bill having the first denomination is transported past the discriminating unit with its center aligned with the center of the transport path then the resulting scanned pattern will sufficiently match the first master pattern, and so that if a bill having the first denomination is transported past the discriminating unit with its center slightly laterally displaced from the center of the transport path in a manner corresponding to the displacement associated with the second master pattern then the resulting scanned pattern will sufficiently match the second master pattern; and a signal processor for comparing the scanned pattern generated from using the scanhead to scan the bill to be discriminated with stored master patterns including the first and second master characteristic patterns associated with laterally displaced scans; the signal processing means generating an indication of the identity of the bill to be discriminated based on the comparison when the scanned pattern sufficiently matches a stored master pattern, the indication of identity including an indication of the denomination of the bill.

113. A currency evaluation device for identifying currency bills of a plurality of widths comprising:

an input receptacle for receiving a stack of bills to be processed, the bills being of different widths, the input receptacle having alignment guides being approximately as wide as the widest type of bill that the device is to accommodate;

a transport mechanism for transporting bills, one at a time, from the input receptacle along a transport path past a discriminating unit;

the alignment guides aligning bills of the widest type with the transport path so that bills of widest type are transported past the discriminating unit in an aligned manner, the alignment guides however not necessarily aligning bills that are not as wide as the widest type bills with discriminating unit but rather permitting shorter bills to be shifted laterally respect to the discriminating unit;

the discriminating unit retrieving characteristic information from a bill to be discriminated using a detector having a given lateral position relative to the width of the transport path to scan a segment of the bill and generating a scanned pattern;

a memory for storing at least one master characteristic pattern associated with each genuine bill which the system is designed to discriminate; the memory storing master characteristic patterns associated with genuine bills of a plurality of widths, the memory storing a first master characteristic pattern generated by scanning a genuine bill having a first denomination along a first segment and a second master characteristic pattern generated by scanning a genuine bill having the first denomination along a second segment that is laterally displaced from the first segment, a genuine bill having the first denomination being shorter than the widest type bill;

the master characteristic patterns associated with laterally displaced scans assisting in compensating for the lateral displacement of a bill having the first denomination relative to the given lateral position of the transport path so that if a bill having the first denomination is transported past the discriminating unit in a manner that a segment corresponding to the first segment is aligned with the detector then the resulting scanned pattern will sufficiently match the first master pattern, and so that if a bill having the first denomination is transported past the discriminating unit in a manner that a segment corresponding to the second segment is aligned with the detector then the resulting scanned pattern will sufficiently match the second master pattern; and a signal processor for comparing the scanned pattern generated from using the detector to scan the bill to be discriminated with stored master patterns including the first and second master characteristic patterns associated with laterally displaced scans; the signal processing means generating an indication of the identity of the bill to be discriminated based on the comparison when the scanned pattern sufficiently matches a stored master pattern.

* * * * *

UNITED STATES PATENT AND TRADEMARK OFFICE
CERTIFICATE OF CORRECTION

PATENT NO. : 5,875,259

DATED : February 23, 1999

INVENTOR(S) : Douglas U. Mennie, Bradford T. Graves, Richard A. Mazur

It is certified that error appears in the above-identified patent and that said Letters Patent is hereby corrected as shown below:

Claim 3, Column 67, Line 66 to Column 68, Line 1 delete "transport mechanism for transporting bills, one at a time, along a transport path past said"

Signed and Sealed this

Fourth Day of January, 2000

Attest:

Attesting Officer

*Acting Commissioner of Patents and Trademarks*